(12) United States Patent
Matsuda et al.

(10) Patent No.: US 10,479,940 B2
(45) Date of Patent: *Nov. 19, 2019

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Naoko Matsuda, Chiba (JP); Masayuki Saito, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 69 days.

This patent is subject to a terminal disclaimer.

(21) Appl. No.: 15/568,485

(22) PCT Filed: Mar. 31, 2016

(86) PCT No.: PCT/JP2016/060659
§ 371 (c)(1),
(2) Date: Oct. 23, 2017

(87) PCT Pub. No.: WO2016/170948
PCT Pub. Date: Oct. 27, 2016

(65) Prior Publication Data
US 2018/0105746 A1    Apr. 19, 2018

(30) Foreign Application Priority Data

Apr. 23, 2015 (JP) ................................. 2015-088074

(51) Int. Cl.
*G02F 1/1334* (2006.01)
*C09K 19/12* (2006.01)
(Continued)

(52) U.S. Cl.
CPC .............. *C09K 19/12* (2013.01); *C09K 19/20* (2013.01); *C09K 19/30* (2013.01);
(Continued)

(58) Field of Classification Search
CPC ........ C09K 19/12; C09K 19/20; C09K 19/30; C09K 19/32; C09K 19/34; C09K 19/38; C09K 19/42; C09K 19/54; C09K 19/3003; C09K 19/3402; C09K 19/44; C09K 19/3066; C09K 2019/122; C09K 2019/301; C09K 2019/3422; C09K 2019/0448; C09K 2019/0466; C09K 2019/3004; C09K 2019/3425; G02F 1/13; G02F 1/1333; G02F 1/1334
(Continued)

(56) References Cited

U.S. PATENT DOCUMENTS

2013/0148069 A1  6/2013  Archetti et al.
2013/0182202 A1  7/2013  Graziano et al.
(Continued)

FOREIGN PATENT DOCUMENTS

| JP | 2013-144796 | 7/2013 |
|---|---|---|
| JP | 2013-541028 | 11/2013 |
| JP | 2013-543526 | 12/2013 |
| JP | 2014-047354 | 3/2014 |
| JP | 2014-097938 | 5/2014 |
| JP | 2014-513150 | 5/2014 |
| JP | 2014-196265 | 10/2014 |
| TW | 201202400 | 1/2012 |
| WO | 2012038026 | 3/2012 |
| WO | 2012104008 | 8/2012 |
| WO | 2013004372 | 1/2013 |
| WO | 2014090362 | 6/2014 |

(Continued)

OTHER PUBLICATIONS

"International Search Report (Form PCT/ISA/210)", dated Jun. 21, 2016, with English translation thereof, pp. 1-5.

(Continued)

*Primary Examiner* — Geraldina Visconti
(74) *Attorney, Agent, or Firm* — JCIPRNET

(57) ABSTRACT

A liquid crystal compound having positive dielectric anisotropy is provided and contains a compound represented by formula (1) as a first component, a compound represented by formula (2) as a second component, a polar compound as a first additive and a polymerizable compound as a second additive.

In formula (1), $R^{1a}$ is alkyl having 1 to 12 carbons, or the like; ring Q and ring S are independently 1,4-cyclohexylene, 1,4-phenylene or the like; $Z^{1a}$ and $Z^{2a}$ are independently a single bond or the like; $X^{1a}$ and $X^{2a}$ are independently hydrogen or fluorine; $Y^{1a}$ is fluorine, chlorine, alkyl having 1 to 12 carbons in which at least one hydrogen is replaced by fluorine or chlorine, or the like; q is 1, 2, 3 or 4; s is 0, 1, 2 or 3; and a sum of q and s is 4 or less.

20 Claims, No Drawings

(51) Int. Cl.
*C09K 19/20* (2006.01)
*C09K 19/30* (2006.01)
*C09K 19/32* (2006.01)
*C09K 19/34* (2006.01)
*C09K 19/38* (2006.01)
*C09K 19/42* (2006.01)
*C09K 19/54* (2006.01)
*C09K 19/44* (2006.01)
*G02F 1/1333* (2006.01)
*C09K 19/04* (2006.01)

(52) U.S. Cl.
CPC ...... *C09K 19/3003* (2013.01); *C09K 19/3066* (2013.01); *C09K 19/32* (2013.01); *C09K 19/34* (2013.01); *C09K 19/3402* (2013.01); *C09K 19/38* (2013.01); *C09K 19/42* (2013.01); *C09K 19/44* (2013.01); *C09K 19/54* (2013.01); *G02F 1/1333* (2013.01); *C09K 2019/0448* (2013.01); *C09K 2019/0466* (2013.01); *C09K 2019/122* (2013.01); *C09K 2019/301* (2013.01); *C09K 2019/3004* (2013.01); *C09K 2019/3422* (2013.01); *C09K 2019/3425* (2013.01)

(58) Field of Classification Search
USPC ........................................... 252/299.6
See application file for complete search history.

(56) References Cited

U.S. PATENT DOCUMENTS

| 2013/0314655 | A1 | 11/2013 | Archetti et al. |
| 2014/0061534 | A1 | 3/2014 | Goebel et al. |
| 2014/0138581 | A1 | 5/2014 | Archetti et al. |
| 2015/0301368 | A1 | 10/2015 | Archetti et al. |
| 2015/0322342 | A1 | 11/2015 | Archetti et al. |
| 2017/0174993 | A1* | 6/2017 | Saito ............ C09K 19/20 |

FOREIGN PATENT DOCUMENTS

| WO | 2014094959 | 6/2014 |
| WO | 2015004947 | 1/2015 |

OTHER PUBLICATIONS

"Office Action of Taiwan Counterpart Application," dated May 8, 2019, with English translation thereof, p. 1-p. 16.

* cited by examiner

LIQUID CRYSTAL COMPOSITION AND LIQUID CRYSTAL DISPLAY DEVICE

CROSS-REFERENCE TO RELATED APPLICATION

This application is a 371 application of International PCT application serial no. PCT/JP2016/060659, filed on Mar. 31, 2016, which claims the priority benefit of Japan application no. 2015-088074, filed on Apr. 23, 2015. The entirety of each of the abovementioned patent applications is hereby incorporated by reference herein and made a part of this specification.

TECHNICAL FIELD

The invention relates to a liquid crystal composition, a liquid crystal display device including the composition, and so forth. In particular, the invention relates to a liquid crystal composition that has positive dielectric anisotropy, contains a polar compound and a polymerizable compound (or a polymer thereof), and can achieve vertical alignment of liquid crystal molecules by action of the above compounds, and a liquid crystal display device.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in two characteristics. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time in the device. A short response time is preferred for displaying moving images on the device. A shorter response time even by one millisecond is desirable. Accordingly, small viscosity in the composition is preferred. Small viscosity at a low temperature is further preferred. An elastic constant of the composition relates to a contrast ratio of the device. In order to improve the contrast ratio of the device, a large elastic constant in the composition is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage, small electric power consumption and large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

Optical anisotropy of the composition relates to a contrast ratio in the device. According to a mode of the device, large optical anisotropy or small optical anisotropy, more specifically, suitable optical anisotropy is required. A product ($\Delta n \times d$) of the optical anisotropy ($\Delta n$) of the composition and a cell gap (d) in the device is designed so as to maximize the contrast ratio. A suitable value of the product depends on a type of the operating mode. In a device having a mode such as TN, a suitable value is about 0.45 micrometer. In the above case, a composition having the large optical anisotropy is preferred for a device having a small cell gap. Large dielectric anisotropy in the composition contributes to a low threshold voltage, small electric power consumption and a large contrast ratio in the device. Accordingly, the large dielectric anisotropy is preferred. Large specific resistance in the composition contributes to a large voltage holding ratio and the large contrast ratio in the device. Accordingly, a composition having the large specific resistance at room temperature and also at a temperature close to a maximum temperature of the nematic phase in an initial stage is preferred. The composition having the large specific resistance at room temperature and also at a temperature close to the maximum temperature of the nematic phase after the device has been used for a long period of time is preferred. Stability of the composition to ultraviolet light and heat relates to a service life of the device. In the case where the stability is high, the device has a long service life. Such characteristics are preferred for an AM device for use in a liquid crystal projector, a liquid crystal television and so forth.

Vertical alignment of liquid crystal molecules is achieved by a specific polyimide alignment film in a general-purpose liquid crystal display device. In a liquid crystal display device having a polymer sustained alignment (PSA) mode, the alignment film is combined with a polymer. First, a composition to which a small amount of a polymerizable compound is added is injected into the device. Then, the composition is irradiated with ultraviolet light while voltage is applied between substrates of the device. The polymerizable compound is polymerized to form a network structure of the polymer in the composition. In the composition, alignment of liquid crystal molecules can be controlled by the polymer, and therefore the response time of the device is shortened and also image persistence is improved. Such an effect of the polymer can be expected for a device having the mode such as the TN mode, the ECB mode, the OCB mode, the IPS mode, the VA mode, the FFS mode and the FPA mode.

Meanwhile, in a liquid crystal display device having no alignment film, a liquid crystal composition containing a polymer and a polar compound is used. First, a composition to which a small amount of a polymerizable compound and a small amount of the polar compound are added is injected into the device. Here, the polar compound is adsorbed on a substrate surface and is arranged. The liquid crystal molecules are aligned according to the above arrangement. Then, the composition is irradiated with ultraviolet light while voltage is applied between substrates of the device. Here, the polymerizable compound is polymerized to stabilize the alignment of the liquid crystal molecules. In the composition, the alignment of the liquid crystal molecules can be controlled by the polymer and the polar compound, and therefore the response time of the device is shortened and image persistence is improved. Further, in a device having no alignment film, a process of forming the alignment film is unnecessary. No alignment film is applied thereto, and therefore no reduction of electric resistance of the device is caused by interaction between the alignment film and the composition. Such an effect caused by a combination of the polymer and the polar compound can be expected for a device having the mode such as the TN mode, the ECB mode, the OCB mode, the IPS mode, the VA mode, the FFS mode and the FPA mode.

A composition having positive dielectric anisotropy is used in an AM device having the TN mode. A composition having negative dielectric anisotropy is used in an AM device having the VA mode. A composition having the positive or negative dielectric anisotropy is used in an AM device having the IPS mode or the FFS mode. A composition having positive or negative dielectric anisotropy is used for an AM device having the polymer sustained alignment mode. In a device having no alignment film, a composition having positive or negative dielectric anisotropy is used. Examples of the liquid crystal composition having the positive dielectric anisotropy are disclosed in Patent literature Nos. 1 to 4 described below, or the like.

CITATION LIST

Patent Literature

Patent literature No. 1: JP 2013-541028 A
Patent literature No. 2: JP 2013-543526 A
Patent literature No. 3: JP 2014-513150 A
Patent literature No. 4: WO 2014-94959 A

SUMMARY OF INVENTION

Technical Problem

One objective of the invention is a liquid crystal composition that contains a polymerizable compound (or a polymer thereof) and a polar compound, and can achieve vertical alignment of liquid crystal molecules by action of the above compounds. Another objective is a liquid crystal composition satisfying at least one of characteristics such as a high maximum temperature of a nematic phase, a low minimum temperature of the nematic phase, small viscosity, suitable optical anisotropy, large positive dielectric anisotropy, large specific resistance, high stability to ultraviolet light, high stability to heat and a large elastic constant. Another objective is a liquid crystal composition having a suitable balance regarding at least two of the characteristics. Another objective is a liquid crystal display device including such a composition. Another objective is an AM device having characteristics such as a short response time, a large voltage holding ratio, a low threshold voltage, a large contrast ratio and a long service life.

Solution to Problem

The invention concerns a liquid crystal compound that has positive dielectric anisotropy, and contains at least one compound selected from the group of compounds represented by formula (1) as a first component, a compound represented by formula (2) as a second component, at least one polar compound as a first additive and at least one polymerizable compound as a second additive:

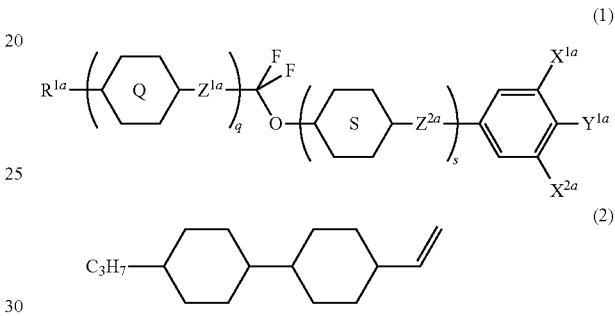

wherein, in formula (1), $R^{1a}$ is alkyl having 1 to 12 carbons, alkoxy having 1 to 12 carbons or alkenyl having 2 to 12 carbons; ring Q and ring S are independently 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^{1a}$ and $Z^{2a}$ are independently a single bond, —$CH_2CH_2$—, —CH=CH—, —$CH_2O$—, —$OCH_2$—, —COO—, —OCO—, —$CF_2O$— or —$OCF_2$—; $X^{1a}$ and $X^{2a}$ are independently hydrogen or fluorine; $Y^{1a}$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine; q is 1, 2, 3 or 4; s is 0, 1, 2 or 3; and a sum of q and s is 4 or less.

Advantageous Effects of Invention

One advantage of the invention is a liquid crystal composition that contains a polymerizable compound (or a polymer thereof) and a polar compound, and can achieve vertical alignment of liquid crystal molecules by action of the above compounds. Another advantage is a liquid crystal composition satisfying at least one of characteristics such as a high maximum temperature of a nematic phase, a low minimum temperature of the nematic phase, small viscosity, suitable optical anisotropy, large positive dielectric anisotropy, large specific resistance, high stability to ultraviolet light, high stability to heat and a large elastic constant. Another advantage is a liquid crystal composition having a suitable balance regarding at least two of the characteristics. Another advantage is a liquid crystal display device including such a composition. Another advantage is an AM device having characteristics such as a short response time, a large voltage holding ratio, a low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but being mixed with the composition for the purpose of adjusting characteristics such as a temperature range of the nematic phase, viscosity and dielectric anisotropy. The compound has a six-membered ring such as 1,4-cyclohexylene and 1,4-phenylene, and has rod-like molecular structure. "Polymerizable compound" includes a compound to be added to the composition for the purpose of forming a polymer in the composition.

The liquid crystal composition is prepared by mixing a plurality of liquid crystal compounds. An additive is added to the composition for the purpose of further adjusting characteristics. The additive such as an optically active compound, an antioxidant, an ultraviolet light absorber, a dye, an antifoaming agent, the polymerizable compound, a polymerization initiator, a polymerization inhibitor and a polar compound is added when necessary. The liquid crystal compound and the additive are mixed in such a procedure. A proportion (content) of the liquid crystal compounds is expressed in terms of weight percent (% by weight) based on the weight of the liquid crystal composition containing no additive, even after the additive has been added. A proportion (amount of addition) of the additive is expressed in terms of weight percent (% by weight) based on the weight of the liquid crystal composition containing no additive in a manner similar to the proportion of the liquid crystal compounds. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having large specific resistance" means that the composition has large specific resistance at room temperature and also at a temperature close to the maximum temperature in an initial stage, and the composition has the large specific resistance at room temperature and also at a temperature close to the maximum temperature even after the device has been used for a long period of time. An expression "having a large voltage holding ratio" means that the device has a large voltage holding ratio at room temperature and also at a temperature close to the maximum temperature in the initial stage, and the device has the large voltage holding ratio at room temperature and also at a temperature close to the maximum temperature even after the device has been used for the long period of time. In the composition or the device, the characteristics may be occasionally examined before and after an aging test (including an acceleration deterioration test). An expression "increase the dielectric anisotropy" means that a value of dielectric anisotropy positively increases in a liquid crystal composition having positive dielectric anisotropy, and the value of dielectric anisotropy negatively increases in a liquid crystal composition having negative dielectric anisotropy.

A compound represented by formula (1) may be occasionally abbreviated as "compound (1)." At least one compound selected from the group of compounds represented by formula (1) may be occasionally abbreviated as "compound (1)." "Compound (1)" means one compound, a mixture of two compounds or a mixture of three or more compounds, each represented by formula (1). A same rule applies also to any other compound represented by any other formula. An expression "at least one piece of 'A'" means that the number of 'A' is arbitrary. An expression "at least one piece of 'A' may be replaced by 'B'" means that when the number of 'A' is 1, a position of 'A' is arbitrary, and when the number of 'A' is 2 or more, positions thereof can be selected without limitation. A same rule applies also to an expression "at least one piece of 'A' is replaced by 'B'."

A symbol of terminal group $R^{1a}$ is used for a plurality of compounds in chemical formulas of component compounds. In the compounds, two groups represented by any two pieces of $R^{1a}$ may be identical or different. In one case, for example, $R^{1a}$ of compound (1-1) is ethyl and $R^{1a}$ of compound (1-2) is ethyl. In another case, $R^{1a}$ of compound (1-1) is ethyl and $R^{1a}$ of compound (1-2) is propyl. A same rule applies also to a symbol such as any other terminal groups. In formula (1), when q is 2, two rings Q exist. In the compound, two rings represented by two rings Q may be identical or different. A same rule applies also to any two rings Q when q is larger than 2. A same rule applies also to any other symbols. A same rule applies also to such a case where two pieces of $Sp^2$-$P^2$ exist in compound (8-27).

Symbols such as A, B, C and D surrounded by a hexagonal shape correspond to rings such as ring A, ring B, ring C and ring D, respectively, and represent rings such as a six-membered ring and a condensed ring. An oblique line crossing the hexagonal shape represents that arbitrary hydrogen on the ring can be replaced by a group such as -$Sp^1$-$P^1$. A subscript such as 'b' represents the number of groups replaced. When the subscript 'b' is 0, no such replacement exists. When 'b' is 2 or more, a plurality of pieces of -$Sp^1$-$P^1$ exist on ring A. The plurality of groups represented by -$Sp^1$-$P^1$ may be identical or different.

Then, 2-fluoro-1,4-phenylene means two divalent groups described below. In a chemical formula thereof, fluorine may be leftward (L) or rightward (R). A same rule applies also to an asymmetrical divalent group formed by removing two hydrogen from a ring, such as tetrahydropyran-2,5-diyl. A same rule applies also to a divalent bonding group such as carbonyloxy (—COO— or —OCO—).

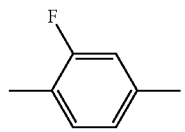

(L)

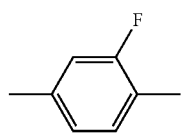

(R)

An expression "at least one piece of —$CH_2$— may be replaced by —O—" is used herein. In the above case, —$CH_2$—$CH_2$—$CH_2$— may be converted into —O—$CH_2$—

O— by replacement of non-adjacent —CH$_2$— by —O—. However, a case where adjacent —CH$_2$— is replaced by —O— is excluded. The reason is that —O—O—CH$_2$— (peroxide) is formed in the replacement. More specifically, the above expression means both of "one piece of —CH$_2$— may be replaced by —O—" and "at least two pieces of non-adjacent —CH$_2$— may be replaced by —O—." A same rule applies to replacement to —O—, and also to replacement to a divalent group such as —CH=CH— or —COO—. In formula (7), R$^4$ is alkyl having 4 to 20 carbons, and in the alkyl, at least one piece of —CH$_2$— may be replaced by —CH=CH— or the like. The number of carbons of alkyl is increased by the replacement. In such a case, the maximum number of carbons is 30. A same rule applies also to alkylene, cycloalkylene and so forth.

Alkyl of the liquid crystal composition is straight-chain alkyl or branched-chain alkyl, and includes no cyclic alkyl. Straight-chain alkyl is preferred to branched-chain alkyl. A same rule applies also to a terminal group such as alkoxy and alkenyl. With regard to a configuration of 1,4-cyclohexylene, in general, trans is preferred to cis. Halogen means fluorine, chlorine, bromine or iodine. Preferred halogen is fluorine or chlorine. Further preferred halogen is fluorine.

The invention includes items described below.

Item 1. A liquid crystal compound that has positive dielectric anisotropy, and contains at least one compound selected from the group of compounds represented by formula (1) as a first component, a compound represented by formula (2) as a second component, at least one polar compound as a first additive and at least one polymerizable compound as a second additive:

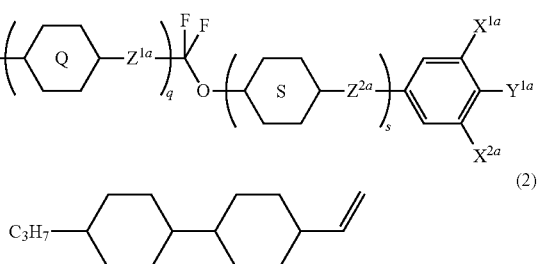

(1)

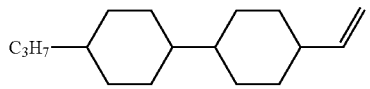

(2)

wherein, in formula (1), R$^{1a}$ is alkyl having 1 to 12 carbons, alkoxy having 1 to 12 carbons or alkenyl having 2 to 12 carbons; ring Q and ring S are independently 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; Z$^{1a}$ and Z$^{2a}$ are independently a single bond, —CH$_2$CH$_2$—, —CH=CH—, —CH$_2$O—, —OCH$_2$—, —COO—, —OCO—, —CF$_2$O— or —OCF$_2$—; X$^{1a}$ and X$^{2a}$ are independently hydrogen or fluorine; Y$^{1a}$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine; q is 1, 2, 3 or 4; s is 0, 1, 2 or 3; and a sum of q and s is 4 or less.

Item 2. The liquid crystal composition according to item 1, containing at least one compound selected from the group of compounds represented by formula (1-1) to formula (1-14) as the first component:

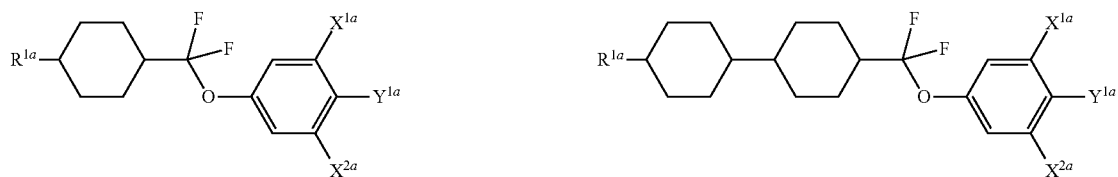

(1-1)

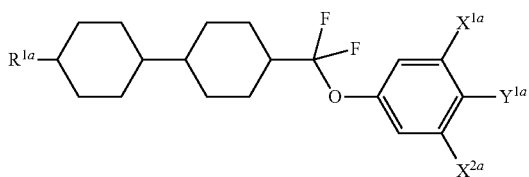

(1-2)

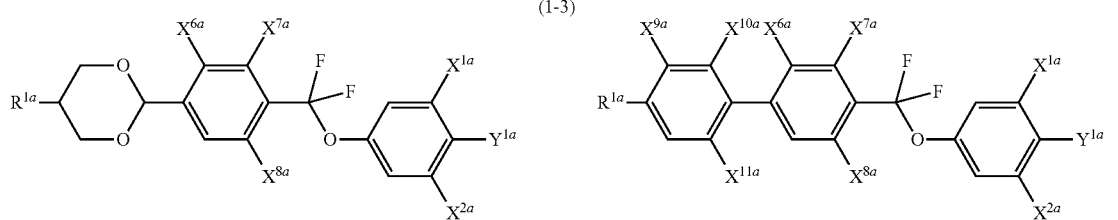

(1-3)

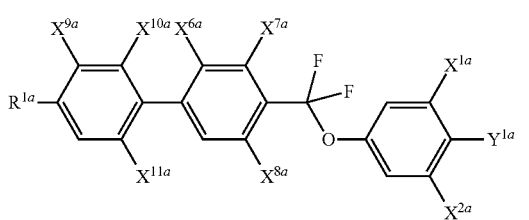

(1-4)

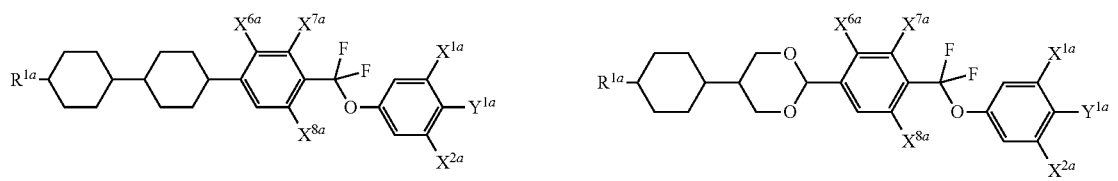

(1-5)

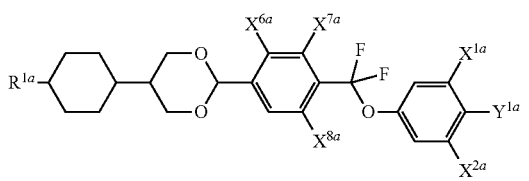

(1-6)

-continued

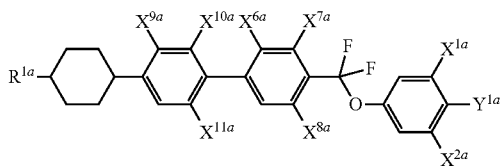
(1-7)

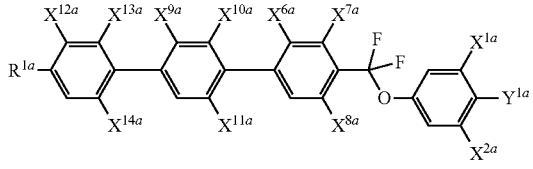
(1-8)

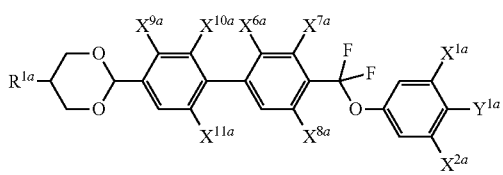
(1-9)

(1-10)

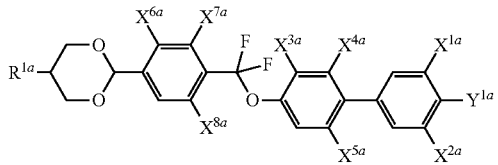
(1-11)

(1-12)

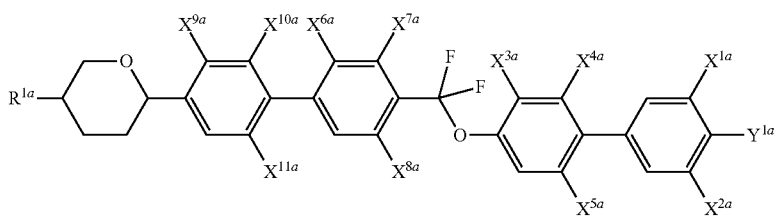
(1-13)

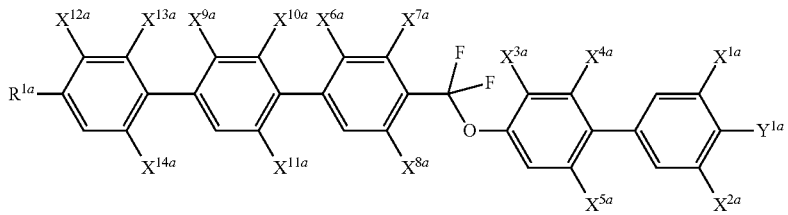
(1-14)

wherein, in formula (1-1) to formula (1-14), $R^{1a}$ is alkyl having 1 to 12 carbons, alkoxy having 1 to 12 carbons or alkenyl having 2 to 12 carbons; $X^{1a}$, $X^{2a}$, $X^{3a}$, $X^{4a}$, $X^{5a}$, $X^{6a}$, $X^{7a}$, $X^{8a}$, $X^{9a}$, $X^{10a}$, $X^{11a}$, $X^{12a}$, $X^{13a}$ and $X^{14a}$ are independently hydrogen or fluorine; and $Y^{1a}$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine.

Item 3. The liquid crystal composition according to item 1 or 2, wherein a proportion of the first component is in the range of 5% by weight to 55% by weight, and a proportion of the second component is in the range of 5% by weight to 50% by weight, based on the weight of the liquid crystal composition.

Item 4. The liquid crystal composition according to any one of items 1 to 3, further containing at least one compound selected from the group of compounds represented by formula (3) as a third component:

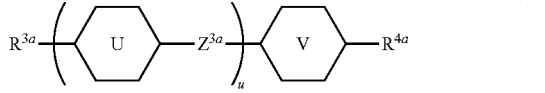
(3)

wherein, in formula (3), $R^{3a}$ and $R^{4a}$ are independently alkyl having 1 to 12 carbons, alkoxy having 1 to 12 carbons, alkenyl having 2 to 12 carbons or alkenyl having 2 to 12 carbons in which at least one hydrogen is replaced by fluorine or chlorine; ring U and ring V are independently 1,4-cyclohexylene, 1,4-phenylene, 2-fluoro-1,4-phenylene or 2,5-difluoro-1,4-phenylene; $Z^{3a}$ is a single bond, —CH$_2$CH$_2$—, —COO— or —OCO—; u is 1, 2 or 3; in which, when u is 1, ring V is 1,4-phenylene, 2-fluoro-1,4-phenylene or 2,5-difluoro-1,4-phenylene.

Item 5. The liquid crystal composition according to any one of items 1 to 4, containing at least one compound selected from the group of compounds represented by formula (3-1) to formula (3-12) as the third component:

(3-1) 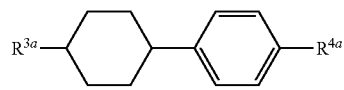

(3-2) 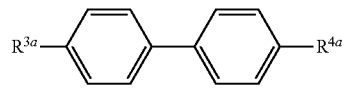

(3-3) 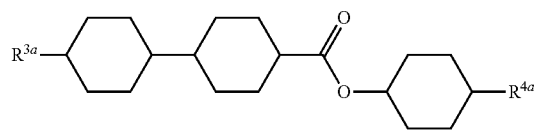

(3-4) 

(3-5) 

(3-6) 

(3-7) 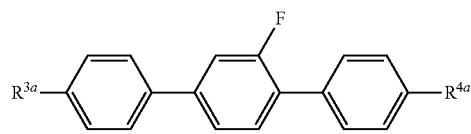

(3-8) 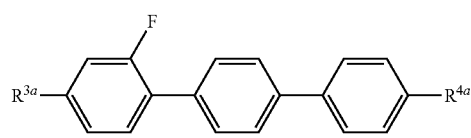

(3-9) 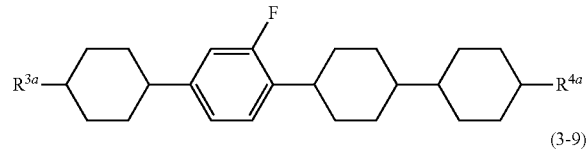

(3-10) 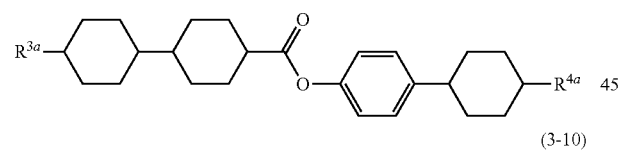

(3-11) 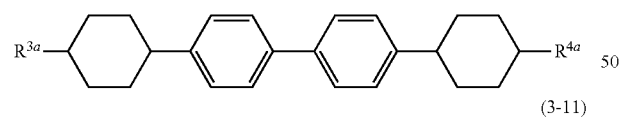

(3-12) 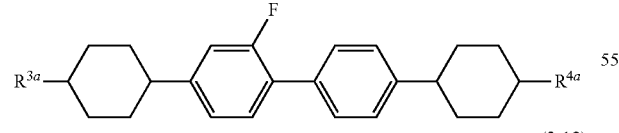

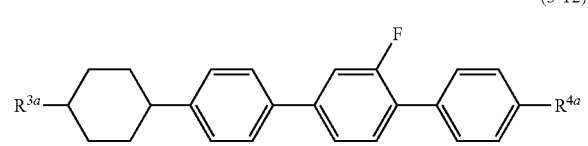

wherein, in formula (3-1) to formula (3-12), $R^{3a}$ and $R^{4a}$ are independently alkyl having 1 to 12 carbons, alkoxy having 1 to 12 carbons, alkenyl having 2 to 12 carbons or alkenyl having 2 to 12 carbons in which at least one hydrogen is replaced by fluorine or chlorine.

Item 6. The liquid crystal composition according to item 4 or 5, wherein a proportion of the third component is in the range of 3% by weight to 55% by weight based on the weight of the liquid crystal composition.

Item 7. The liquid crystal composition according to any one of items 1 to 6, further containing at least one compound selected from the group of compounds represented by formula (4) as a fourth component:

(4) 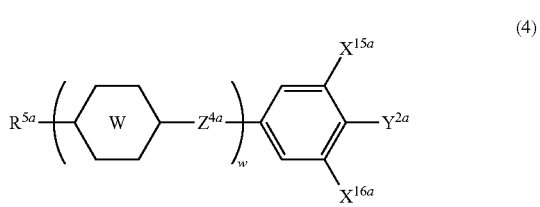

wherein, in formula (4), $R^{5a}$ is alkyl having 1 to 12 carbons, alkoxy having 1 to 12 carbons or alkenyl having 2 to 12 carbons; ring W is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^{4a}$ is a single bond, —CH$_2$CH$_2$—, —COO— or —OCO—; $X^{15a}$ and $X^{16a}$ are independently hydrogen or fluorine; $Y^{2a}$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine; and w is 1, 2, 3 or 4.

Item 8. The liquid crystal composition according to any one of items 1 to 7, containing at least one compound selected from the group of compounds represented by formula (4-1) to formula (4-16) as the fourth component:

(4-1) 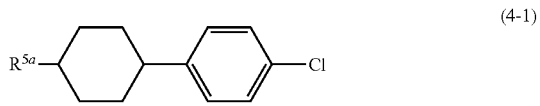

(4-2) 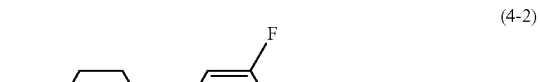

(4-3) 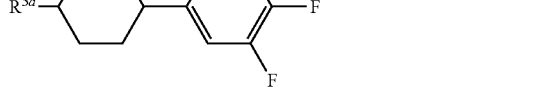

(4-4) 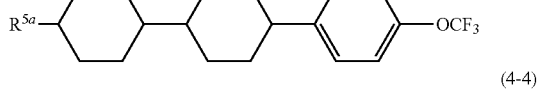

(4-5)
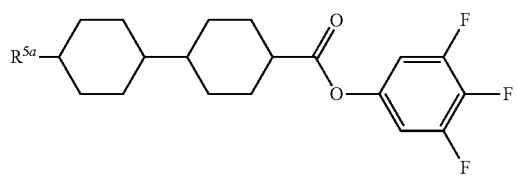

(4-6)
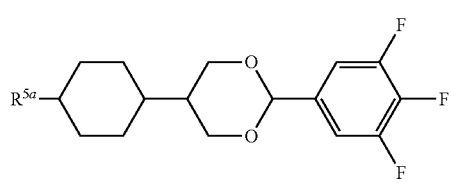

(4-7)
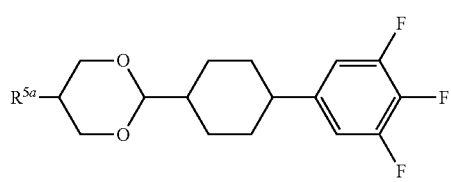

(4-8)
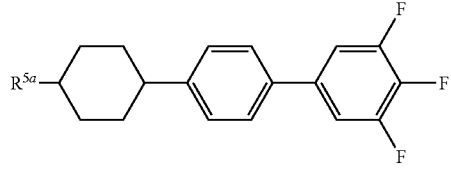

(4-9)
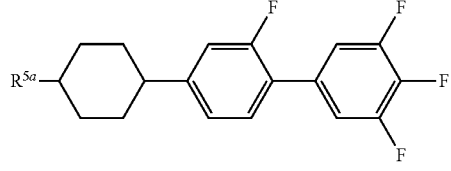

(4-10)
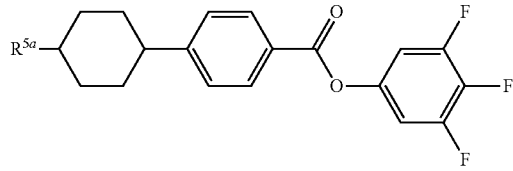

(4-11)
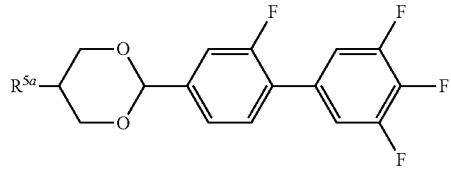

(4-12)
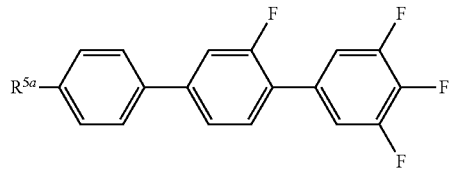

(4-13)
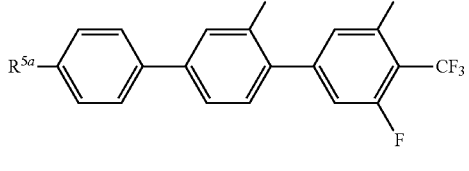

(4-14)
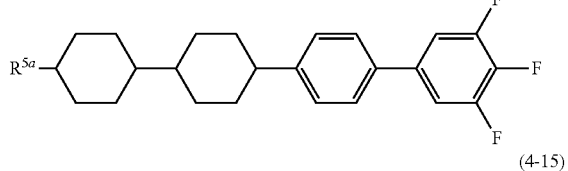

(4-15)
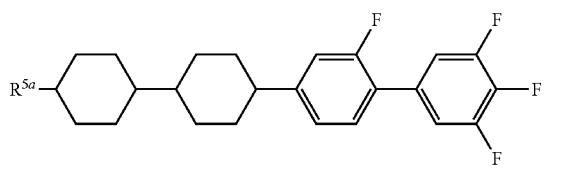

(4-16)
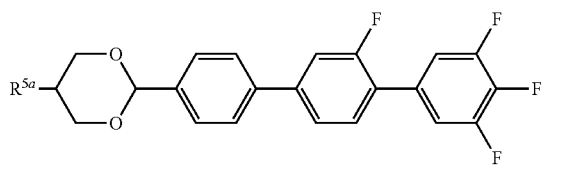

(Extra structure)
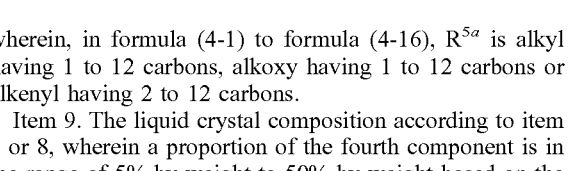

wherein, in formula (4-1) to formula (4-16), $R^{5a}$ is alkyl having 1 to 12 carbons, alkoxy having 1 to 12 carbons or alkenyl having 2 to 12 carbons.

Item 9. The liquid crystal composition according to item 7 or 8, wherein a proportion of the fourth component is in the range of 5% by weight to 50% by weight based on the weight of the liquid crystal composition.

Item 10. The liquid crystal composition according to any one of items 1 to 9, containing at least one compound selected from the group of compounds represented by formula (5) as a fifth component:

(5)
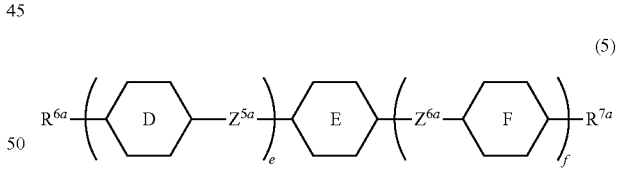

wherein, in formula (5), $R^{6a}$ and $R^{7a}$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^{5a}$ and $Z^{6a}$ are independently a single bond, —CH$_2$CH$_2$—, —COO—, —OCO—, —CH$_2$O— or —OCH$_2$—; e is 1, 2 or 3, and f is 0 or 1; and a sum of e and f is 3 or less.

Item 11. The liquid crystal composition according to any one of items 1 to 10, containing at least one compound selected from the group of compounds represented by formula (5-1) to formula (5-21) as the fifth component:
(5-1)
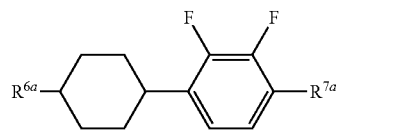
(5-2)
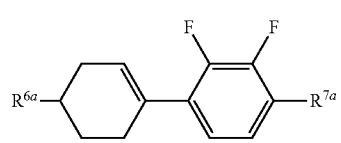
(5-3)
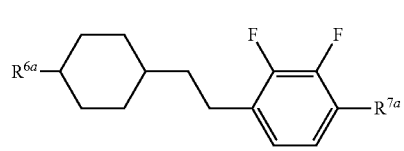
(5-4)
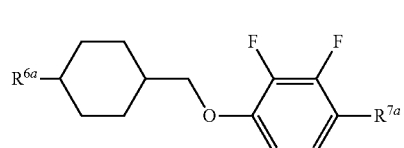
(5-5)
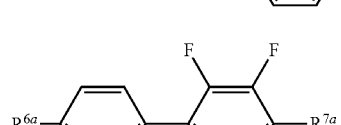
(5-6)
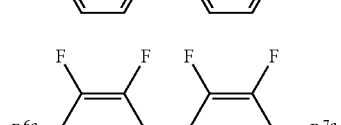
(5-7)
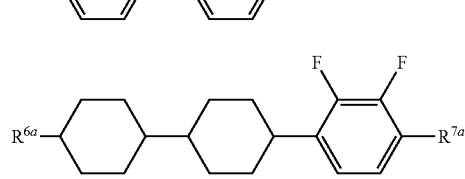
(5-8)
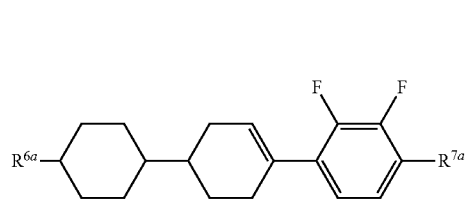
(5-9)
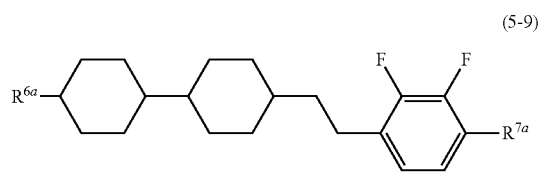
(5-10)
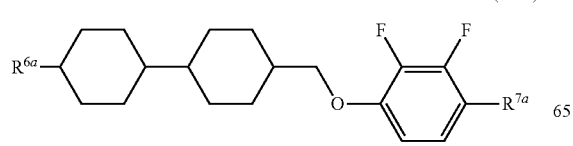
(5-11)
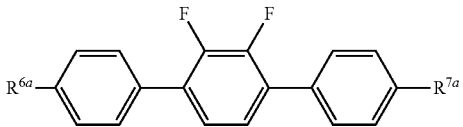
(5-12)
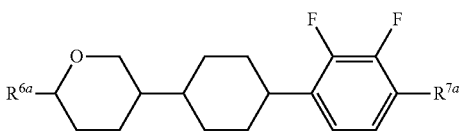
(5-13)
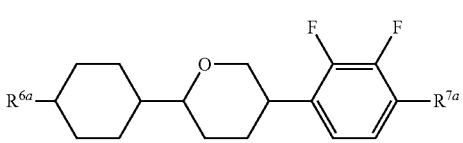
(5-14)
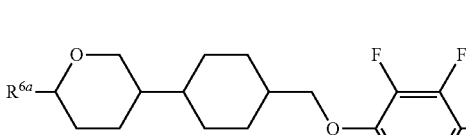
(5-15)
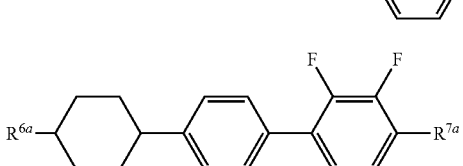
(5-16)
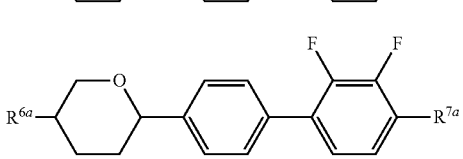
(5-17)
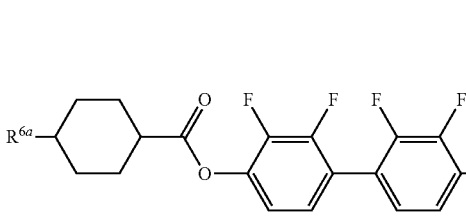
(5-18)
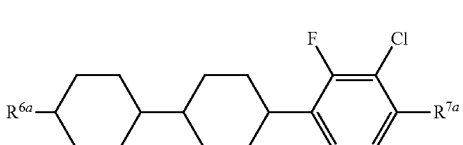
(5-19)
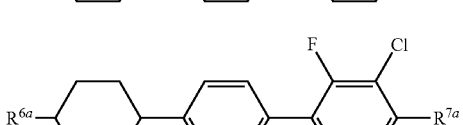
(5-20)
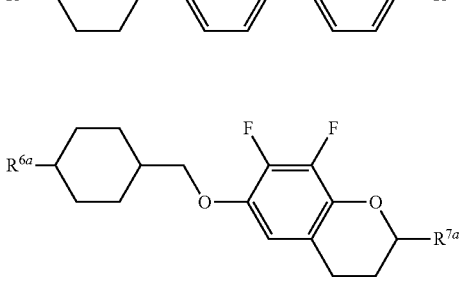

(5-21)

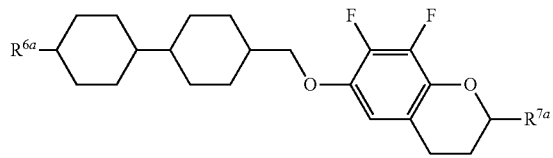

wherein, in formula (5-1) to formula (5-21), $R^{6a}$ and $R^{7a}$ are independently alkyl having 1 to 12 carbons, alkoxy having 1 to 12 carbons, alkenyl having 2 to 12 carbons or alkenyloxy having 2 to 12 carbons.

Item 12. The liquid crystal composition according to item 10 or 11, wherein a proportion of the fifth component is in the range of 3% by weight to 25% by weight based on the weight of the liquid crystal composition.

Item 13. The liquid crystal composition according to any one of items 1 to 12, wherein the first additive is a polar compound having a polar group containing a hetero atom selected from nitrogen, oxygen, sulfur and phosphorus.

Item 14. The liquid crystal composition according to any one of items 1 to 13, containing at least one polar compound selected from the group of compounds represented by formula (6) and formula (7) as the first additive:

MES-$R^5$ (6)

$(R^4)_g$—$R^5$ (7)

wherein, in formula (6), MES is a mesogen group having at least one ring; in formula (7), $R^4$ is alkyl having 4 to 20 carbons, and in the alkyl, at least one piece of —$CH_2$— may be replaced by —CH=CH—, —CF=CH—, —CH=CF—, —C≡C— or cycloalkylene having 3 to 8 carbons, and in the groups, at least one hydrogen may be replaced by fluorine or chlorine; and in formula (6) and formula (7), $R^5$ is a polar group having at least one of an oxygen atom having an OH structure, a sulfur atom having an SH structure, and a nitrogen atom having a primary, secondary or tertiary amine structure; and g is 1 or 2.

Item 15. The liquid crystal composition according to any one of items 1 to 14, containing at least one compound selected from the group of compounds represented by formula (6-1) as the first additive:

(6-1)

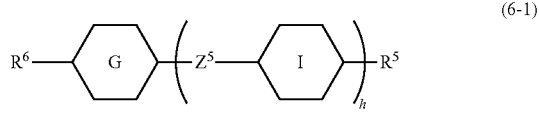

wherein, in formula (6-1), ring G and ring I are independently an aromatic group having 6 to 25 carbons, a heteroaromatic group having 5 to 25 carbons, an alicyclic group having 3 to 25 carbons or a heteroalicyclic group having 4 to 25 carbons, and the groups may be a condensed ring, and in the groups, at least one hydrogen may be replaced by group T, in which group T is —OH, —$(CH_2)_i$—OH, halogen, —CN, —$NO_2$, —NCO, —NCS, —OCN, —SCN, —C(=O)N($R^0$)$_2$, —C(=O)$R^0$, —N($R^0$)$_2$, —$(CH_2)_i$—N$(R^0)_2$, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, and in the groups, at least one hydrogen may be replaced by fluorine or chlorine, in which $R^0$ is hydrogen or alkyl having 1 to 12 carbons, and i is 1, 2, 3 or 4; $Z^5$ is —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_i$—, —$CF_2CH_2$—, —$CH_2CF_2$—, —$(CF_2)_i$—, —CH=CH—, —CF=CF—, —C≡C—, —CH=CH—COO—, —OCO—CH=CH—, —C($R^0$)$_2$ or a single bond, in which $R^0$ is hydrogen or alkyl having 1 to 12 carbons, and i is 1, 2, 3 or 4; $R^5$ is alkyl having 1 to 25 carbons, and in the alkyl, at least one piece of —$CH_2$— may be replaced by —$NR^0$—, —O—, —S—, —CO—, —COO—, —OCO—, —OCOO— or cycloalkylene having 3 to 8 carbons, in which $R^0$ is hydrogen or alkyl having 1 to 12 carbons, and at least one tertiary carbon (>CH—) may be replaced by nitrogen (>N—), and at least one hydrogen may be replaced by fluorine or chlorine, in which $R^5$ has at least one of an oxygen atom having an OH structure, a sulfur atom having an SH structure, and a nitrogen atom having a primary, secondary or tertiary amine structure; $R^6$ is hydrogen, halogen and alkyl having 1 to 25 carbons, and in the alkyl, at least one piece of —$CH_2$— may be replaced by —$NR^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least hydrogen may be replaced by fluorine or chlorine, in which $R^0$ is hydrogen or alkyl having 1 to 12 carbons; and h is 0, 1, 2, 3, 4 or 5.

Item 16. The liquid crystal composition according to any one of items 1 to 15, further containing at least one polar compound selected from the group of compounds represented by formula (7-1) as the first additive:

$R^4$-$R^5$ (7-1)

wherein, in formula (7-1), $R^4$ is alkyl having 4 to 20 carbons, and in the alkyl, at least one piece of —$CH_2$— may be replaced by —CH=CH—, —CF=CH—, —CH=CF—, —C≡C— or cycloalkylene having 3 to 8 carbons, and in the groups, at least one hydrogen may be replaced by fluorine or chlorine; $R^5$ is alkyl having 1 to 25 carbons, and in the alkyl, at least one piece of —$CH_2$— may be replaced by —$NR^0$—, —O—, —S—, —CO—, —COO—, —OCO—, —OCOO— or cycloalkylene having 3 to 8 carbons, in which $R^0$ is hydrogen or alkyl having 1 to 12 carbons, and at least one tertiary carbon (>CH—) may be replaced by nitrogen (>N—), and at least one hydrogen may be replaced by fluorine or chlorine, in which $R^5$ has at least one of an oxygen atom having an OH structure, a sulfur atom having an SH structure, and a nitrogen atom having a primary, secondary or tertiary amine structure.

Item 17. The liquid crystal composition according to any one of items 14 to 16, wherein, in formula (6) and formula (7) according to item 14, $R^5$ is a group represented by any one of formula (A1) to formula (A4):

(A1)

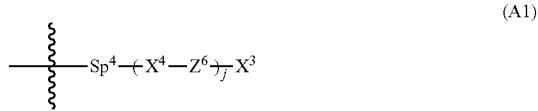

(A2)

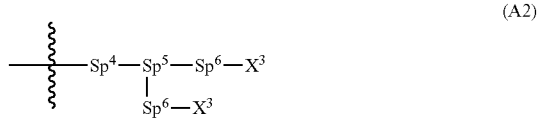

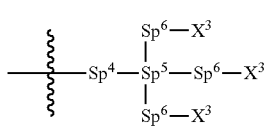
(A3)

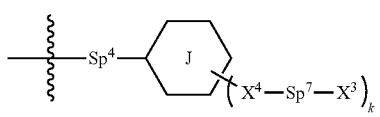
(A4)

wherein, in formula (A1) to formula (A4), $Sp^4$, $Sp^6$ and $Sp^7$ are independently a single bond or a group (-Sp"-X"—), in which Sp" is alkylene having 1 to 20 carbons, and in the alkylene, at least one piece of —$CH_2$— may be replaced by —O—, —S—, —NH—, —N($R^0$)—, —CO—, —CO—O—, —O—CO—, —O—CO—O—, —S—CO—, —CO—S—, —N($R^0$)—CO—O—, —O—CO—N($R^0$)—, —N($R^0$)—CO—N($R^0$)—, —CH=CH— or —C≡C—, and in the groups, at least one hydrogen may be replaced by fluorine, chlorine or —CN, and X" is —O—, —S—, —CO—, —CO—O—, —O—CO—, —O—CO—O—, —CO—N($R^0$)—, —N($R^0$)—CO—, —N($R^0$)—CO—N ($R^0$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—CO—O—, —O—CO—CH=CH— or a single bond, in which $R^0$ is hydrogen or alkyl having 1 to 12 carbons, and $Y^2$ and $Y^3$ are independently hydrogen, fluorine, chlorine or —CN; $Sp^5$ is >CH—, >$CR^{11}$—, >N— or >C<; $X^3$ is —OH, —$OR^{11}$, —COOH, —$NH_2$, —$NHR^{11}$, —N($R^{11}$)$_2$, —SH, —SR,

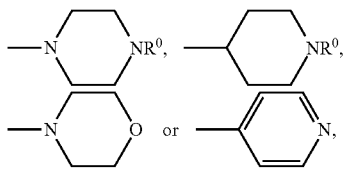

in which $R^0$ is hydrogen or alkyl having 1 to 12 carbons; $X^4$ is —O—, —CO—, —NH—, —$NR^{11}$—, —S— or a single bond; $Z^6$ is alkylene having 1 to 15 carbons, an alicyclic group having 5 or 6 carbons or a combination thereof, and in the groups, at least one hydrogen may be replaced by —OH, —$OR^{11}$, —COOH, —$NH_2$, —$NHR^{11}$, —N($R^{11}$)$_2$, fluorine or chlorine, in which $R^{11}$ is alkyl having 1 to 15 carbons, and in the alkyl, at least one piece of —$CH_2$— may be replaced by —C≡C—, —CH=CH—, —COO—, —OCO—, —CO— or —O—, and in the groups, at least one hydrogen may be replaced by fluorine or chlorine; ring J is an aromatic group having 6 to 25 carbons or an alicyclic group having 3 to 25 carbons, and the groups may be a condensed ring, and in the groups, one to three hydrogens may be replaced by $R^L$; $R^L$ is —OH, —($CH_2$)$_i$—OH, fluorine, chlorine, —CN, —$NO_2$, —NCO, —NCS, —OCN, —SCN, —C(=O)N($R^0$)$_2$, —C(=O)$R^0$, —N($R^0$)$_2$, —($CH_2$)$_i$—N($R^0$)$_2$, —SH, —$SR^0$, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, and in the groups, at least one hydrogen may be replaced by fluorine or chlorine, in which $R^0$ is hydrogen or alkyl having 1 to 12 carbons, and i is 1, 2, 3 or 4; j is 0, 1, 2 or 3; and k is 2, 3, 4 or 5.

Item 18. The liquid crystal composition according to item 15 or 17, wherein the first additive is at least one compound selected from the group of compounds represented by formula (6-1-1) to formula (6-1-4):

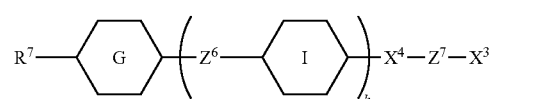
(6-1-1)

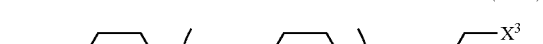
(6-1-2)

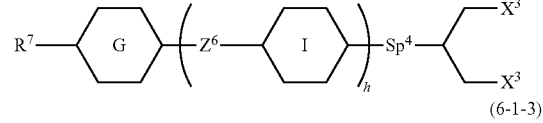
(6-1-3)

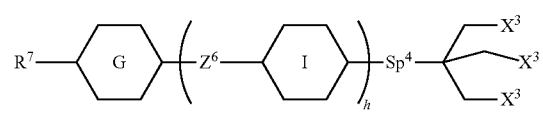
(6-1-4)

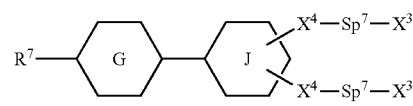

wherein, in formula (6-1-1) to formula (6-1-4), ring G and ring I are independently 1,4-cyclohexylene, 1,4-phenylene, 2-fluoro-1,4-phenylene, 2-fluoro-1,3-phenylene, 2-ethyl-1,4-phenylene, 2,6-diethyl-1,4-phenylene, 2-trifluoromethyl-1,4-phenylene, 2,3-difluoro-1,4-phenylene, 2,5-difluoro-1,4-phenylene, 2,6-difluoro-1,4-phenylene or 2,3,5,6-tetrafluoro-1,4-phenylene; ring J is cyclohexyl or phenyl; $Z^6$ is a single bond, —$CH_2CH_2$—, —COO— or —OCO—; $Z^7$ is a single bond, alkylene having 1 to 15 carbons, an alicyclic group having 5 or 6 carbons or a combination thereof, and in the groups, at least one hydrogen may be replaced by —OH, —$OR^{11}$, —COOH, —$NH_2$, —$NHR^{11}$, —N($R^{11}$)$_2$, fluorine or chlorine, and $R^{11}$ is alkyl having 1 to 15 carbons, and in the alkyl, at least one piece of —$CH_2$— may be replaced by —C≡C—, —CH=CH—, —COO—, —OCO—, —CO—, —O— or —NH—, and in the groups, at least one hydrogen may be replaced by fluorine or chlorine; $Sp^4$ is a single bond, —$CH_2CH_2$—, —$CH_2CH_2CH_2$—, —$CH_2O$— or —$OCH_2$—; $Sp^7$ is a single bond or alkylene having 1 to 5 carbons, and in the alkylene, —$CH_2$— may be replaced by —O— or —NH—; $R^7$ is alkyl having 1 to 8 carbons or fluorine; h is 0, 1, 2, 3, 4 or 5; $X^3$ is —OH, —COOH, —SH, —$OCH_3$ or —$NH_2$; and $X^4$ is a single bond or —O—.

Item 19. The liquid crystal composition according to item 16 or 17, wherein the first additive is at least one compound selected from the group of compounds represented by formula (7-1-1) to formula (7-1-29):

(7-1-1)

(7-1-2)

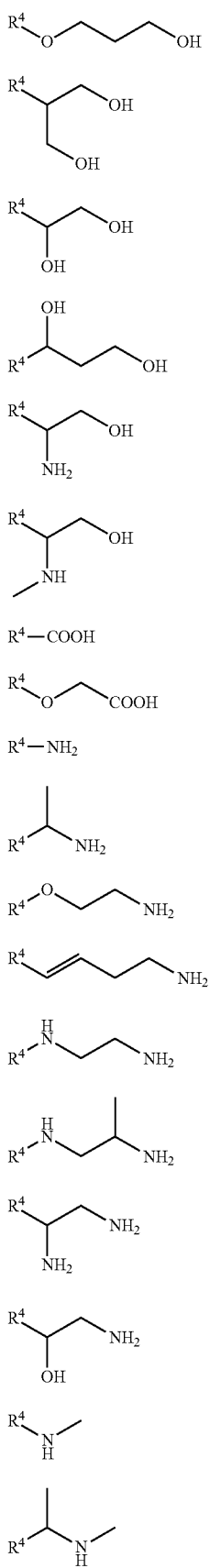
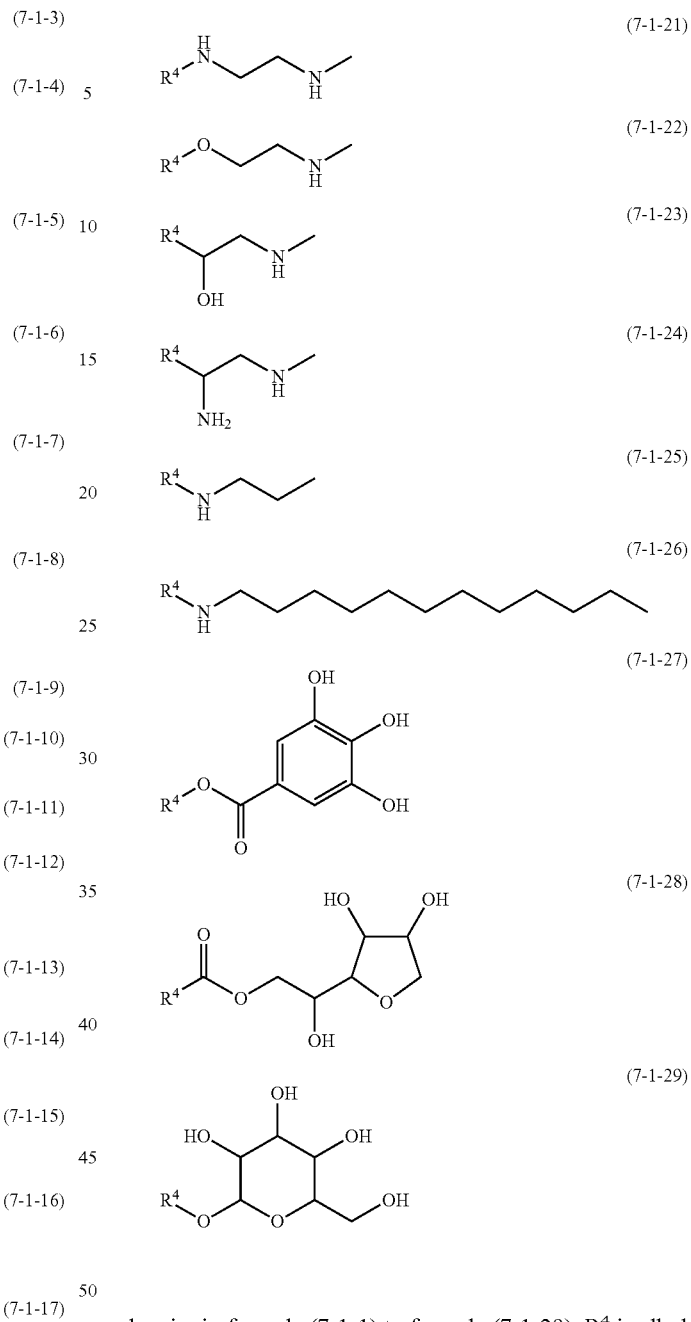

wherein, in formula (7-1-1) to formula (7-1-29), $R^4$ is alkyl having 4 to 20 carbons, and in the alkyl, at least one piece of —$CH_2$— may be replaced by —CH=CH—, —CF=CH—, —CH=CF—, —C≡C— or cycloalkylene having 3 to 8 carbons, and in the groups, at least one hydrogen may be replaced by fluorine or chlorine.

Item 20. The liquid crystal composition according to any one of items 1 to 19, wherein a proportion of the first additive is 10% by weight or less based on the weight of the liquid crystal composition.

Item 21. The liquid crystal composition according to any one of items 1 to 20, containing at least one polymerizable compound selected from the group of compounds represented by formula (8) as the second additive:

(8)

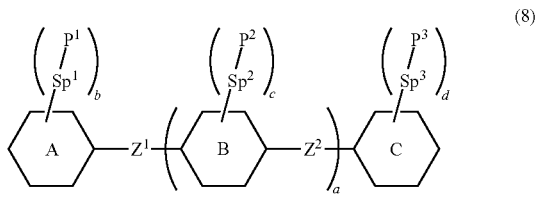

wherein, in formula (8), ring A and ring C are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring B is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^1$ and $Z^2$ are independently a single bond or alkylene having 1 to 10 carbons, and in the alkylene, at least one piece of —CH$_2$— may be replaced by —O—, —CO—, —COO— or —OCO—, and at least one piece of —CH$_2$CH$_2$— may be replaced by —CH=CH—, —C(CH$_3$)=CH—, —CH=C(CH$_3$)— or —C(CH$_3$)=C(CH$_3$)—, and in the groups, at least one hydrogen may be replaced by fluorine or chlorine; $P^1$, $P^2$ and $P^3$ are a polymerizable group; $Sp^1$, $Sp^2$ and $Sp^3$ are independently a single bond or alkylene 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH=CH— or —C≡C—, and in the groups, at least one hydrogen may be replaced by fluorine or chlorine; a is 0, 1 or 2; and b, c and d are independently 0, 1, 2, 3 or 4.

Item 22. The liquid crystal composition according to item 21, wherein, in formula (8) according to item 21, $P^1$, $P^2$ and $P^3$ are independently a polymerizable group selected from the group of groups represented by formula (P-1) to formula (P-5):

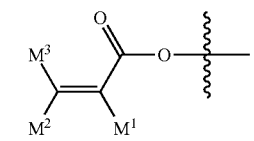
(P-1)

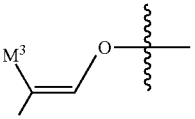
(P-2)

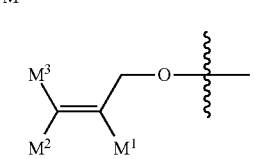
(P-3)

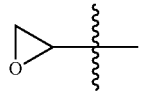
(P-4)

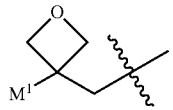
(P-5)

wherein, in formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

Item 23. The liquid crystal composition according to any one of items 1 to 22, wherein the second additive is at least one polymerizable compound selected from the group of compounds represented by formula (8-1) to formula (8-28):

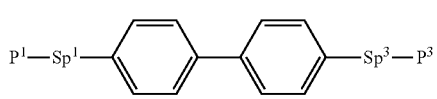
(8-1)

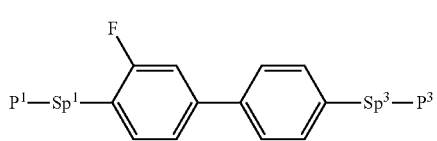
(8-2)

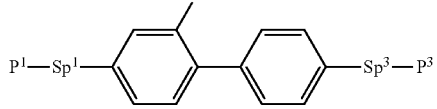
(8-3)

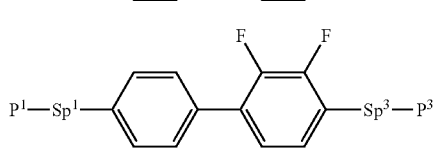
(8-4)

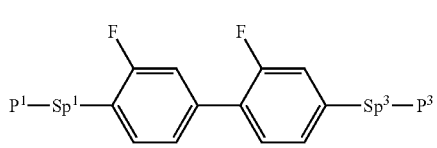
(8-5)

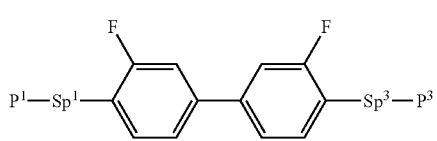
(8-6)

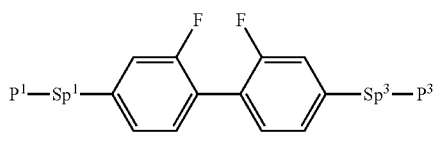
(8-7)

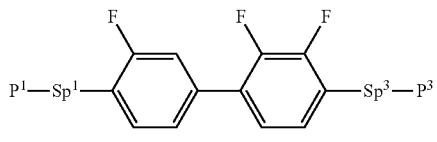
(8-8)

(8-9)
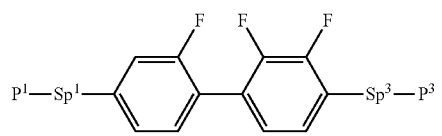
(8-10)
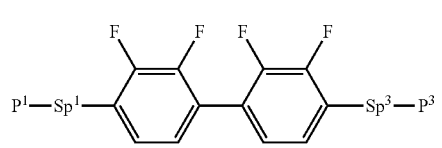
(8-11)
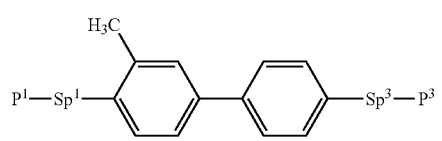
(8-12)
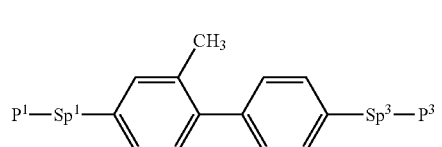
(8-13)
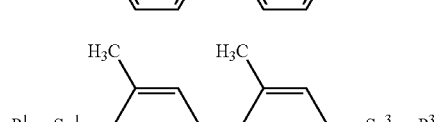
(8-14)
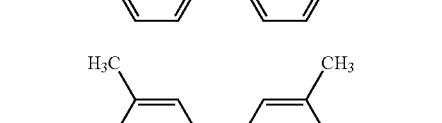
(8-15)
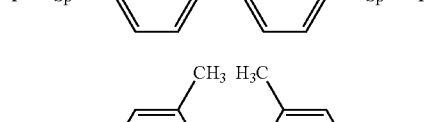
(8-16)
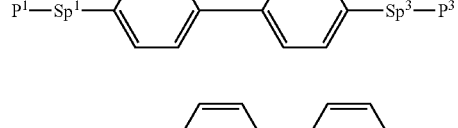
(8-17)
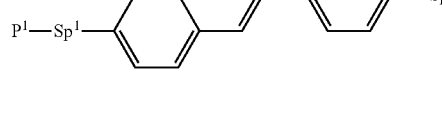
(8-18)
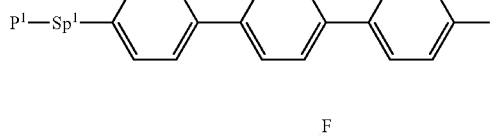
(8-19)
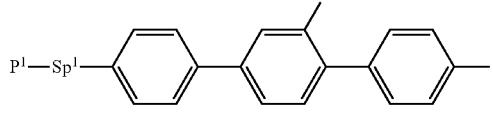
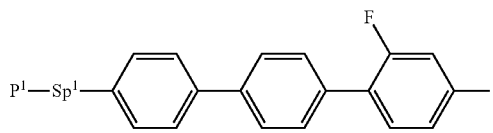
(8-20)
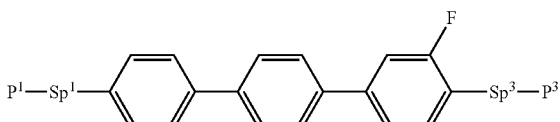
(8-21)
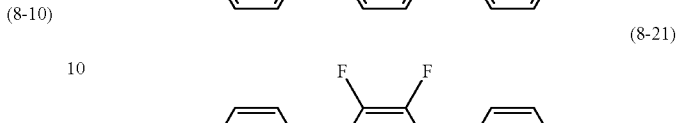
(8-22)
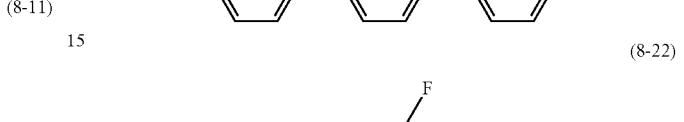
(8-23)
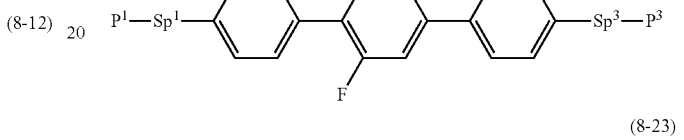
(8-24)
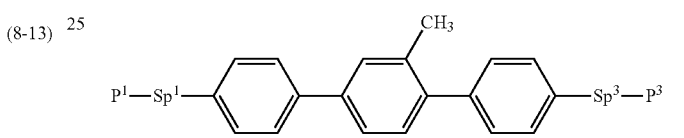
(8-25)
(8-26)
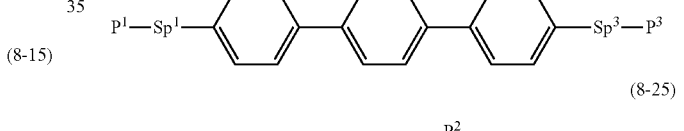
(8-27)
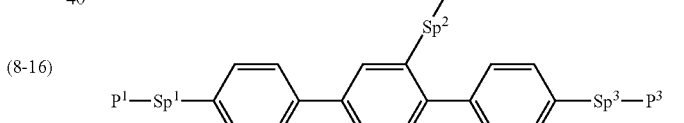
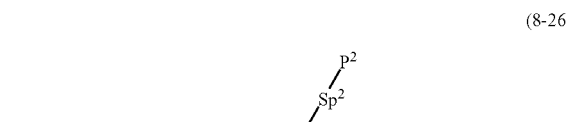
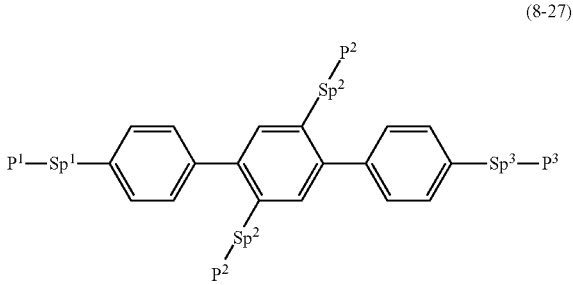

-continued (8-28)

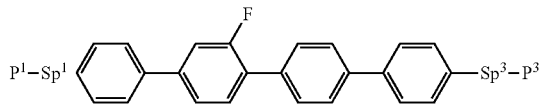

wherein, in formula (8-1) to formula (8-28), $P^1$, $P^2$ and $P^3$ are independently a polymerizable group selected from the group of groups represented by formula (P-1) to formula (P-3), in which $M^1$, $M^2$ and $M^3$ are independently hydrogen, fluorine, alkyl having 1 to 5 carbons, or alkyl having 1 to 5 carbons in which at least one hydrogen is replaced by fluorine or chlorine;

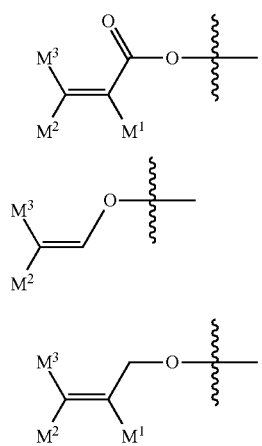

wherein, $Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH=CH— or —C≡C—, and in the groups, at least one hydrogen may be replaced by fluorine or chlorine.

Item 24. The liquid crystal composition according to any one of items 21 to 23, wherein a proportion of the second additive is in the range of 0.03% by weight to 10% by weight based on the weight of the liquid crystal composition.

Item 25. A liquid crystal display device, including the liquid crystal composition according to any one of items 1 to 24.

Item 26. The liquid crystal display device according to item 25, wherein an operating mode in the liquid crystal display device includes an IPS mode, a TN mode, an FFS mode or an FPA mode, and a driving mode in the liquid crystal display device includes an active matrix mode.

Item 27. A polymer sustained alignment mode liquid crystal display device, wherein the liquid crystal display device includes the liquid crystal composition according to any one of items 1 to 24, or a polymerizable compound in the liquid crystal composition is polymerized.

Item 28. A polymer sustained alignment mode liquid crystal display device having no alignment film, wherein the liquid crystal display device includes the liquid crystal composition according to any one of items 1 to 24, or a polymerizable compound in the liquid crystal composition is polymerized.

Item 29. Use of the liquid crystal composition according to any one of items 1 to 24 in a liquid crystal display device.

Item 30. Use of the liquid crystal composition according to any one of items 1 to 24 in a polymer sustained alignment mode liquid crystal display device.

Item 31. Use of the liquid crystal composition according to any one of items 1 to 24 in a liquid crystal display device having no alignment film.

The invention further includes the following items: (a) a method of producing the liquid crystal display device by arranging the liquid crystal composition between two substrates, irradiating the composition with light while applying voltage to the composition, and polymerizing a polymerizable compound contained in the composition; and (b) the liquid crystal composition, wherein a maximum temperature of a nematic phase is 70° C. or higher, optical anisotropy (measured at 25° C.) at a wavelength of 589 nanometers is 0.08 or more and dielectric anisotropy (measured at 25° C.) at a frequency of 1 kHz is 2 or more.

The invention further includes the following items: (c) the composition containing at least two polymerizable compounds (8) described above; (d) the composition further containing a polymerizable compound different from polymerizable compounds (8) described above; (e) the composition, further containing one, two or at least three additives, such as an optically active compound, an antioxidant, an ultraviolet light absorber, a dye, an antifoaming agent, a polymerizable compound, a polymerization initiator, a polymerization inhibitor and a polar compound; (f) an AM device including the composition; (g) a device including the composition, and having a TN, ECB, OCB, IPS, FFS, VA or FPA mode; (h) a transmissive device including the composition; (i) use of the composition as the composition having the nematic phase; and (j) use as an optically active composition by adding the optically active compound to the composition.

The composition of the invention will be described in the following order. First, a constitution of the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compounds will be described. Sixth, an additive that may be added to the composition will be described. Seventh, methods for synthesizing the component compounds will be described. Last, an application of the composition will be described.

First, the constitution of the composition will be described. The composition of the invention is classified into composition A and composition B. Composition A may further contain any other liquid crystal compound, an additive or the like in addition to the liquid crystal compound selected from compound (1), compound (2), compound (3), compound (4) and compound (5). "Any other liquid crystal compound" means a liquid crystal compound different from compound (1) to compound (5). Such a compound is mixed with the composition for the purpose of further adjusting the characteristics. The additive is the optically active compound, the antioxidant, the ultraviolet light absorber, the dye, the antifoaming agent, the polymerizable compound, the polymerization initiator, the polymerization inhibitor, the polar compound or the like.

Composition B consists essentially of the liquid crystal compound selected from compound (1) to compound (5). An expression "essentially" means that the composition may contain the additive, but contains no any other liquid crystal compound. Composition B has a smaller number of components than composition A has. Composition B is preferred to composition A in view of cost reduction. Composition A is preferred to composition B in view of possibility of further adjusting the characteristics by mixing any other liquid crystal compound. An example of composition B is a mixture of compound (1) and compound (2). The mixture may further contain one or two compounds selected from compound (3), compound (4) and compound (5).

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium" and a symbol S stands for "small" or "low." The symbols L, M and S represent a classification based on a qualitative comparison among the component compounds, and symbol 0 (zero) means that a value is zero or close to zero.

TABLE 2

Characteristics of Compounds

| Characteristics | (1) | (2) | (3) | (4) | (5) |
|---|---|---|---|---|---|
| Maximum temperature | S to L | M | S to L | S to L | S to M |
| Viscosity | M to L | S | S to M | M to L | L |
| Optical anisotropy | M to L | S | M to L | M to L | M to L |
| Dielectric anisotropy | L[1)] | 0 | 0 | S to L[1)] | L[2)] |
| Specific resistance | L | L | L | L | L |

[1)] A value of dielectric anisotropy is positive, and the symbol represents magnitude of an absolute value.
[2)] A value of dielectric anisotropy is negative, and the symbol represents magnitude of an absolute value.

Upon mixing the component compounds with the composition, the main effects of the component compounds on the characteristics of the composition are as described below. Compound (1) increases the dielectric anisotropy. Compound (2) decreases the viscosity. Compound (3) increases the maximum temperature or decreases the minimum temperature. Compound (4) increases the dielectric anisotropy and decreases the minimum temperature. Compound (5) increases the dielectric constant in a minor axis direction. Compound (6) and compound (7) are adsorbed on a substrate surface by action of the polar group, and control alignment of liquid crystal molecules. Compound (8) gives a polymer by polymerization. The polymer stabilizes the alignment of the liquid crystal molecules, and therefore shortens a response time of the device and improves image persistence. A polymer of compound (8) is effective in view of the alignment of the liquid crystal molecules. Compound (6) or compound (7) is also effective. A combination of compound (8) and compound (6) or a combination of compound (8) and compound (7) is further effective. A synergistic effect can be expected by the combination. A better long-term stability than the stability of compound (6) only or compound (7) only can be expected by the combination.

Third, the combination of components in the composition, the preferred proportion of the components and the basis thereof will be described. Preferred combinations of components in the composition include a combination of compound (1), compound (2), compound (3), compound (6) and compound (8), a combination of compound (1), compound (2), compound (3), compound (7) and compound (8), a combination of compound (1), compound (2), compound (4), compound (6) and compound (8), a combination of compound (1), compound (2), compound (4), compound (7) and compound (8), a combination of compound (1), compound (2), compound (3), compound (6), compound (7) and compound (8) or a combination of compound (1), compound (2), compound (4), compound (6), compound (7) and compound (8).

Another preferred combinations of components include a combination of compound (1), compound (2), compound (3), compound (4), compound (6) and compound (8), a combination of compound (1), compound (2), compound (3), compound (4), compound (7) and compound (8), a combination of compound (1), compound (2), compound (3), compound (4), compound (6), compound (7) and compound (8), a combination of compound (1), compound (2), compound (3), compound (5), compound (6) and compound (8), a combination of compound (1), compound (2), compound (3), compound (5), compound (7) and compound (8) or a combination of compound (1), compound (2), compound (3), compound (5), compound (6), compound (7) and compound (8).

Another preferred combination of components includes a combination of compound (1), compound (2), compound (4), compound (5), compound (6) and compound (8), a combination of compound (1), compound (2), compound (4), compound (5), compound (7) and compound (8), a combination of compound (1), compound (2), compound (4), compound (5), compound (6), compound (7) and compound (8), a combination of compound (1), compound (2), compound (3), compound (4), compound (5), compound (6) and compound (8), a combination of compound (1), compound (2), compound (3), compound (4), compound (5), compound (7) and compound (8) or a combination of compound (1), compound (2), compound (3), compound (4), compound (5), compound (6), compound (7) and compound (8). A further preferred combination includes a combination of compound (1), compound (2), compound (3), compound (4), compound (6) and compound (8).

A preferred proportion of compound (1) is about 5% by weight or more for increasing the dielectric anisotropy, and about 55% by weight or less for decreasing the minimum temperature or for decreasing the viscosity. A further preferred proportion is in the range of about 5% by weight to about 45% by weight. A particularly preferred proportion is in the range of about 10% by weight to about 35% by weight.

A preferred proportion of compound (2) is about 5% by weight or more for decreasing the viscosity, and about 50% by weight or less for increasing the dielectric anisotropy. A further preferred proportion is in the range of about 5% by weight to about 40% by weight. A particularly preferred proportion is in the range of about 10% by weight to about 30% by weight.

A preferred proportion of compound (3) is about 3% by weight or more for increasing the maximum temperature or for decreasing the viscosity, and about 55% by weight or less for increasing the dielectric anisotropy. A further preferred proportion is in the range of about 5% by weight to about 45% by weight. A particularly preferred proportion is in the range of about 5% by weight to about 35% by weight.

A preferred proportion of compound (4) is about 5% by weight for increasing the dielectric anisotropy, and about 50% by weight or less for decreasing the minimum temperature. A further preferred proportion is in the range of about 5% by weight to about 40% by weight. A particularly preferred proportion is in the range of about 5% by weight to about 25% by weight.

A preferred proportion of compound (5) is about 3% by weight or more for increasing the dielectric anisotropy, and about 25% by weight or less for decreasing the minimum temperature. A further preferred proportion is in the range of about 5% by weight to about 20% by weight. A particularly preferred proportion is in the range of about 5% by weight to about 15% by weight.

Compound (6) or compound (7) is added to the composition for the purpose of controlling the alignment of the liquid crystal molecules. A preferred proportion of compound (6) or compound (7) is about 0.05% by weight or more for aligning the liquid crystal molecules, and about 10% by weight or less for preventing poor display of the device. A further preferred proportion is in the range of about 0.1% by weight to about 7% by weight. A particularly preferred proportion is in the range of about 0.5% by weight to about 5% by weight.

Compound (8) is added to the composition for the purpose of adapting the composition to the polymer sustained alignment mode device. A preferred proportion of compound (8) is about 0.03% by weight or more for improving long-term reliability of the device, and about 10% by weight or less for preventing the poor display of the device. A further preferred proportion is in the range of about 0.1% by weight to about 2% by weight. A particularly preferred proportion is in the range of about 0.2% by weight to about 1.0% by weight.

Fourth, the preferred embodiment of the component compounds will be described. In formula (1), formula (3), formula (4) and formula (5), $R^{1a}$ and $R^{5a}$ are independently alkyl having 1 to 12 carbons, alkoxy having 1 to 12 carbons or alkenyl having 2 to 12 carbons. Preferred $R^{1a}$ or $R^{5a}$ is alkyl having 1 to 12 carbons for increasing stability to ultraviolet light or heat. $R^{3a}$ and $R^{4a}$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine or chlorine. Preferred $R^{3a}$ or $R^{4a}$ is alkyl having 1 to 12 carbons for increasing the stability to ultraviolet light or heat, and alkenyl having 2 to 12 carbons for decreasing the minimum temperature or for decreasing the viscosity.

$R^{6a}$ and $R^{7a}$ are independently alkyl having 1 to 12 carbons, alkoxy having 1 to 12 carbons, alkenyl having 2 to 12 carbons or alkenyloxy having 2 to 12 carbons. Preferred $R^{6a}$ or $R^{7a}$ is alkyl having 1 to 12 carbons for increasing the stability, and alkoxy having 1 to 12 carbons for increasing the dielectric anisotropy. Alkyl is straight-chain alkyl or branched-chain alkyl, but includes no cyclic alkyl. Straight-chain alkyl is preferred to branched-chain alkyl. A same rule applies also to a terminal group such as alkoxy and alkenyl.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. For decreasing the viscosity, and so forth, in alkenyl such as 1-propenyl, 1-butenyl, 1-pentenyl, 1-hexenyl, 3-pentenyl and 3-hexenyl, trans is preferred. Cis is preferred in alkenyl such as 2-butenyl, 2-pentenyl and 2-hexenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Preferred examples of alkenyl in which at least one hydrogen is replaced by fluorine or chlorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Ring Q and ring S are independently 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Preferred ring Q or ring S is 1,4-phenylene, 2-fluoro-1,4-phenylene or 2,6-difluoro-1,4-phenylene for increasing the optical anisotropy. Ring U and ring V are independently 1,4-cyclohexylene, 1,4-phenylene, 2-fluoro-1,4-phenylene or 2,5-difluoro-1,4-phenylene, in which, when u is 1, ring V is 1,4-phenylene, 2-fluoro-1,4-phenylene or 2,5-difluoro-1,4-phenylene. Preferred ring U or ring V is 1,4-cyclohexylene for decreasing the viscosity, and 1,4-phenylene for increasing the optical anisotropy. Ring W is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Preferred ring W is 1,4-phenylene or 2-fluoro-1,4-phenylene for increasing the optical anisotropy.

Ring D and ring F are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl. Preferred ring D or ring F is 1,4-cyclohexylene for decreasing the viscosity, tetrahydropyran-2,5-diyl for increasing the dielectric anisotropy, and 1,4-phenylene for increasing the optical anisotropy. Ring E is 2,3-difluoro-1,4-phenylene, 2-chloro-3-fluoro-1,4-phenylene, 2,3-difluor-5-methyl-1,4-phenylene, 3,4,5-trifluoronaphthalene-2,6-diyl or 7,8-difluorochroman-2,6-diyl. Preferred ring E is 2,3-difluoro-1,4-phenylene for increasing the dielectric anisotropy. With regard to the configuration of 1,4-cyclohexylene, trans is preferred to cis for increasing the maximum temperature. Tetrahydropyran-2,5-diyl includes:

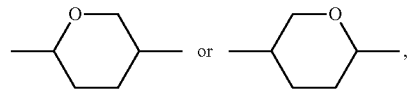

preferably

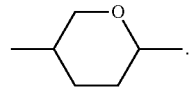

Then, q is 1, 2, 3 or 4, and s is 0, 1, 2 or 3, and a sum of q and s is 4 or less. Preferred q is 2 or 3 for increasing the dielectric anisotropy. Preferred s is 0 or 1 for decreasing the minimum temperature. Then, u is 1, 2 or 3. Preferred u is 1 for decreasing the viscosity, and 2 for decreasing the minimum temperature. Then, w is 1, 2, 3 or 4. Preferred w is 2 or 3 for increasing the dielectric anisotropy. Then, e is 1, 2 or 3, f is 0 or 1, and a sum of e and f is 3 or less. Preferred e is 1 for decreasing the viscosity, and 2 or 3 for increasing the maximum temperature. Preferred f is 0 for decreasing the viscosity, and 1 for decreasing the minimum temperature.

$Z^{1a}$ and $Z^{2a}$ are independently a single bond, —$CH_2CH_2$—, —CH=CH—, —$CH_2O$—, —$OCH_2$—, —COO—, —OCO—, —$CF_2O$— or —$OCF_2$—. Preferred $Z^{1a}$ or $Z^{2a}$ is a single bond for decreasing the viscosity. $Z^{3a}$ is a single bond, —$CH_2CH_2$—, —COO— or —OCO—. Preferred $Z^{3a}$ is a single bond for decreasing the viscosity. $Z^{4a}$ is a single bond, —$CH_2CH_2$—, —COO— or —OCO—. Preferred $Z^{4a}$ is a single bond for decreasing the viscosity. $Z^{5a}$ and $Z^{6a}$ are independently a single bond, —$CH_2CH_2$—, —COO—, —OCO—, —$CH_2O$— or —$OCH_2$—. Preferred $Z^{5a}$ or $Z^{6a}$ is a single bond for decreasing the viscosity, and —$CH_2O$— or —$OCH_2$— for increasing the dielectric anisotropy.

$X^{1a}$, $X^{2a}$, $X^{3a}$, $X^{4a}$, $X^{5a}$, $X^{6a}$, $X^{7a}$, $X^{8a}$, $X^{9a}$, $X^{10a}$, $X^{11a}$, $X^{12a}$, $X^{13a}$, $X^{14a}$, $X^{15a}$ and $X^{16a}$ are independently hydrogen or fluorine. Preferred $X^{1a}$, $X^{2a}$, $X^{3a}$, $X^{4a}$, $X^{5a}$, $X^{6a}$, $X^{7a}$, $X^{8a}$, $X^{9a}$, $X^{10a}$, $X^{11a}$, $X^{12a}$, $X^{13a}$, $X^{14a}$, $X^{15a}$ or $X^{16a}$ is fluorine for increasing the dielectric anisotropy.

$Y^{1a}$ and $Y^{2a}$ are independently fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine. Preferred $Y^{1a}$ or $Y^{2a}$ is fluorine for decreasing the minimum temperature. Preferred examples of the alkyl in which at least one hydrogen is replaced by fluorine or chlorine include trifluoromethyl. Preferred examples of the alkoxy in which at least one hydrogen is replaced by fluorine or chlorine include trifluoromethoxy. Preferred examples of the alkenyloxy in which at least one hydrogen is replaced by fluorine or chlorine include trifluorovinyloxy.

In formula (6) and formula (7), $R^5$ is a polar group. The polar compound is added to the composition, and therefore is preferably stable. When the polar compound is added to the composition, the compound preferably does not decrease the voltage holding ratio of the device. The polar compound preferably has low volatility. Preferred molar mass is 130 g/mol or more. Further preferred molar mass is in the range of 150 g/mol to 500 g/mol. A preferred polar compound has no polymerizable group such as acryloyloxy (—OCO—CH=$CH_2$) and methacryloyloxy (—OCO—($CH_3$)C=$CH_2$).

The polar group has noncovalent bond interaction with a surface of a glass substrate or a metal oxide film. A preferred polar group includes a hetero atom selected from nitrogen, oxygen, sulfur and phosphorus. A preferred polar group includes at least one or at least two hetero atoms. A further preferred polar group is a monovalent group derived therefrom by eliminating hydrogen from a compound selected from the group of alcohol, primary, secondary and tertiary amine, ketone, carboxylic acid, thiol, ester, ether, thioether and a combination thereof. The groups may have a straight-chain structure, a branched-chain structure, a cyclic structure or a combination thereof. A particularly preferred polar group has at least one oxygen atom having an OH structure or at least one nitrogen atom having a primary, secondary or tertiary amine structure.

Examples of polar group $R^5$ include a group represented by formula (A1) to formula (A4).

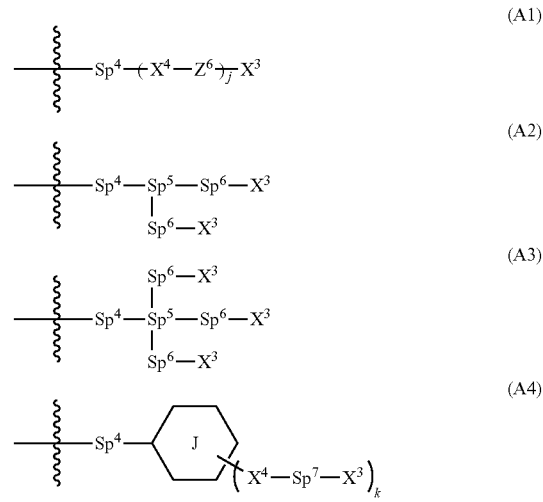

In formula (A1) to formula (A4), $Sp^4$, $Sp^6$ and $Sp^7$ are independently a single bond or a group (-Sp"-X"—), and X" is bonded to an MES group or $R^4$. Sp" is alkylene having 1 to 20 carbons, and is preferably alkylene having 1 to 12 carbons, and in the alkylene, at least one piece of —$CH_2$— may be replaced by —O—, —S—, —NH—, —N($R^0$)—, —CO—, —CO—O—, —O—CO—, —O—CO—O—, —S—CO—, —CO—S—, —N($R^0$)—CO—O—, —O—CO—N($R^0$)—, —N($R^0$)—CO—N($R^0$)—, —CH=CH— or —C≡C—, and in the groups, at least one hydrogen may be replaced by fluorine, chlorine or —CN, and X" is —O—, —S—, —CO—, —CO—O—, —O—CO—, —O—CO—O—, —CO—N($R^0$)—, —N($R^0$)—CO—, —N($R^0$)—CO—N($R^0$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—CO—O—, —O—CO—CH=CH— or a single bond, in which $R^0$ is hydrogen or alkyl having 1 to 12 carbons, and $Y^2$ and $Y^3$ are independently hydrogen, fluorine, chlorine or —CN. Preferred X" is —O—, —S—, —CO—, —COO—, —OCO—, —O—COO—, —CO—$NR^0$—, —$NR^0$—CO—, —$NR^0$—CO—$NR^0$— or a single bond. $Sp^5$ is >CH—, >$CR^{11}$—, >N— or >C<. More specifically, $Sp^5$ in formula (A2) means >CH—, >$CR^{11}$— or >N—, and $Sp^5$ in formula (A3) means >C<.

Preferred Sp" is —$(CH_2)_{p1}$—, —($CH_2CH_2O)_{q1}$—$CH_2CH_2$—, —$CH_2CH_2$—S—$CH_2CH_2$— or —$CH_2CH_2$—$NHCH_2CH_2$—, in which p1 is an integer from 1 to 12 and q1 is an integer from 1 to 3. Preferred group (-Sp"-X"—) is —$(CH_2)_{p1}$—, —$(CH_2)_{p1}$—O—, —$(CH_2)_{p1}$—O—CO— or —$(CH_2)_{p1}$—O—CO—O—, in which p1 and q1 have the meaning described above. Further preferred group Sp" is ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

$X^3$ is —$NH_2$, —$NHR^{11}$, —$N(R^{11})_2$, —$OR^{11}$, —OH, —COOH, —SH, —$SR^{11}$,

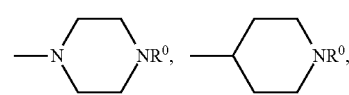

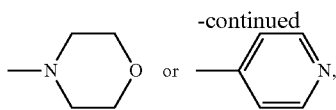

in which $R^{11}$ is alkyl having 1 to 15 carbons, and in the alkyl, at least one piece of —$CH_2$— may be replaced by —C≡C—, —CH=CH—, —COO—, —OCO—, —CO— or —O—, and in the groups, at least one hydrogen may be replaced by fluorine or chlorine, and $R^0$ is hydrogen or alkyl having 1 to 12 carbons.

$X^4$ is —O—, —CO—, —NH—, —$NR^{11}$—, —S— or a single bond, and $Z^6$ is alkylene having 1 to 15 carbons, an alicyclic group having 5 to 6 carbons or a combination thereof, and in the groups, at least one hydrogen may be replaced by —OH, —$OR^{11}$, —COOH, —$NH_2$, —$NHR^{11}$, —$N(R^{11})_2$, fluorine or chlorine, in which $R^{11}$ has the meaning described above. Then, j is 0, 1, 2 or 3.

Particularly preferred nitrogen-containing group $R^5$ is —$NH_2$, —NH—$(CH_2)_{n3}$H, —$(CH_2)_n$—$NH_2$, —$(CH_2)_n$—NH—$(CH_2)_{n3}$H, —NH—$(CH_2)_n$—$NH_2$, —NH—$(CH_2)_n$—NH—$(CH_2)_{n3}$H, —$(CH_2)_{n1}$—NH—$(CH_2)_{n2}$—$NH_2$, —$(CH_2)_{n1}$—NH—$(CH_2)_{n2}$—NH—$(CH_2)_{n3}$H, —O—$(CH_2)_n$—$NH_2$, —$(CH_2)_{n1}$—O—$(CH_2)_n$—$NH_2$, —$(CH_2)_{n1}$—NH—$(CH_2)_{n2}$—OH, —O—$(CH_2)_{n1}$—NH—$(CH_2)_{n2}$—$NH_2$, —O—$(CH_2)_{n1}$—NH—$(CH_2)_{n2}$—OH or —$(CH_2)_{n1}$—NH—$(CH_2)_{n2}$—NH—$(CH_2)_{n3}$H, in which n, n1, n2 and n3 are independently an integer from 1 to 12, and are preferably 1, 2, 3 or 4.

Particularly preferred nitrogen-noncontaining group $R^5$ is —OH, —$(CH_2)_n$—OH, —O—$(CH_2)_n$—OH, —[O—$(CH_2)_{n1}$-$]_{n2}$—OH, —COOH, —$(CH_2)_n$—COOH, —O—$(CH_2)_n$—COOH or —[O—$(CH_2)_{n1}$-$]_{n2}$—COOH, in which n, n1 and n2 are independently an integer from 1 to 12, and are preferably 1, 2, 3 or 4.

From a viewpoint of high solubility in the liquid crystal composition, $R^5$ is particularly preferably —OH or —$NH_2$. Then, —OH has high anchor force, and therefore is further preferred to —O—, —CO— or —COO—. A group containing a plurality of hetero atoms (nitrogen, oxygen) is particularly preferred. A compound having such a polar group is effective even at a low concentration.

In formula (6), MES is a mesogen group having at least one ring. The mesogen group is known by those skilled in the art. The mesogen group means a moiety contributing to formation of a liquid crystal phase when the compound has the liquid crystal phase (mesophase). Preferred examples of compound (6) include compound (6-1).

In formula (6-1), ring G and ring I are independently an aromatic group having 6 to 25 carbons, a heteroaromatic group having 5 to 25 carbons, an alicyclic group having 3 to 25 carbons or a heteroalicyclic group having 4 to 25 carbons, and the groups may be a condensed ring, and in the groups, at least one hydrogen may be replaced by group T, and in the group, the preferred number of carbons is 4 to 25. The meaning of group T will be described in a last part of the present paragraph. Preferred ring G or ring I is 1,4-phenylene, naphthalene-1,4-diyl or naphthalene-2,6-diyl (in the three groups, at least one tertiary carbon (>CH—) may be replaced by nitrogen (>N—)), 1,4-cyclohexylene (in the group, at least one piece of —$CH_2$— may be replaced by —O— or —S—), 3,3'-bicyclobutylidene, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indan-2,5-diyl, octahydro-4,7-methanoindan-2,5-diyl or perhydrocyclopenta[a]phenanthrene-3,17-diyl (particularly, gonane-3,17-diyl), and in the groups, at least one hydrogen may be replaced by group T, in which group T is —OH, —$(CH_2)_i$—OH, halogen, —CN, —$NO_2$, —NCO, —NCS, —OCN, —SCN, —C(=O)N$(R^0)_2$, —C(=O)$R^0$, —N$(R^0)_2$, —$(CH_2)_i$—N$(R^0)_2$, aryl or heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy or alkoxycarbonyloxy having 2 to 25 carbons, and in the groups, at least one hydrogen may be replaced by fluorine or chlorine, in which $R^0$ is hydrogen or alkyl having 1 to 12 carbons, and i is 1, 2, 3 or 4.

$Z^5$ is a single bond, —O—, —S—, —CO—, —COO—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_i$—, —$CF_2CH_2$—, —$CH_2CF_2$—, —$(CF_2)_i$—, —CH=CH—, —CF=CF—, —C≡C—, —CH=CH—COO—, —OCO—CH=CH— or —C$(R^0)_2$—. $R^0$ is hydrogen or alkyl having 1 to 12 carbons, and i is 1, 2, 3 or 4. Preferred $Z^5$ is a single bond.

$R^5$ is alkyl having 1 to 25 carbons, and in the alkyl, at least one piece of —$CH_2$— may be replaced by —$NR^0$—, —O—, —S—, —CO—, —COO—, —OCO—, —OCOO— or cycloalkylene having 3 to 8 carbons, in which $R^0$ is hydrogen or alkyl having 1 to 12 carbons, and at least one tertiary carbon (>CH—) may be replaced by nitrogen (>N—), and at least one hydrogen may be replaced by fluorine or chlorine, in which $R^5$ has at least one of an oxygen atom having an OH structure, a sulfur atom having an SH structure, and a nitrogen atom having a primary, secondary or tertiary amine structure. Preferred $R^5$ has at least one piece of >NH, —OH or —SH. $R^6$ is hydrogen, halogen, alkyl having 1 to 25 carbons, and in the alkyl, at least one piece of —$CH_2$— may be replaced by —$NR^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least one hydrogen may be replaced by fluorine or chlorine, in which $R^0$ is hydrogen or alkyl having 1 to 12 carbons. Preferred $R^6$ is alkyl.

An aromatic group refers to aryl or substituted aryl. A heteroaromatic group refers to heteroaryl or substituted heteroaryl. Heteroaryl represents an aromatic group containing at least one hetero atom. Aryl and heteroaryl may be either monocyclic or polycyclic. More specifically, the above groups have at least one ring, and the ring may be condensed (for example, naphthyl), and the two rings may be linked by a covalent bond (for example, biphenyl), or may have a combination of a condensed ring and a linkage. Preferred heteroaryl contains at least one hetero atom selected from the group of nitrogen, oxygen, sulfur and phosphorus.

Preferred aryl or heteroaryl may have 6 to 25 carbons, and may be a five-membered ring, a six-membered ring or a seven membered-ring. Preferred aryl or heteroaryl may be monocyclic, bicyclic or tricyclic. The above groups may be a condensed ring, or may be substituted.

Preferred aryl is a monovalent group derived therefrom by eliminating one hydrogen from benzene, biphenyl, terphenyl, [1,1':3',1"]terphenyl, naphthalene, anthracene, binaphtyl, phenanthrene, pyrene, dihydropyrene, chrysene, perylene, tetracene, pentacene, benzopyrene, fluorene, indene, indeno fluorene and spirobifluorene.

Preferred heteroaryl is a monovalent group derived therefrom by eliminating one hydrogen from a five-membered ring compound such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole and 1,3,4-thiadiazole, or from a six-membered ring compound such as pyridine, pyridazine, pyrimidine, pyrazine, 1,3,5-triazine, 1,2,4-triazine, 1,2,3-triazine, 1,2,4,5-tetrazine, 1,2,3,4-tetrazine and 1,2,3,5-tetrazine.

Another preferred heteroaryl is a monovalent group derived therefrom by eliminating one hydrogen from a condensed ring compound such as indole, isoindole, indolizine, indazole, benzimidazole, benzotriazol, purine, naphthimidazole, phenanthoraimidazole, pyridaimidazole, pyrazineimidazole, quinoxalineimidazole, benzoxazole, naphthaxazole, antroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzo pyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene and benzothiadiazothiophene. Preferred heteroaryl is also a monovalent group derived therefrom by eliminating one hydrogen from a ring obtained by combining two groups selected from the five-membered ring, the six-membered ring and the condensed ring. The heteroaryl may be replaced by alkyl, alkoxy, thioalkyl, fluorine, fluoroalkyl, aryl or heteroaryl.

An alicyclic group and a heteroalicyclic group may be saturated or may be unsaturated. More specifically, the above groups may have only a single bond or may have a combination of a single bond and a multiple bond. A saturated ring is preferred to an unsaturated ring. A preferred heteroalicyclic group contains at least one hetero atom selected from nitrogen, oxygen, sulfur and phosphorus.

An alicyclic group and a heteroalicyclic group may have one ring, or a plurality of rings. Preferred examples of the groups include a monocyclic ring, a bicyclic ring or a tricyclic ring each having 3 to 25 carbons, and the groups may be a condensed ring or may be substituted. Preferred examples of the groups include a five-membered ring, a six-membered ring, a seven membered-ring or an eight membered-ring, and in the groups, at least one carbon may be replaced by silicon, and at least one piece of >CH— may be replaced by >N—, and at least one piece of —CH$_2$— may be replaced by —O— or —S—.

A preferred alicyclic group and heteroalicyclic group is a divalent group derived therefrom by eliminating two hydrogens from a five-membered ring such as cyclopentane, tetrahydrofuran, tetrahydrothiofuran and pyrrolidine; a six-membered ring such as cyclohexane, cyclohexene, tetrahydropyran, tetrahydrothiopyran, 1,3-dioxane, 1,3-dithian and piperidine; a seven membered-ring such as cycloheptane; and a condensed ring such as tetrahydronaphthalene, decahydronaphthalene, indan, bicyclo[1.1.1]pentane, bicyclo[2.2.2]octane, spiro[3.3]heptane and octahydro-4,7-methanoindan.

Then, h is 0, 1, 2, 3, 4 or 5.

In formula (7), $R^4$ is alkyl having 4 to 20 carbons, and in the alkyl, at least one piece of —CH$_2$— may be replaced by —CH=CH—, —CF=CH—, —CH=CF—, —C≡C— or cycloalkylene having 3 to 8 carbons, and at least one hydrogen may be replaced by fluorine or chlorine. Then, g is 1 or 2, and is preferably 1.

Preferred $R^4$ is alkyl having 4 to 20 carbons. Further preferred $R^4$ is alkyl having 6 to 18 carbons. At least one piece of —CH$_2$— may be replaced by —CH=CH—, —CF=CH—, —CH=CF—, —C≡C— or —O—, and at least one hydrogen may be replaced by fluorine or chlorine.

Particularly preferred compound (6-1) is selected from the compounds described below.

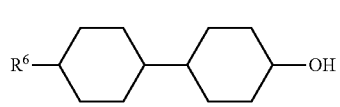 (6-1-1-1)

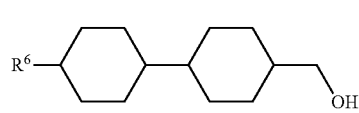 (6-1-1-2)

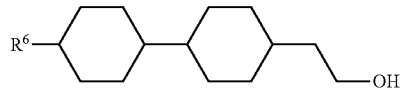 (6-1-1-3)

 (6-1-1-4)

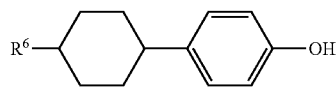 (6-1-1-5)

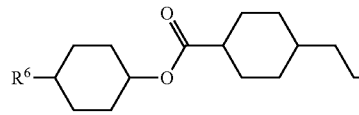 (6-1-1-6)

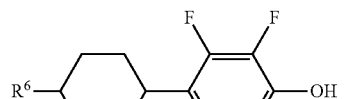 (6-1-1-7)

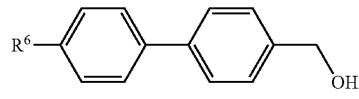 (6-1-1-8)

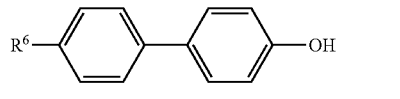 (6-1-1-9)

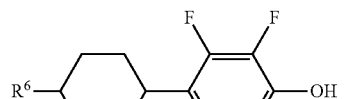 (6-1-1-10)

-continued
(6-1-1-11)
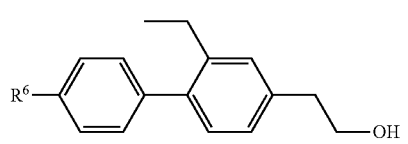
(6-1-1-12)
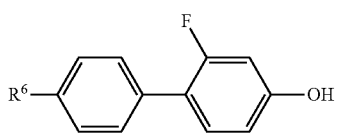
(6-1-1-13)
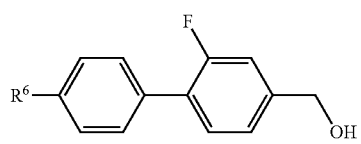
(6-1-1-14)
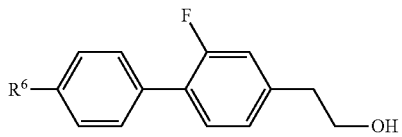
(6-1-1-15)
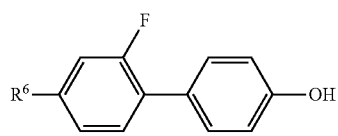
(6-1-1-16)
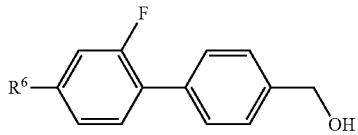
(6-1-1-17)
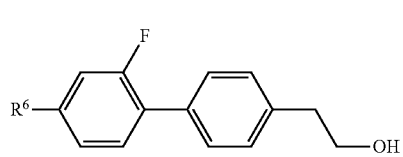
(6-1-1-18)
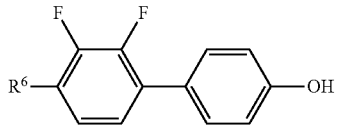
(6-1-1-19)
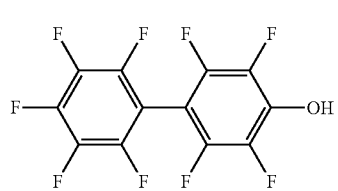
(6-1-1-20)
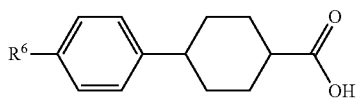
(6-1-1-21)
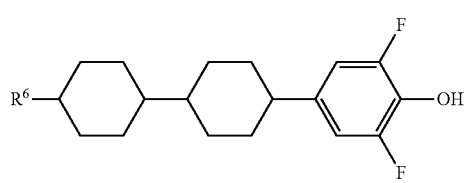
(6-1-1-22)
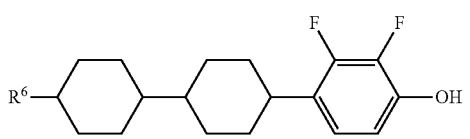
(6-1-1-23)
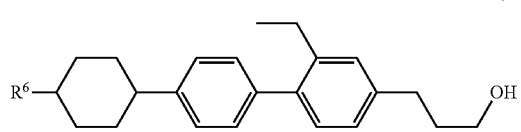
(6-1-1-24)
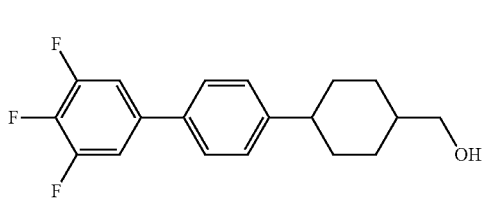
(6-1-1-25)
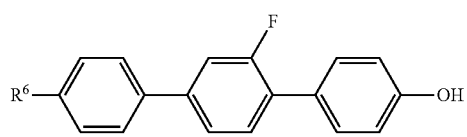
(6-1-1-26)
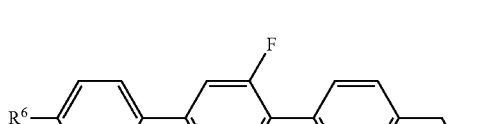
(6-1-1-27)
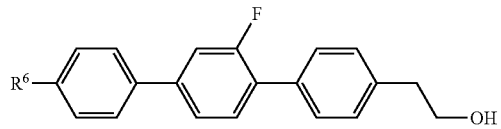
(6-1-1-28)
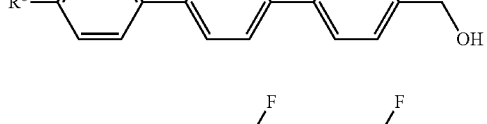
(6-1-1-29)
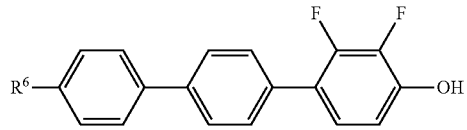
(6-1-1-30)
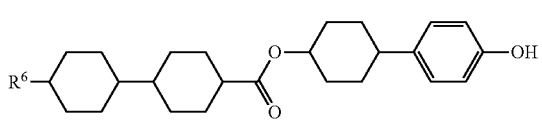

-continued
(6-1-1-31) 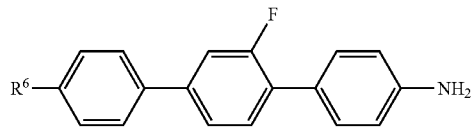
(6-1-1-32) 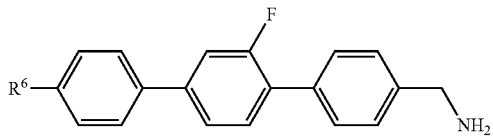
(6-1-1-33) 
(6-1-1-34) 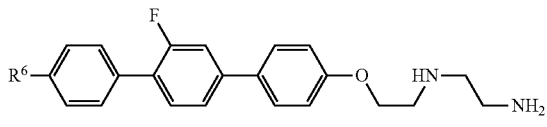
(6-1-1-35) 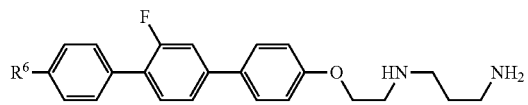
(6-1-1-36) 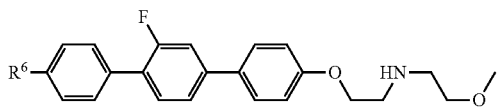
(6-1-2-1) 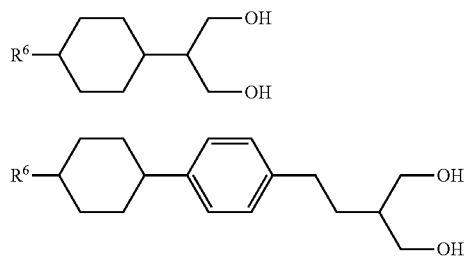
(6-1-2-2) 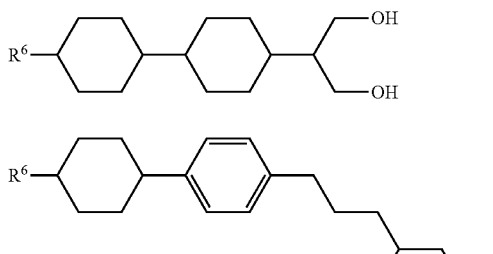
(6-1-2-3) 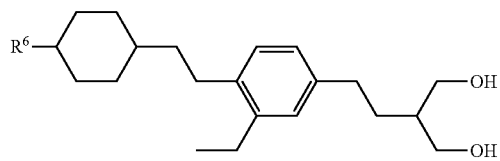
(6-1-2-4) 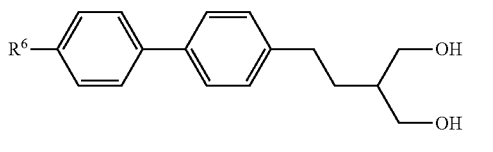
(6-1-2-5) 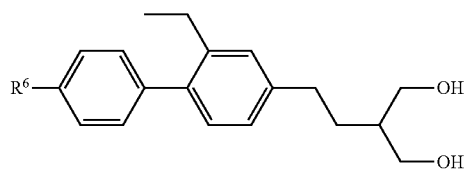
(6-1-2-6) 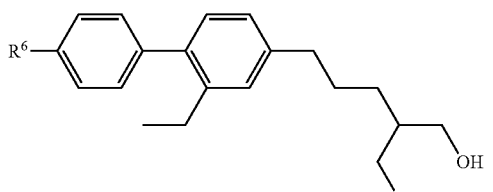
(6-1-2-7) 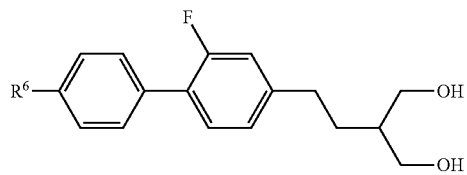
(6-1-2-8) 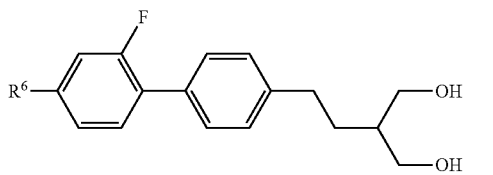
(6-1-2-9) 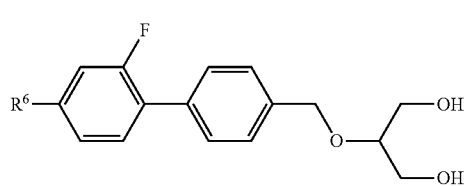

-continued
(6-1-2-13)
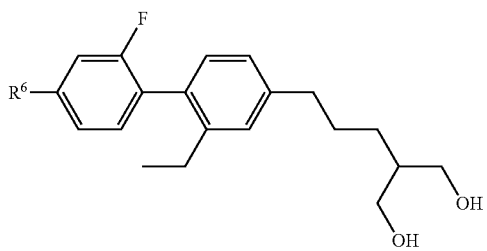
(6-1-2-14)
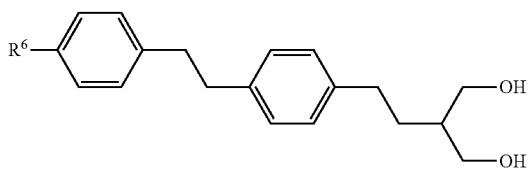
(6-1-2-15)
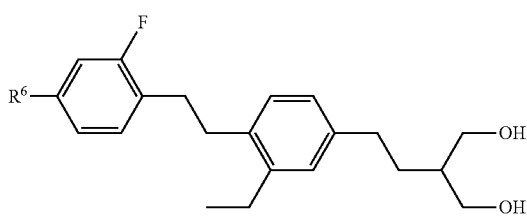
(6-1-2-16)
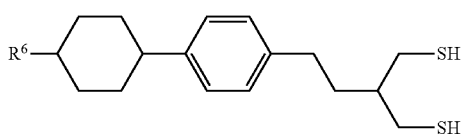
(6-1-2-17)
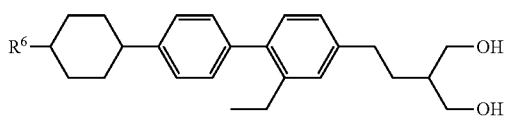
(6-1-2-18)
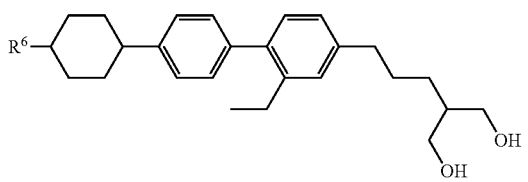
(6-1-2-19)
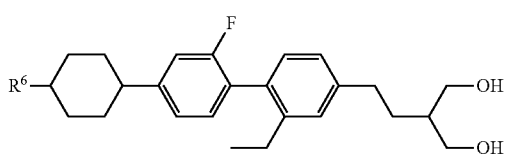
(6-1-2-20)
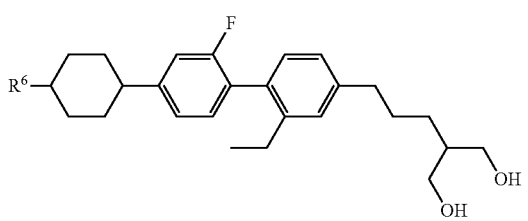
(6-1-2-21)
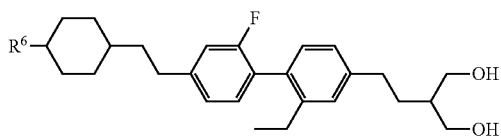
(6-1-2-22)
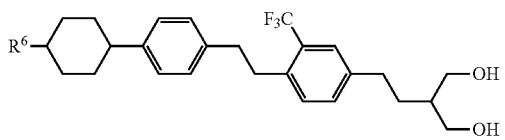
(6-1-2-23)
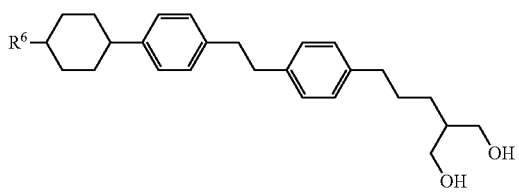
(6-1-2-24)
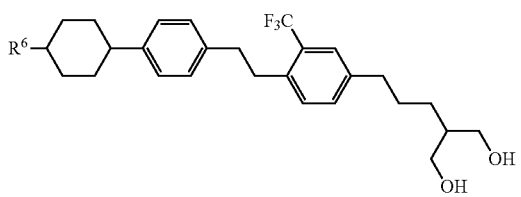
(6-1-2-25)
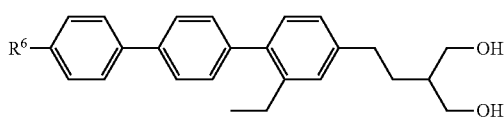
(6-1-2-26)
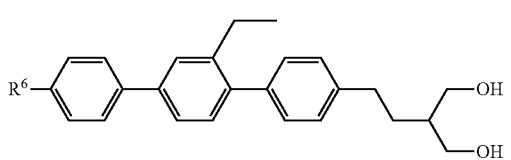

-continued
(6-1-2-27)
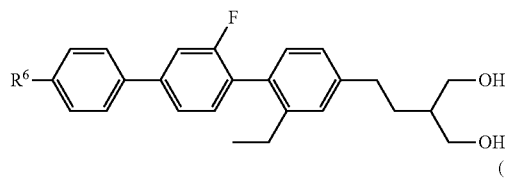
(6-1-2-28)
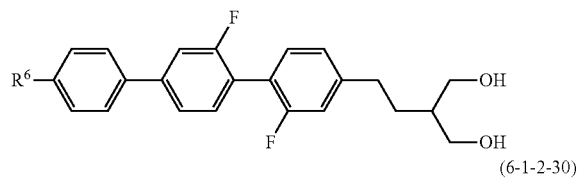
(6-1-2-29)
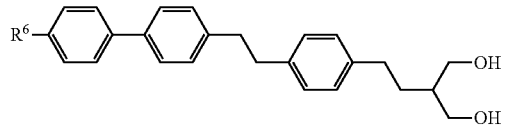
(6-1-2-30)
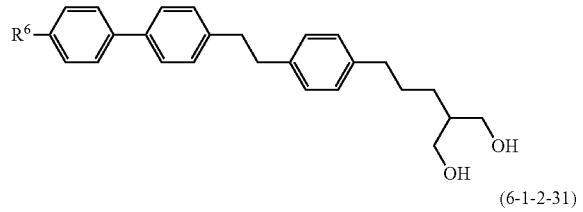
(6-1-2-31)
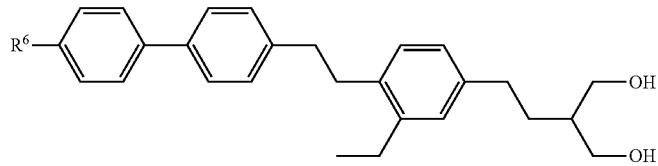
(6-1-2-32)
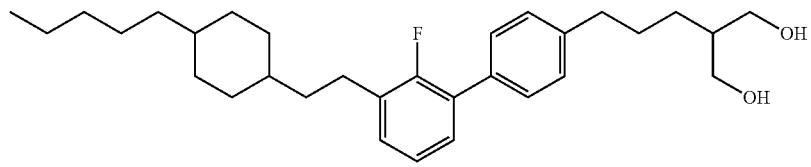
(6-1-3-1)
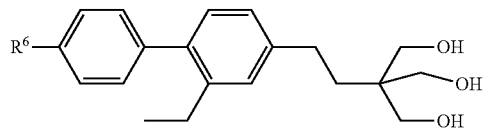
(6-1-3-2)
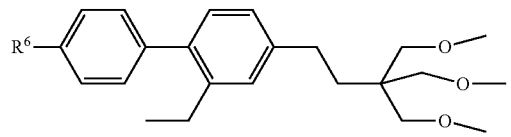
(6-1-4-1)
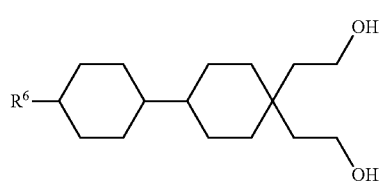
(6-1-4-2)
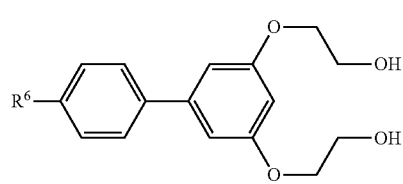
(6-1-4-3)
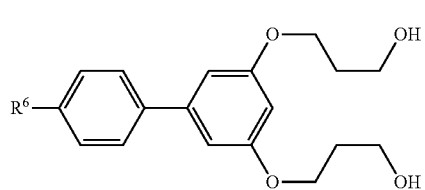
(6-1-4-4)
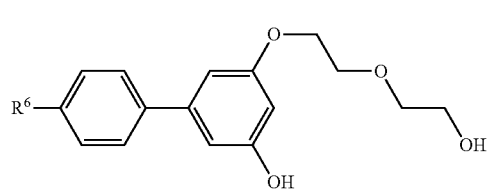
In formula (6-1-1-1) to formula (6-1-4-4), $R^6$ is alkyl having 1 to 8 carbons or fluorine.
Particularly preferred compound (7-1) is selected from compound (7-1-1-1) to compound (7-1-29-1) described below.
(7-1-1-1)
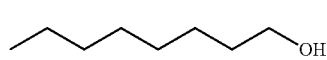
(7-1-1-2)
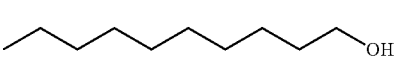
(7-1-1-3)
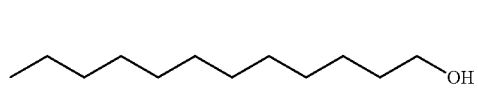
(7-1-1-4)
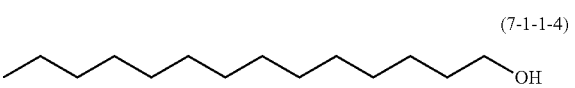

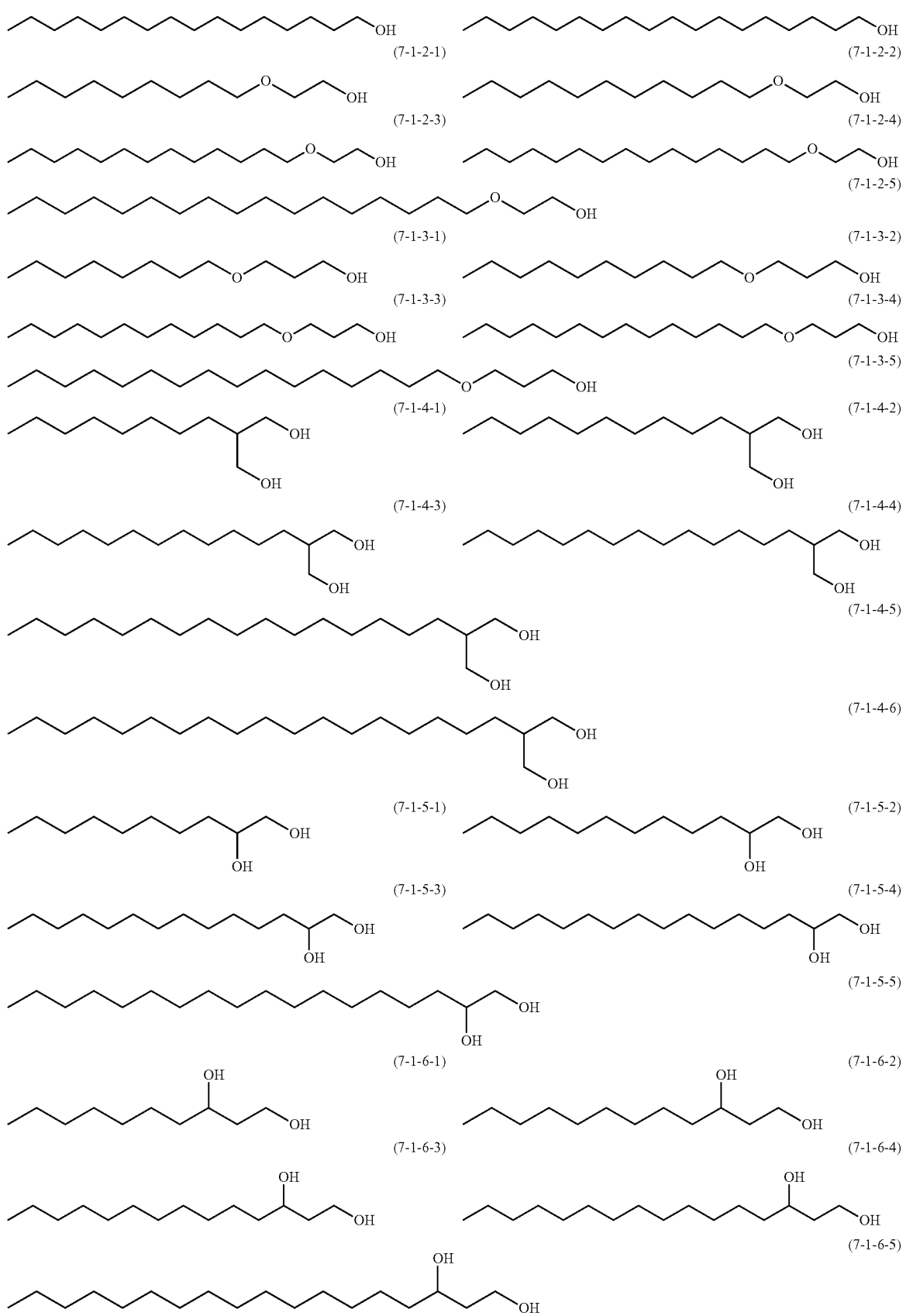

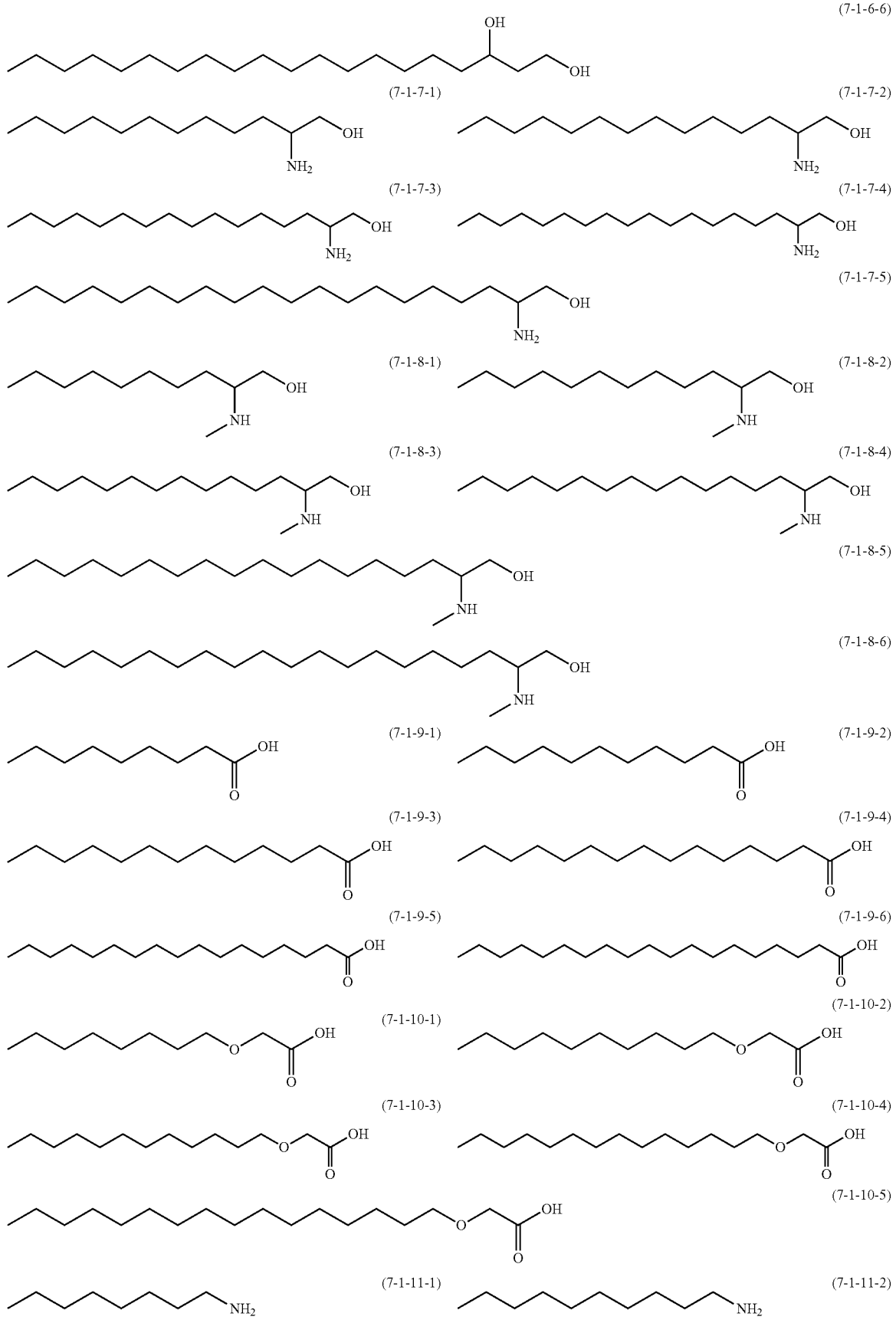

-continued
(7-1-11-3)
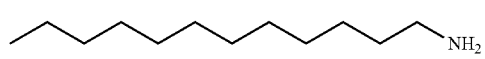
(7-1-11-4)
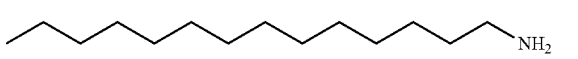
(7-1-11-5)
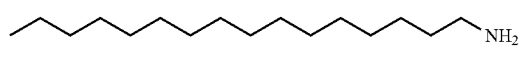
(7-1-12-1)
(7-1-12-2)
(7-1-12-3)
(7-1-12-4)
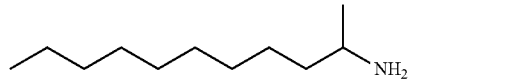
(7-1-12-5)
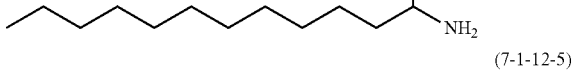
(7-1-12-6)
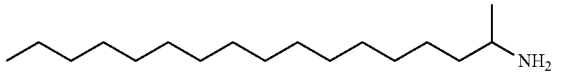
(7-1-13-1)
(7-1-13-2)
(7-1-13-3)
(7-1-13-4)
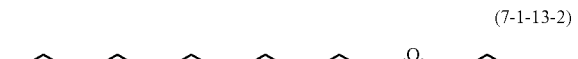
(7-1-13-5)
(7-1-14-1)
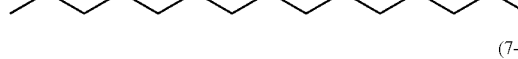
(7-1-14-2)
(7-1-14-3)
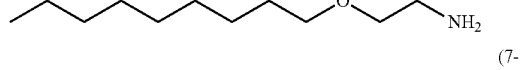
(7-1-14-4)
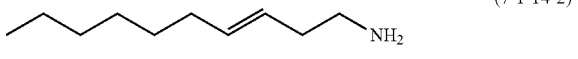
(7-1-14-5)
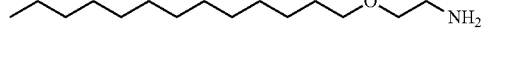
(7-1-14-6)
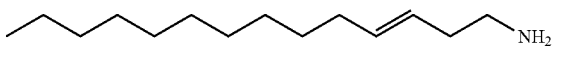
(7-1-15-1)
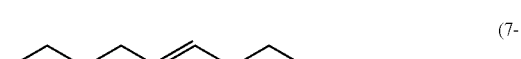
(7-1-15-2)
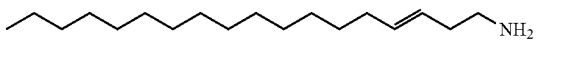
(7-1-15-3)
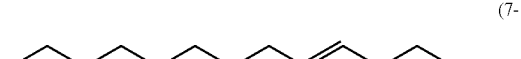
(7-1-15-4)
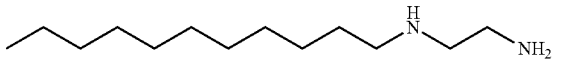
(7-1-15-5)
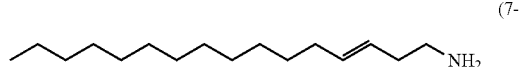
(7-1-16-1)
(7-1-16-2)
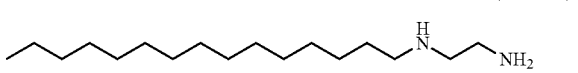
(7-1-16-3)
(7-1-16-4)
(7-1-16-5)

-continued
(7-1-17-1) 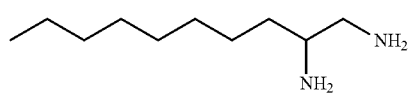
(7-1-17-2) 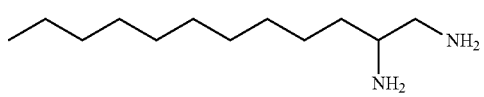
(7-1-17-3) 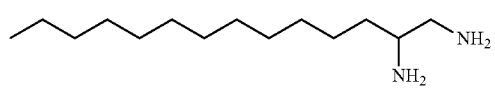
(7-1-17-4) 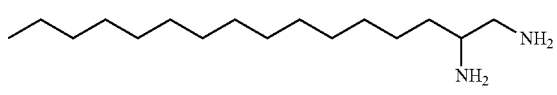
(7-1-17-5) 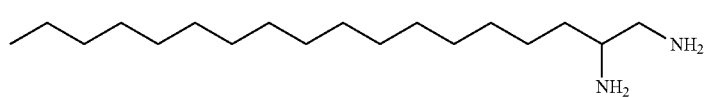
(7-1-17-6) 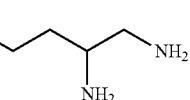
(7-1-18-1) 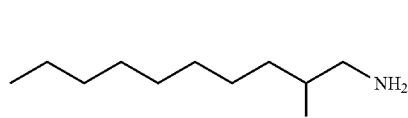
(7-1-18-2) 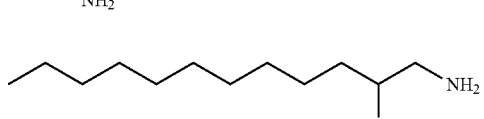
(7-1-18-3) 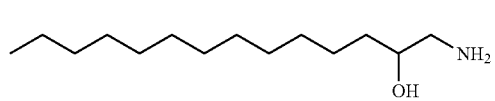
(7-1-18-4) 
(7-1-18-5) 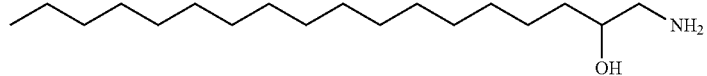
(7-1-18-6) 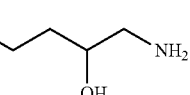
(7-1-19-1) 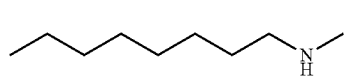
(7-1-19-2) 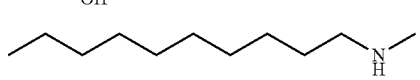
(7-1-19-3) 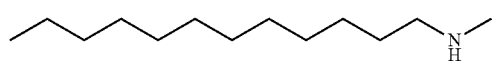
(7-1-19-4) 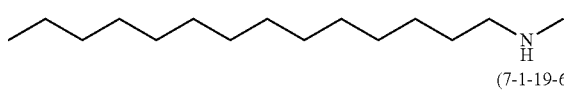
(7-1-19-5) 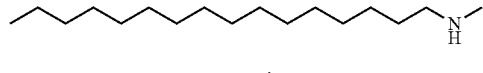
(7-1-19-6) 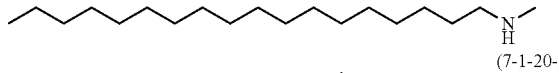
(7-1-20-1) 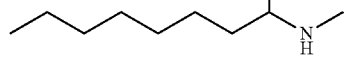
(7-1-20-2) 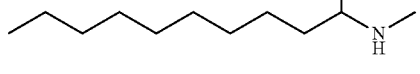
(7-1-20-3) 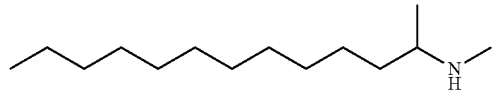
(7-1-20-4) 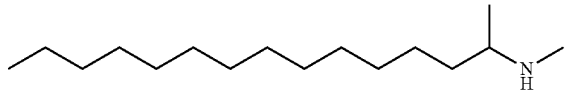
(7-1-20-5) 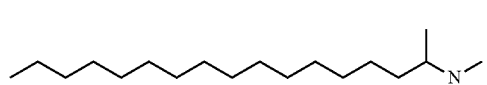
(7-1-20-6) 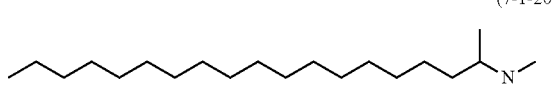
(7-1-21-1) 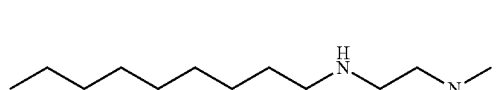
(7-1-21-2) 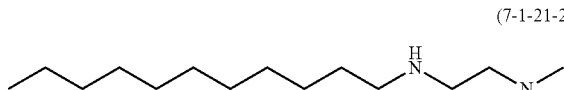
(7-1-21-3) 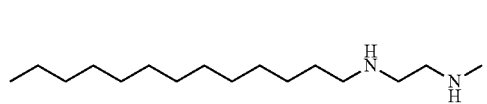
(7-1-21-4) 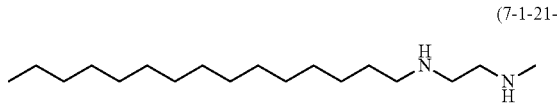

-continued
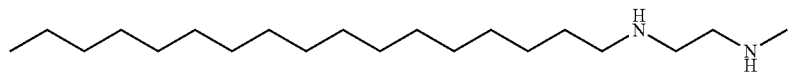
(7-1-21-5)
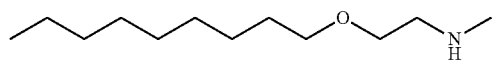
(7-1-22-1)
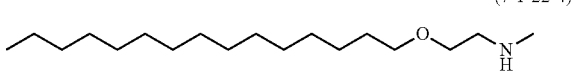
(7-1-22-2)
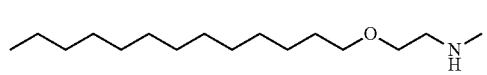
(7-1-22-3)
(7-1-22-4)
(7-1-22-5)
(7-1-23-1)
(7-1-23-2)
(7-1-23-3)
(7-1-23-4)
(7-1-23-5)
(7-1-23-6)
(7-1-24-1)
(7-1-24-2)
(7-1-24-3)
(7-1-24-4)
(7-1-24-5)
(7-1-25-1)
(7-1-25-2)
(7-1-25-3)
(7-1-25-4)
(7-1-25-5)
(7-1-25-6)
(7-1-26-1)

(7-1-27-1)
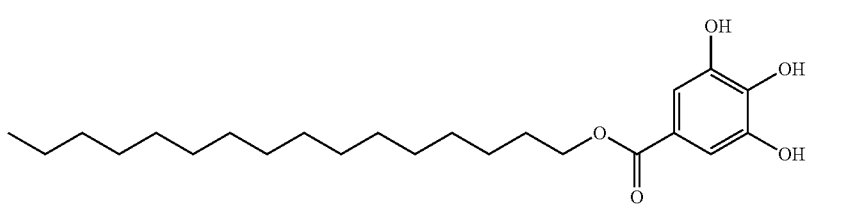

(7-1-28-1)
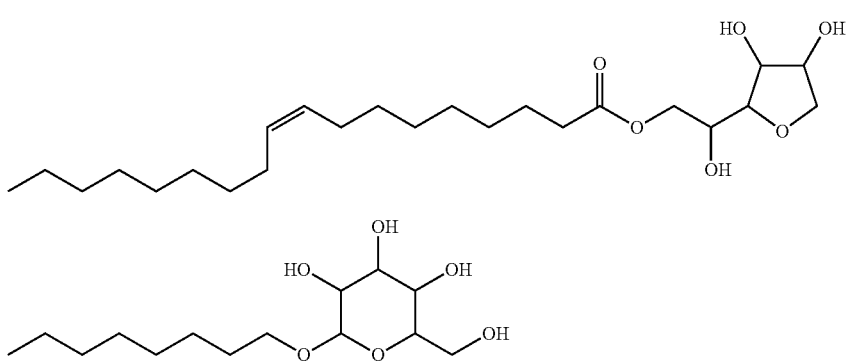

(7-1-29-1)
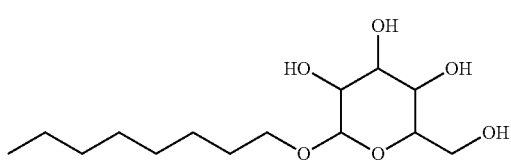

In formula (8), $P^1$, $P^2$ and $P^3$ are independently a polymerizable group. Preferred $P^1$, $P^2$ or $P^3$ is a polymerizable group selected from the group of groups represented by formula (P-1) to formula (P-5). Further preferred $P^1$, $P^2$ or $P^3$ is a group represented by formula (P-1), formula (P-2) or formula (P-3). Particularly preferred $P^1$, $P^2$ or $P^3$ is a group represented by formula (P-1) or formula (P-2). Most preferred $P^1$, $P^2$ or $P^3$ is a group represented by formula (P-1). A preferred group represented by formula (P-1) is —OCO—CH═CH$_2$ or —OCO—C(CH$_3$)═CH$_2$. A wavy line in formula (P-1) to formula (P-5) shows a site to which bonding is made.

(P-1)
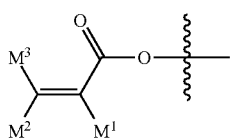

(P-2)
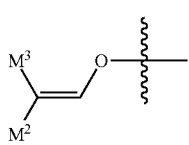

(P-3)
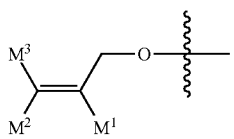

(P-4)
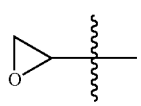

(P-5)
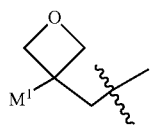

In formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine. Preferred $M^1$, $M^2$ or $M^3$ is hydrogen or methyl for increasing reactivity. Further preferred $M^1$ is hydrogen or methyl, and further preferred $M^2$ or $M^3$ is hydrogen.

$Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH═CH— or —C≡C—, and in the groups, at least one hydrogen may be replaced by fluorine or chlorine. Preferred $Sp^1$, $Sp^2$ or $Sp^3$ is a single bond, —CH$_2$CH$_2$—, —CH$_2$O—, —OCH$_2$—, —COO—, —OCO—, —CO—CH═CH— or —CH═CH—CO—. Further preferred $Sp^1$, $Sp^2$ or $Sp^3$ is a single bond, in which, when ring A and ring C are phenyl, $Sp^1$ and $Sp^3$ are a single bond.

Ring A and ring C are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring A or ring C is phenyl. Ring B is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring B is 1,4-phenylene or 2-fluoro-1,4-phenylene.

$Z^1$ and $Z^2$ are independently a single bond or alkylene having 1 to 10 carbons, and in the alkylene, at least one piece of —$CH_2$— may be replaced by —O—, —CO—, —COO— or —OCO—, and at least one piece of —$CH_2CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine. Preferred $Z^1$ or $Z^2$ is a single bond, —$CH_2CH_2$—, —$CH_2O$—, —$OCH_2$—, —COO— or —OCO—. Further preferred $Z^1$ or $Z^2$ is a single bond.

Then, a is 0, 1 or 2. Preferred a is 0 or 1. Then, b, c, and d are independently 0, 1, 2, 3 or 4, and a sum of b, c and d is 1 or more. Preferred b, c or d is 1 or 2.

Fifth, the preferred component compounds will be described. Preferred compound (1) includes compound (1-1) to compound (1-14) described in item 2. In the compounds, at least one of the first components preferably includes compound (1-3), compound (1-4), compound (1-7), compound (1-9), compound (1-10) or compound (1-12). At least two of the first components preferably include a combination of compound (1-3) and compound (1-4), a combination of compound (1-3) and compound (1-7), a combination of compound (1-3) and compound (1-10), a combination of compound (1-7) and compound (1-10) or a combination of compound (1-9) and compound (1-10).

Preferred compound (3) includes compound (3-1) to compound (3-12) described in item 5. In the compounds, at least one of the third components preferably include compound (3-2), compound (3-4), compound (3-5), compound (3-6) or compound (3-12).

Preferred compound (4) includes compound (4-1) to compound (4-16) described in item 8. In the compounds, at least one of the fourth components preferably includes compound (4-4), compound (4-8), compound (4-9), compound (4-11), compound (4-12), compound (4-13) or compound (4-16). At least two of the fourth components preferably include a combination of compound (4-9) and compound (4-12), a combination of compound (4-11) and compound (4-12), a combination of compound (4-12) and compound (4-13) or a combination of compound (4-12) and compound (4-16).

Preferred compound (5) includes compound (5-1) to compound (5-21) described in item 11. In the compounds, at least one of the fifth components preferably includes compound (5-1), compound (5-4), compound (5-5), compound (5-7), compound (5-10) or compound (5-15). At least two of the fifth components preferably include a combination of compound (5-1) and compound (5-7), a combination of compound (5-1) and compound (5-15), a combination of compound (5-4) and compound (5-7), a combination of compound (5-4) and compound (5-15), a combination of compound (5-5) and compound (5-7) or a combination of compound (5-5) and compound (5-10).

Preferred compound (6) includes compound (6-1) described in item 15. Further preferred compound (6) includes compound (6-1-1) to compound (6-1-4) described in item 18. Preferred compound (7) includes compound (7-1) described in item 16. Further preferred compound (7) includes compound (7-1-1) to compound (7-1-29) described in item 19. In general, compound (6) is preferred to compound (7).

Preferred compound (8) includes compound (8-1) to compound (8-28) described in item 23. Further preferred compound (8) includes compound (8-1), compound (8-2), compound (8-3), compound (8-4), compound (8-5), compound (8-6), compound (8-7), compound (8-18), compound (8-20), compound (8-23), compound (8-24), compound (8-25) and compound (8-26). Particularly preferred compound (8) includes compound (8-2), compound (8-3), compound (8-4) and compound (8-18).

Sixth, the additive that may be added to the composition will be described. Such an additive includes the optically active compound, the antioxidant, the ultraviolet light absorber, the dye, the antifoaming agent, the polymerizable compound, the polymerization initiator, the polymerization inhibitor, the polar compound or the like. The optically active compound is added to the composition for the purpose of inducing a helical structure in the liquid crystal molecule to give a twist angle. Examples of such a compound include compound (9-1) to compound (9-5). A preferred proportion of the optically active compound is about 5% by weight or less. A further preferred proportion is in the range of about 0.01% by weight to about 2% by weight.

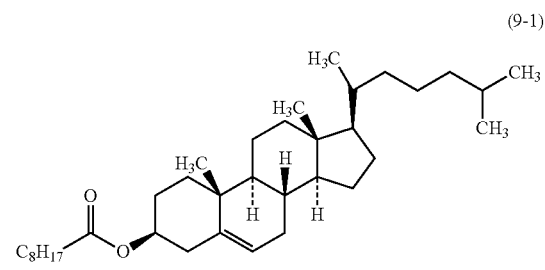

(9-1)

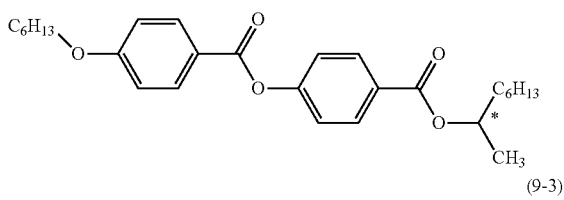

(9-2)

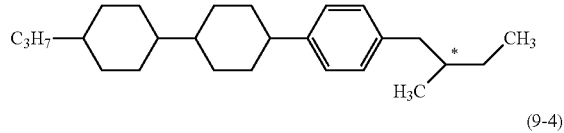

(9-3)

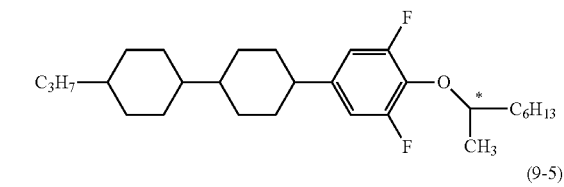

(9-4)

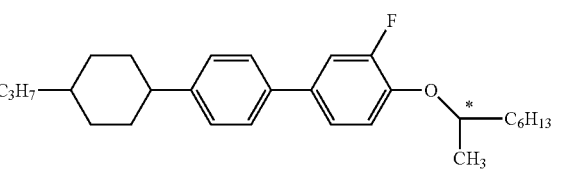

(9-5)

The antioxidant is added to the composition for preventing a decrease in the specific resistance caused by heating in air, or for maintaining a large voltage holding ratio at room temperature and also at the temperature close to the maximum temperature even after the device has been used for a long period of time. Preferred examples of the antioxidant include compound (10) where n is an integer from 1 to 9.

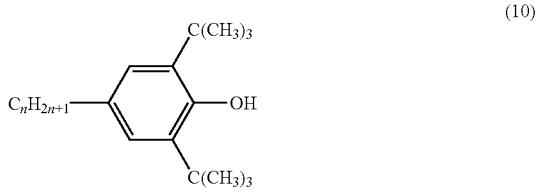

(10)

In compound (10), preferred n is 1, 3, 5, 7 or 9. Further preferred n is 7. Compound (10) where n is 7 has small volatility, and therefore is effective in maintaining a large voltage holding ratio at room temperature and also at the temperature close to the maximum temperature even after the device has been used for a long period of time. A preferred proportion of the antioxidant is about 50 ppm or more for achieving an effect thereof, and about 600 ppm or less for avoiding a decrease in the maximum temperature or an increase in the minimum temperature. A further preferred proportion is in the range of about 100 ppm to about 300 ppm.

Preferred examples of the ultraviolet light absorber include a benzophenone derivative, a benzoate derivative and a triazole derivative. A light stabilizer such as an amine having steric hindrance is also preferred. A preferred proportion of the absorber or the stabilizer is about 50 ppm or more for achieving an effect thereof, and about 10,000 ppm or less for avoiding the decrease in the maximum temperature or avoiding the increase in the minimum temperature. A further preferred proportion is in the range of about 100 ppm to about 10,000 ppm.

A dichroic dye such as an azo dye or an anthraquinone dye is added to the composition to be adapted for a device having a guest host (GH) mode. A preferred proportion of the dye is in the range of about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing poor display. A further preferred proportion is in the range of about 1 ppm to about 500 ppm.

The polymerizable compound is used to be adapted for a polymer sustained alignment (PSA) mode device. Compound (8) is suitable for the above purpose. Any other polymerizable compound that is different from compound (8) may be added to the composition together with compound (8). Preferred examples of any other polymerizable compounds include acrylate, methacrylate, a vinyl compound, a vinyloxy compound, propenyl ether, an epoxy compound (oxirane, oxetane) and a vinyl ketone compound. Further preferred examples include acrylate or methacrylate. A preferred proportion of compound (8) is about 10% by weight or more based on the total weight of the polymerizable compound. A further preferred proportion is about 50% by weight or more. A particularly preferred proportion is about 80% by weight or more. A particularly preferred proportion is also 100% of the weight. Reactivity of a polymerizable compound and a pretilt angle of a liquid crystal molecule can be adjusted by changing a kind of compound (8), or by combining any other polymerizable compounds with compound (8) at a suitable ratio. A short response time of the device can be achieved by optimizing the pretilt angle. Because the alignment of the liquid crystal molecule is stabilized, a large contrast ratio and a long service life can be achieved.

A polymerizable compound such as compound (8) is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of about 0.1% by weight to about 5% by weight based on the total weight of the polymerizable compound. A further preferred proportion is in the range of about 1% by weight to about 3% by weight based thereon.

Upon storing the polymerizable compound such as compound (8), the polymerization inhibitor may be added thereto for preventing polymerization. The polymerizable compound is ordinarily added to the composition without removing the polymerization inhibitor. Examples of the polymerization inhibitor include hydroquinone, a hydroquinone derivative such as methylhydroquinone, 4-t-butylcatechol, 4-methoxyphenol and phenothiazine.

Seventh, the methods for synthesizing the component compounds will be described. The compounds can be prepared according to known methods. Examples of the synthetic methods are described. Compound (1-4) and compound (1-10) are prepared by the method described in JP H10-251186 A. Compound (2) is prepared by the method described in JP S59-176221 A. Compound (3-12) is prepared by the method described in JP H2-237949 A. Compound (4-4) and compound (4-8) are prepared by the method described in JP H2-233626 A. Compound (5-1) and compound (5-7) are prepared by the method described in JP H2-503441 A. Compound (6-1) is prepared by the method described in WO 2012/038026 A. Some of compound (7) are commercially available. Compound (8-17) is prepared by the method described in JP H7-101900 A. Compound in which n is 1 in formula (10) can be obtained from Aldrich (Sigma-Aldrich Corporation). Compounds (10) where n is 7 is prepared by the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. Most of the composition has a minimum temperature of about −10° C. or lower, a maximum temperature of about 70° C. or higher, and optical anisotropy in the range of about 0.07 to about 0.20. The composition having optical anisotropy in the range of about 0.08 to about 0.25 may be prepared by controlling the proportion of the component compounds or by mixing any other liquid crystal compound.

Further, the composition having optical anisotropy in the range of about 0.10 to about 0.30 may be prepared by trial and error. A device including the composition has the large voltage holding ratio. The composition is suitable for use in the AM device. The composition is particularly suitable for use in a transmissive AM device. The composition can be used as the composition having the nematic phase, and as the optically active composition by adding the optically active compound.

The composition can be used for the AM device. The composition can also be used for a PM device. The composition can also be used for an AM device and a PM device each having a mode such as the PC mode, the TN mode, the STN mode, the ECB mode, the OCB mode, the IPS mode, the FFS mode, the VA mode and the FPA mode. Use for the AM device having the TN mode, the OCB mode, the IPS mode or the FFS mode is particularly preferred. In the AM device having the IPS mode or the FFS mode, when no voltage is applied, the alignment of liquid crystal molecules may be parallel to a glass substrate, or may be perpendicular thereto. The above devices may be a reflective type, a transmissive type, or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, or for a polymer dispersed (PD) device in which a three-dimensional network-polymer is formed in the composition.

One example of a conventional method of producing the polymer sustained alignment mode device is as described below. A device having two substrates called an array substrate and a color filter substrate is assembled. The substrates each include an alignment film. At least one of the substrates includes an electrode layer. A liquid crystal compound is mixed to prepare a liquid crystal composition. A polymerizable compound is added to the composition. An additive may be further added thereto when necessary. The composition is injected into the device. The device is irradiated with light while voltage is applied to the device. Ultraviolet light is preferred. A polymerizable compound is polymerized by irradiation with light. A composition containing a polymer is formed by the polymerization. The polymer sustained alignment mode device is produced by such a procedure.

In the above procedure, when voltage is applied, liquid crystal molecules are aligned by action of the alignment film and an electric field. Molecules of the polymerizable compound are also aligned according to the above alignment. The polymerizable compound is polymerized by ultraviolet light in the above state, and therefore a polymer in which the alignment is maintained is formed. A response time of the device is shortened by an effect of the polymer. Image persistence is caused by poor operation of the liquid crystal molecule, and therefore is also simultaneously improved by the effect of the polymer. In addition, the polymerizable compound in the composition may be polymerized in advance, and the composition may be arranged between the substrates of the liquid crystal display device.

One example of a method of producing a device having no alignment film is as described below. A device having two substrates called an array substrate and a color filter substrate is prepared. The substrates each include no alignment film. At least one of the substrates includes an electrode layer. A liquid crystal compound is mixed to prepare a liquid crystal composition. A polymerizable compound and a polar compound are added to the composition. An additive may be further added thereto when necessary. The composition is injected into the device. The device is irradiated with light while voltage is applied to the device. Ultraviolet light is preferred. A polymerizable compound is polymerized by irradiation with light. A layer of the composition containing a polymer and a polar compound is formed on the substrate by the polymerization.

In the above procedure, because a polar group interacts with a substrate surface, the polar compound is arranged on the substrate. Liquid crystal molecules are arranged according to the above arrangement. When voltage is applied, the alignment of the liquid crystal molecules is further promoted and the polymerizable compound is also aligned according to the above alignment. The polymerizable compound is polymerized by ultraviolet light in the above state, and therefore a polymer in which the alignment is maintained is formed. The alignment of the liquid crystal molecules is additionally stabilized by an effect of the polymer, and a response time of the device is shortened. Image persistence is caused by poor operation of the liquid crystal molecule, and therefore is also simultaneously improved by the effect of the polymer.

EXAMPLES

The invention will be described in greater detail by way of Examples. The invention is not limited by the Examples. The invention includes a mixture of composition M1 and composition M2. The invention also includes a mixture prepared by mixing at least two of compositions in Examples. A compound prepared was identified by methods such as an NMR analysis. Characteristics of the compound, the composition and a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL/min). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by a method as described below. A mixture of liquid crystal compounds is analyzed by gas chromatograph (FID). An area ratio of each peak in the gas chromatogram corresponds to the proportion of the liquid crystal compound. When the capillary columns described above were used, a correction coefficient of each of the liquid crystal compounds may be regarded as 1. Accordingly, the proportion (% by weight) of the liquid crystal compounds can be calculated from the area ratio of each peak.

Sample for measurement: When characteristics of the composition and the device were measured, the composition was used as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample for measurement)−0.85×(measured value of a base liquid crystal)}/0.15. When a smectic phase (or crystals) precipitates at the ratio thereof at 25° C., a ratio of the compound to the base liquid crystal was changed step by step in the order of (10% by weight: 90% by weight), (5% by weight: 95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

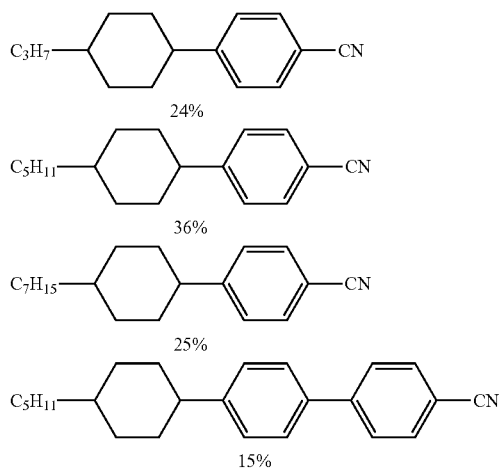

Measuring method: Physical properties were measured according to the methods described below. Most of the methods are described in the Standard of Japan Electronics and Information Technology Industries Association (hereinafter, abbreviated as JEITA) discussed and established in JEITA (JEITA ED-2521B). A modification of the methods was also used. No thin film transistor (TFT) was attached to a TN device used for measurement.

(1) Maximum temperature of a nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A higher limit of the temperature range of the nematic phase may be occasionally abbreviated as "maximum temperature."

(2) Minimum temperature of a nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained in the nematic phase at −20° C. and changed to crystals or a smectic phase at −30° C., Tc of the sample was expressed as Tc<−20° C. A lower limit of the temperature range of the nematic phase may be occasionally abbreviated as "minimum temperature."

(3) Viscosity (bulk viscosity; η; measured at 20° C.; mPa·s): For measurement, a cone-plate (E type) rotational viscometer made by Tokyo Keiki Co., Ltd. was used.

(4) Viscosity (rotational viscosity; γl; measured at 25° C.; mPa·s): Measurement was carried out according to the method described in M. Imai et al., Molecular Crystals and Liquid Crystals, Vol. 259, p. 37 (1995). A sample was put in a TN device in which a twist angle was 0 degree and a distance (cell gap) between two glass substrates was 5 micrometers. Voltage was applied stepwise to the device in the range of 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of a transient current generated by the applied voltage were measured. A value of rotational viscosity was obtained from the measured values according to calculating equation (8) on page 40 of the paper presented by M. Imai et al. Dielectric anisotropy required for the calculation was measured by a method described in section (6) described below.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy (Δn) was calculated from an equation: Δn=n∥−n⊥.

(6) Dielectric anisotropy (Δε; measured at 25° C.): A sample was put into a TN device in which a distance (cell gap) between two glass substrates was 9 micrometers and a twist angle was 80 degrees. Sine waves (10 V, 1 kHz) were applied to the device, and after 2 seconds, a dielectric constant (ε∥) in a major axis direction of the liquid crystal molecules was measured. Sine waves (0.5 V, 1 kHz) were applied to the device, and after 2 seconds, a dielectric constant (ε⊥) in a minor axis direction of the liquid crystal molecules was measured. A value of dielectric anisotropy was calculated from an equation: Δε=ε∥−ε⊥.

(7) Threshold voltage (Vth; measured at 25° C.; V): For measurement, an LCD-5100 luminance meter made by Otsuka Electronics Co., Ltd. was used. A light source was a halogen lamp. A sample was put in a normally white mode TN device in which a distance (cell gap) between two glass substrates was 0.45/Δn (μm) and a twist angle was 80 degrees. Voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which a maximum amount of light corresponds to 100% transmittance and a minimum amount of light corresponds to 0% transmittance. A threshold voltage is expressed in terms of voltage at 90% transmittance.

(8) Voltage holding ratio (VHR-1; measured at 25° C.; %): A TN device used for measurement had a polyimide alignment film, and a distance (cell gap) between two glass substrates was 5 micrometers. A sample was put in the device, and the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to a procedure identical to the procedure described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and then the device was irradiated with light for 20 minutes. A light source was an ultra-high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has a large stability to ultraviolet light. A value of VHR-3 is preferably 90% or more, and further preferably 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has large stability to heat.

(12) Response time (τ; measured at 25° C.; ms): For measurement, an LCD-5100 luminance meter made by Otsuka Electronics Co., Ltd. was used. A light source was a halogen lamp. A low-pass filter was set to 5 kHz. A sample was put into an FFS device having no alignment film in which a distance (cell gap) between two glass substrates was 3.5 micrometers. The device was sealed with an ultraviolet-curable adhesive. The device was irradiated with ultraviolet light of 78 mW/cm² (405 nm) for 359 seconds (28J) while a voltage of 30 V was applied to the device. A multi-metal lamp M04-L41 for ultraviolet curing made by EYE GRAPHICS CO., LTD. was used for irradiation with ultraviolet light. Rectangular waves (120 Hz) were applied to the device. On the occasion, the device was irradiated with light from a direction perpendicular to the device, and an amount of light transmitted through the device was measured. The maximum amount of light corresponds to 100% transmittance and the minimum amount of light corresponds to 0% transmittance. The maximum voltage of the rectangular wave was set so as to obtain 90% transmittance. The minimum voltage of the rectangular wave was set to 2.5V at 0% transmittance. A response time was expressed in terms of time required for a change from 90% transmittance to 10% transmittance (fall time; millisecond).

(13) Elastic constant (K; measured at 25° C.; pN): For measurement, HP4284A LCR Meter made by Yokogawa-Hewlett-Packard Co. was used. A sample was put into a horizontal alignment device in which a distance (cell gap) between two glass substrates was 20 micrometers. Voltage of 0 V to 20 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku, in Japanese; Nikkan Kogyo Shimbun, Ltd.), and values of K11 and K33 were obtained from equation (2.99). Next, K22 was calculated from equation (3.18) on page 171 by using the values of K11 and K33 obtained previously. Elastic constant K is expressed using a mean value of the thus determined K11, K22 and K33.

(14) Specific resistance (ρ; measured at 25° C.; Ωcm): Into a vessel equipped with electrodes, 1.0 milliliter of a sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(15) Pretilt angle (degree): A spectral ellipsometer M-2000U (made by J. A. Woollam Co., Inc.) was used for measurement of a pretilt angle.

(16) Alignment stability (liquid crystal orientation axis stability): A change in a liquid crystal orientation axis on a side of an electrode of a liquid crystal display device was evaluated. A liquid crystal orientation angle ø (before) on the side of the electrode before stress application was measured, and then after rectangular waves (4.5 V, 60 Hz) were applied to the device for 20 minutes, a short-circuit was formed for 1 second, and liquid crystal orientation angles ø (after) on the side of the electrode were measured again after 1 second and after 5 minutes, respectively. From the measured values, changes Δø (deg.) in the liquid crystal orientation angles after 1 second and after 5 minutes were calculated, respectively, by using the following equation: Δø (deg.)=ø (after)−ø (before). The above measurement was carried out with reference to J. Hilfiker, B. Johs, C. Herzinger, J. F. Elman, E. Montbach, D. Bryant, and P. J. Bos, Thin Solid Films, 455-456, (2004) 596-600. Smaller Δø can be reasonably referred to as being smaller in a change ratio and better in stability of the liquid crystal orientation axis.

Examples of the composition will be described below. The component compounds were represented by symbols based on the definition of the following Table 3. In Table 3, a configuration of 1,4-cyclohexylene is trans. Parenthesized numbers described after the symbols in Examples represent formulas to which the compounds belong. A symbol (-) means any other liquid crystal compound. A proportion (percentage) of the liquid crystal compound is a weight percent (% by weight) based on the weight of the liquid crystal composition containing no additives. Finally, characteristic values of the liquid crystal composition were summarized.

TABLE 3

Method for Description of Compounds using Symbols
R—(A₁)—Z₁—...—Zₙ—(Aₙ)—R'

1) Left-terminal Group R—

| | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2=CH$— | V— |
| $C_nH_{2n+1}$—CH=CH— | nV— |
| $CH_2=CH$—$C_nH_{2n}$— | Vn— |
| $C_mH_{2m+1}$—CH=CH—$C_nH_{2n}$— | mVn— |
| $CF_2=CH$— | VFF— |
| $CF_2=CH$—$C_nH_{2n}$— | VFFn— |
| F—$C_nH_{2n}$— | Fn— |

2) Right-terminal Group —R'

| | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —$C_nH_{2n}$—CH=CH—$C_mH_{2m+1}$ | —nVm |
| —CH=$CF_2$ | —VFF |
| —$COOCH_3$ | —EMe |
| —F | —F |
| —Cl | —CL |
| —$OCF_3$ | —OCF3 |
| —$CF_3$ | —CF3 |
| —CN | —C |

3) Bonding Group —Zₙ—

| | Symbol |
|---|---|
| —$C_2H_4$— | 2 |
| —COO— | E |
| —CH=CH— | V |
| —C≡C— | T |
| —$CF_2O$— | X |
| —$CH_2O$— | 1O |

4) Ring Structure —Aₙ—

| | Symbol |
|---|---|
| 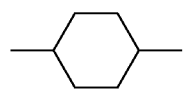 | H |
| 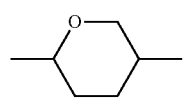 | Dh |
| 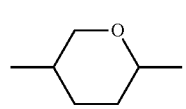 | dh |
| 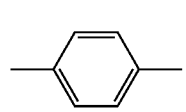 | B |
| 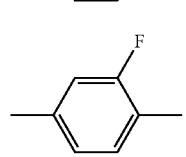 | B(F) |

TABLE 3-continued

Method for Description of Compounds using Symbols
R—(A₁)—Z₁—...—Zₙ—(Aₙ)—R'

| | |
|---|---|
| 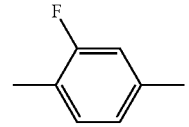 | B(2F) |
| 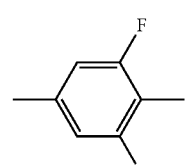 | B(F,F) |
| 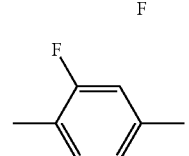 | B(2F,5F) |
| 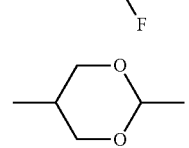 | G |
| 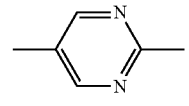 | Py |
| 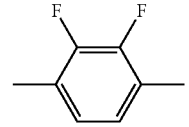 | B(2F,3F) |
| 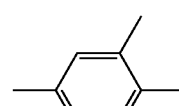 | Bm |

5) Examples of Description

Example 1 V—HBB-1

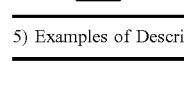

Example 2 5-BB(2F)BBm-2

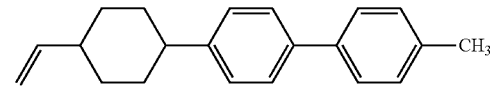 [SMILES: C=CC1CCC(c2ccc(-c3ccc(C)cc3)cc2)CC1]

Example 3 3-BB(F)B(F,F)XB(F,F)—CF3

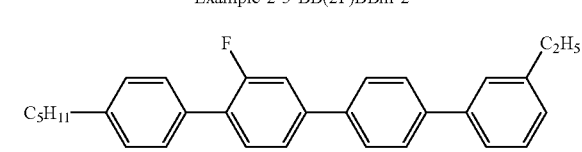

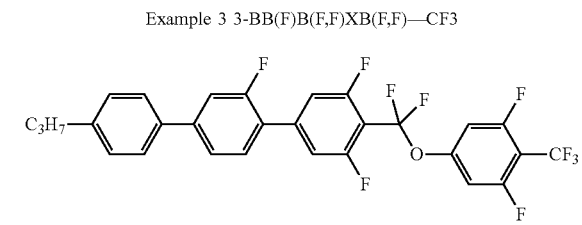

TABLE 3-continued

Method for Description of Compounds using Symbols
R—(A$_1$)—Z$_1$— ... —Z$_n$—(A$_n$)—R'

Example 4  3-HHEBH-5

C$_3$H$_7$—〔cyclohexyl〕—〔cyclohexyl〕—C(=O)O—〔phenyl〕—〔cyclohexyl〕—C$_5$H$_{11}$

Examples of a Device

1. Raw Material

A polar compound and a polymerizable compound were added to liquid crystal compositions (M1) to (M13), and compositions in Examples 1 to 33 were prepared. The composition was injected into a device having no alignment film. After the device was irradiated with ultraviolet light, vertical alignment of liquid crystal molecules in the device was examined, and the results were summarized in Table 4. A raw material will be described first. Raw materials include compositions (M1) to (M13), polar compounds (PC-1) to (PC-33) and polymerizable compounds (RM-1) to (RM-11), and are listed up in the above order.

| Composition M1 | | |
| --- | --- | --- |
| 5-HXB(F,F)-F | (1-1) | 3% |
| 3-HHXB(F,F)-F | (1-2) | 6% |
| 3-BB(F,F)XB(F,F)-F | (1-4) | 6% |
| 3-BB(2F,3F)XB(F,F)-F | (1-4) | 4% |
| 3-HHB(F,F)XB(F,F)-F | (1-5) | 4% |
| 3-HBB(2F,3F)XB(F,F)-F | (1-7) | 5% |
| 5-BB(F)B(F,F)XB(F,F)-F | (1-14) | 2% |
| 3-HH-V | (2) | 21% |
| 5-HB-O2 | (3-1) | 5% |
| 3-HHEH-3 | (3-3) | 3% |
| 3-HBB-2 | (3-5) | 7% |
| 5-B(F)BB-3 | (3-7) | 3% |
| 3-HB-CL | (4-1) | 3% |
| 3-HHB-OCF3 | (4-3) | 3% |
| 3-HGB(F,F)-F | (4-6) | 3% |
| 3-HB(F)B(F,F)-F | (4-9) | 5% |
| 3-HHBB(F,F)-F | (4-14) | 6% |
| 3-HH-V1 | (—) | 10% |
| 5-BB(2F)BBm-2 | (—) | 1% |

Note)
A structure of 5-BB(2F)BBm-2 was shown in Example 2 in Table 3.
NI = 78.4° C.; Tc < −20° C.; Δn = 0.103; Δε = 5.8; Vth = 1.90 V; η = 14.0 mPa · s; γ1 = 61.7 mPa · s.

| Composition M2 | | |
| --- | --- | --- |
| 5-HXB(F,F)-F | (1-1) | 6% |
| 3-HHXB(F,F)-F | (1-2) | 6% |
| 2-BB(F)B(F,F)XB(F)-F | (1-10) | 3% |
| 3-BB(F)B(F,F)XB(F)-F | (1-10) | 3% |
| 4-BB(F)B(F,F)XB(F)-F | (1-10) | 4% |
| 3-HH-V | (2) | 10% |
| 5-HB-O2 | (3-1) | 7% |
| 4-HHEH-3 | (3-3) | 3% |
| V2-BB(F)B-1 | (3-6) | 3% |
| 5-HB-CL | (4-1) | 5% |
| V-HB(F)B(F,F)-F | (4-9) | 5% |
| 3-HHB(F)B(F,F)-F | (4-15) | 7% |
| 2-HH-5 | (—) | 8% |
| 3-HH-V1 | (—) | 7% |
| 4-HH-V | (—) | 10% |
| 4-HH-V1 | (—) | 8% |
| 1O1-HBBH-3 | (—) | 5% |

NI = 78.5° C.; Tc < −20° C.; Δn = 0.095; Δε = 3.4; Vth = 1.50 V; η = 8.4 mPa · s; γ1 = 54.2 mPa · s.

| Composition M3 | | |
| --- | --- | --- |
| 3-HHXB(F,F)-F | (1-2) | 7% |
| 3-BB(F,F)XB(F,F)-F | (1-4) | 10% |
| 5-HHB(F,F)XB(F,F)-F | (1-5) | 6% |
| 3-HBB(2F,3F)XB(F,F)-F | (1-7) | 5% |
| 3-HH-V | (2) | 20% |
| 3-BB(2F,5F)B-3 | (3) | 3% |
| 5-HB-O2 | (3-1) | 5% |
| 3-HHEBH-3 | (3-9) | 5% |
| 3-HHEBH-5 | (3-9) | 5% |
| 3-HHEB(F,F)-F | (4-5) | 5% |
| 5-HBEB(F,F)-F | (4-10) | 5% |
| 2-HHB(F)B(F,F)-F | (4-15) | 3% |
| 2-HH-3 | (—) | 8% |
| 3-HH-V1 | (—) | 7% |
| 4-HH-V | (—) | 6% |

NI = 90.0° C.; Tc < −20° C.; Δn = 0.088; Δε = 5.4; Vth = 1.68 V; η = 13.9 mPa · s; γ1 = 61.0 mPa · s.

| Composition M4 | | |
| --- | --- | --- |
| 3-BB(F,F)XB(F,F)-F | (1-4) | 12% |
| 3-HBBXB(F,F)-F | (1-7) | 3% |
| 3-BB(F)B(F,F)XB(F)-F | (1-10) | 3% |
| 3-BB(F)B(F,F)XB(F,F)-F | (1-10) | 3% |
| 4-BB(F)B(F,F)XB(F,F)-F | (1-10) | 5% |
| 5-BB(F)B(F,F)XB(F,F)-F | (1-10) | 4% |
| 3-HH-V | (2) | 25% |
| 5-HB-O2 | (3-1) | 7% |
| V-HHB-1 | (3-4) | 6% |
| V-HBB-2 | (3-5) | 5% |
| 3-HHBB(F,F)-F | (4-14) | 5% |
| 4-HHBB(F,F)-F | (4-14) | 4% |
| 3-HH-5 | (—) | 6% |
| 2-HH-3 | (—) | 6% |
| 3-HH-VFF | (—) | 6% |

NI = 78.3° C.; Tc < −20° C.; Δn = 0.107; Δε = 7.0; Vth = 1.55 V; η = 11.6 mPa · s; γ1 = 55.6 mPa · s.

| Composition M5 | | |
| --- | --- | --- |
| 3-HHXB(F,F)-F | (1-2) | 6% |
| 3-BB(F,F)XB(F,F)-F | (1-4) | 8% |
| 3-BB(F)B(F,F)XB(F,F)-F | (1-10) | 3% |
| 4-BB(F)B(F,F)XB(F,F)-F | (1-10) | 6% |
| 5-BB(F)B(F,F)XB(F,F)-F | (1-10) | 5% |
| 3-HH-V | (2) | 30% |
| 3-HHB-O1 | (3-4) | 2% |
| V-HHB-1 | (3-4) | 5% |
| 2-BB(F)B-3 | (3-6) | 6% |
| 3-HHBB(F,F)-F | (4-14) | 5% |
| 4-HHBB(F,F)-F | (4-14) | 4% |
| 3-HH-V1 | (—) | 5% |
| F3-HH-V | (—) | 15% |

NI = 82.0° C.; Tc < −20° C.; Δn = 0.104; Δε = 5.7; Vth = 1.43 V; η = 11.8 mPa · s; γ1 = 62.1 mPa · s.

| Composition M6 | | |
|---|---|---|
| 3-GB(F,F)XB(F,F)-F | (1-3) | 5% |
| 3-HGB(F,F)XB(F,F)-F | (1-6) | 5% |
| 2-dhBB(F,F)XB(F,F)-F | (1-8) | 4% |
| 3-dhB(F,F)B(F,F)XB(F)B(F,F)-F | (1-13) | 3% |
| 3-HH-V | (2) | 26% |
| 3-BB(2F,5F)B-3 | (3) | 3% |
| 1V2-BB-1 | (3-2) | 3% |
| 3-HB(F)HH-2 | (3-8) | 4% |
| 5-HBB(F) B-2 | (3-12) | 6% |
| 7-HB(F,F)-F | (4-2) | 3% |
| 3-HGB(F,F)-F | (4-6) | 3% |
| 5-GHB(F,F)-F | (4-7) | 4% |
| 3-BB(F)B(F,F)-CF3 | (4-13) | 2% |
| 3-HHBB(F,F)-F | (4-14) | 4% |
| 3-GBB(F)B(F,F)-F | (4-16) | 2% |
| 2-HH-5 | (—) | 4% |
| 2-HH-3 | (—) | 14% |
| 1V2-HH-3 | (—) | 5% |

NI = 78.3° C.; Tc < −20° C.; $\Delta n$ = 0.094; $\Delta \varepsilon$ = 5.9; Vth = 1.25 V; $\eta$ = 12.8 mPa · s; $\gamma 1$ = 61.9 mPa · s.

| Composition M7 | | |
|---|---|---|
| 3-BB(F)B(F,F)XB(F,F)-F | (1-10) | 3% |
| 4-BB(F)B(F,F)XB(F,F)-F | (1-10) | 5% |
| 3-BB(F,F)XB(F)B(F,F)-F | (1-12) | 3% |
| 5-BB(F)B(F,F)XB(F)B(F,F)-F | (1-14) | 4% |
| 3-HH-V | (2) | 25% |
| 5-HB-O2 | (3-1) | 5% |
| 7-HB-1 | (3-1) | 5% |
| VFF-HHB-O1 | (3-4) | 8% |
| VFF-HHB-1 | (3-4) | 3% |
| 3-HBB(F,F)-F | (4-8) | 5% |
| 5-HBB(F,F)-F | (4-8) | 4% |
| 3-BB(F)B(F,F)-F | (4-12) | 3% |
| 3-HH2BB(F,F)-F | (4) | 3% |
| 4-HH2BB(F,F)-F | (4) | 3% |
| 2-HH-5 | (—) | 8% |
| 4-HH-V1 | (—) | 13% |

NI = 79.8° C.; Tc < −20° C.; $\Delta n$ = 0.101; $\Delta \varepsilon$ = 4.7; Vth = 1.71 V; $\eta$ = 11.1 mPa · s; $\gamma 1$ = 47.8 mPa · s.

| Composition M8 | | |
|---|---|---|
| 3-BB(F,F)XB(F,F)-F | (1-4) | 10% |
| 3-GB(F)B(F,F)XB(F,F)-F | (1-9) | 6% |
| 5-GB(F,F)XB(F)B(F,F)-F | (1-11) | 5% |
| 3-HH-V | (2) | 26% |
| V2-BB-1 | (3-2) | 2% |
| 5-HBBH-3 | (3-10) | 5% |
| 5-HB(F)BH-3 | (3-11) | 5% |
| 3-HHB(F,F)-F | (4-4) | 8% |
| 3-GB(F)B(F,F)-F | (4-11) | 3% |
| 3-HH-V1 | (—) | 14% |
| 3-HH-VFF | (—) | 8% |
| 1V2-HH-3 | (—) | 8% |

NI = 78.0° C.; Tc < −20° C.; $\Delta n$ = 0.089; $\Delta \varepsilon$ = 5.6; Vth = 1.82 V; $\eta$ = 12.3 mPa · s; $\gamma 1$ = 60.9 mPa · s.

| Composition M9 | | |
|---|---|---|
| 3-HHB(F,F)XB(F,F)-F | (1-5) | 5% |
| 5-HHB(F,F)XB(F,F)-F | (1-5) | 3% |
| 3-HGB(F,F)XB(F,F)-F | (1-6) | 5% |
| 3-GB(F)B(F,F)XB(F,F)-F | (1-9) | 5% |
| 4-GB(F)B(F,F)XB(F,F)-F | (1-9) | 5% |
| 3-HH-V | (2) | 24% |
| 3-HHEH-3 | (3-3) | 5% |
| 5-B(F)BB-2 | (3-7) | 3% |
| 5-B(F)BB-3 | (3-7) | 2% |
| 5-HB-CL | (4-1) | 5% |
| 3-HHB-OCF3 | (4-3) | 4% |
| 3-HHEB(F,F)-F | (4-5) | 4% |
| 3-HBEB(F,F)-F | (4-10) | 3% |
| 5-HBEB(F,F)-F | (4-10) | 3% |
| 3-BB(F)B(F,F)-F | (4-12) | 3% |
| 5-HEB(F,F)-F | (4) | 3% |
| 3-HH-5 | (—) | 5% |
| 2-HH-5 | (—) | 3% |
| 1V2-HH-3 | (—) | 5% |
| 4-HH-V | (—) | 5% |

NI = 78.6° C.; Tc < −20° C.; $\Delta n$ = 0.091; $\Delta \varepsilon$ = 6.8; Vth = 1.52 V; $\eta$ = 15.5 mPa · s; $\gamma 1$ = 59.3 mPa · s.

| Composition M10 | | |
|---|---|---|
| 3-HHXB(F,F)-F | (1-2) | 9% |
| 3-BB(F,F)XB(F,F)-F | (1-4) | 5% |
| 3-HH-V | (2) | 25% |
| 5-HB-O2 | (3-1) | 10% |
| 7-HB-1 | (3-1) | 5% |
| V2-BB-1 | (3-2) | 3% |
| 3-HHB-1 | (3-4) | 4% |
| 1V-HBB-2 | (3-5) | 5% |
| 5-HBB(F)B-2 | (3-12) | 6% |
| 3-HBB(F,F)-F | (4-8) | 3% |
| 3-BB(F)B(F,F)-F | (4-12) | 4% |
| 3-BB(F)B(F,F)-CF3 | (4-13) | 4% |
| 3-GBB(F)B(F,F)-F | (4-16) | 3% |
| 4-GBB(F)B(F,F)-F | (4-16) | 4% |
| 3-HH-V1 | (—) | 10% |

NI = 79.6° C.; Tc < −20° C.; $\Delta n$ = 0.111; $\Delta \varepsilon$ = 4.7; Vth = 1.86 V; $\eta$ = 9.7 mPa · s; $\gamma 1$ = 49.9 mPa · s.

| Composition M11 | | |
|---|---|---|
| 3-BB(F,F)XB(F,F)-F | (1-4) | 14% |
| 3-dhB(F,F)B(F,F)XB(F)B(F,F)-F | (1-13) | 7% |
| 3-HH-V | (2) | 30% |
| 3-BB(2F,5F)B-3 | (3) | 3% |
| 3-HHB-O1 | (3-4) | 3% |
| 3-HHB-1 | (3-4) | 4% |
| 3-HHB-3 | (3-4) | 5% |
| 3-HHEBH-3 | (3-9) | 3% |
| 3-HHEBH-4 | (3-9) | 4% |
| 3-HHEBH-5 | (3-9) | 3% |
| 7-HB(F,F)-F | (4-2) | 6% |
| 2-HH-5 | (—) | 5% |
| 3-HH-V1 | (—) | 3% |
| 3-HH-VFF | (—) | 10% |

NI = 82.7° C.; Tc < −20° C.; $\Delta n$ = 0.085; $\Delta \varepsilon$ = 5.1; Vth = 1.70 V; $\eta$ = 8.0 mPa · s; $\gamma 1$ = 53.9 mPa · s.

| Composition M12 | | |
|---|---|---|
| 3-BB(F)B(F,F)XB(F,F)-F | (1-10) | 3% |
| 4-BB(F)B(F,F)XB(F,F)-F | (1-10) | 5% |
| 3-BB(F,F)XB(F)B(F,F)-F | (1-12) | 3% |
| 5-BB(F)B(F,F)XB(F)B(F,F)-F | (1-14) | 4% |
| 3-HH-V | (2) | 28% |
| 5-HB-O2 | (3-1) | 2% |
| 7-HB-1 | (3-1) | 5% |
| VFF-HHB-O1 | (3-4) | 8% |
| VFF-HHB-1 | (3-4) | 3% |
| 3-HBB(F,F)-F | (4-8) | 5% |
| 5-HBB(F,F)-F | (4-8) | 4% |
| 3-BB(F)B(F,F)-F | (4-12) | 3% |
| 3-HH2BB(F,F)-F | (4) | 3% |
| 4-HH2BB(F,F)-F | (4) | 3% |

Composition M12

| | | |
|---|---|---|
| 2-BB(2F,3F)B-3 | (5-11) | 4% |
| 3-HBB(2F,3F)-O2 | (5-15) | 2% |
| 2-HH-5 | (—) | 8% |
| 4-HH-V1 | (—) | 7% |

NI = 81.9° C.; Tc < −20° C.; Δn = 0.109; Δε = 4.8; Vth = 1.75 V; η = 13.3 mPa · s; γ1 = 57.4 mPa · s.

Composition M13

| | | |
|---|---|---|
| 5-HHB(F,F)XB(F,F)-F | (1-5) | 3% |
| 3-HGB(F,F)XB(F,F)-F | (1-6) | 4% |
| 3-HBBXB(F,F)-F | (1-7) | 6% |
| 3-GB(F)B(F,F)XB(F,F)-F | (1-9) | 5% |
| 4-GB(F)B(F,F)XB(F,F)-F | (1-9) | 5% |
| 3-HH-V | (2) | 21% |
| 5-B(F)BB-2 | (3-7) | 3% |
| 5-B(F)BB-3 | (3-7) | 2% |

Composition M13

| | | |
|---|---|---|
| 5-HB-CL | (4-1) | 2% |
| 3-HHB-OCF3 | (4-3) | 4% |
| 3-HHEB(F,F)-F | (4-5) | 4% |
| 3-HBEB(F,F)-F | (4-10) | 3% |
| 5-HBEB(F,F)-F | (4-10) | 3% |
| 3-BB(F)B(F,F)-F | (4-12) | 3% |
| 5-HEB(F,F)-F | (4) | 3% |
| 3-HB(2F,3F)-O2 | (5-1) | 3% |
| 3-BB(2F,3F)-O2 | (5-5) | 2% |
| 3-HHB(2F,3F)-O2 | (5-7) | 4% |
| 3-HH-5 | (—) | 4% |
| 3-HH-V1 | (—) | 3% |
| 1V2-HH-3 | (—) | 6% |
| 4-HH-V | (—) | 4% |
| F3-HH-V | (—) | 3% |

NI = 78.1° C.; Tc < −20° C.; Δn = 0.100; Δε = 6.6; Vth = 1.50 V; η = 16.2 mPa · s; γ1 = 61.8 mPa · s.

Polar compounds (PC-1) to (PC-33) described below were used as a first additive.

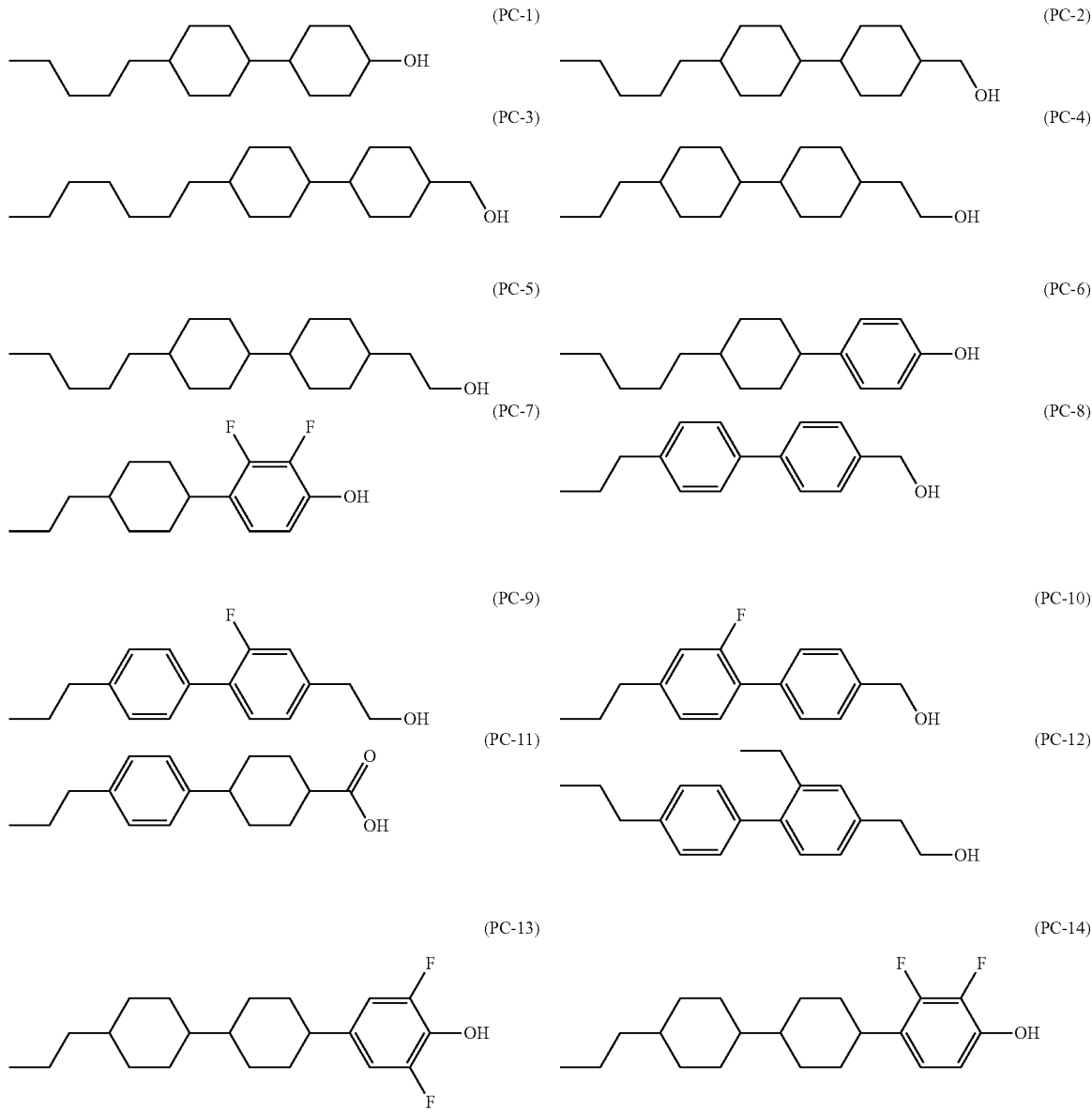

-continued
(PC-15)
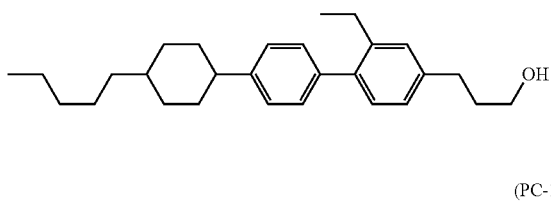
(PC-16)
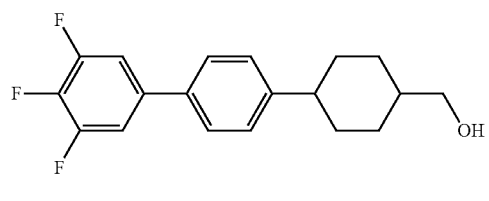
(PC-17)
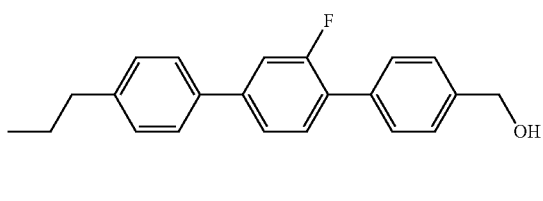
(PC-18)
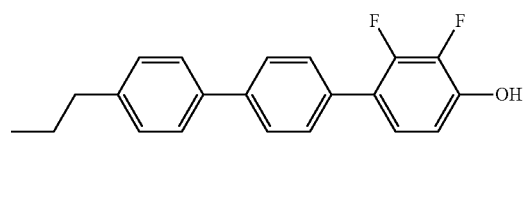
(PC-19)
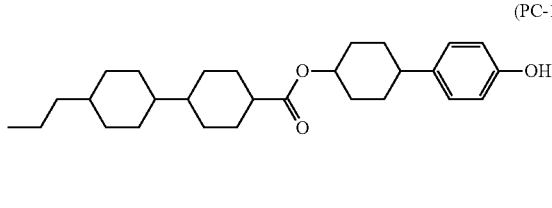
(PC-20)
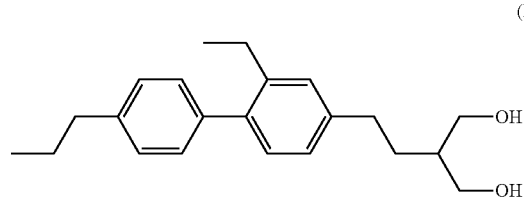
(PC-21)
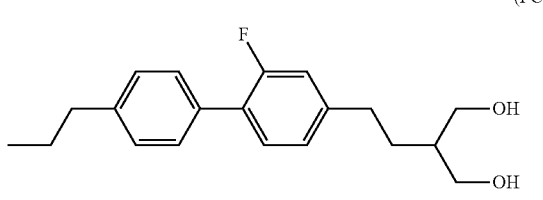
(PC-22)
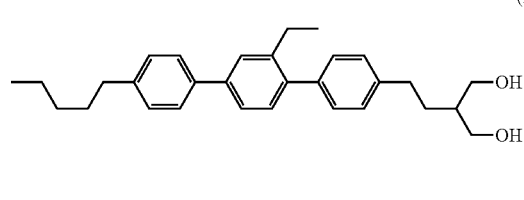
(PC-23)
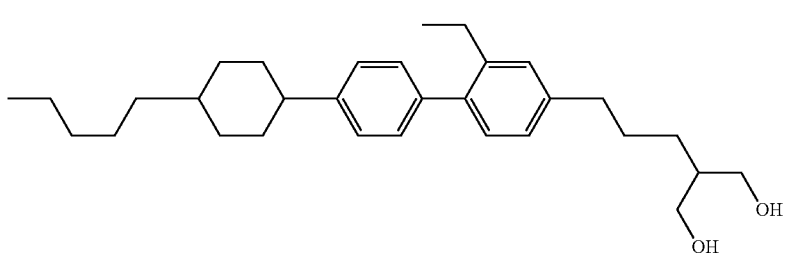
(PC-24)
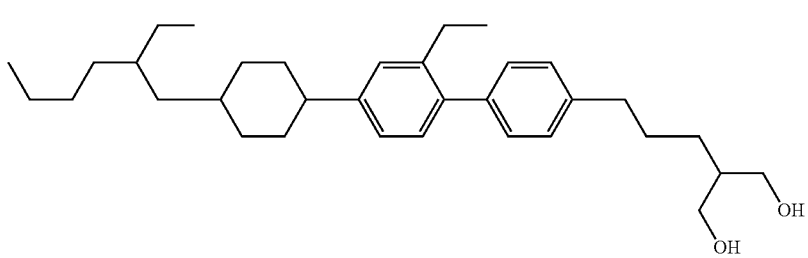
(PC-25)
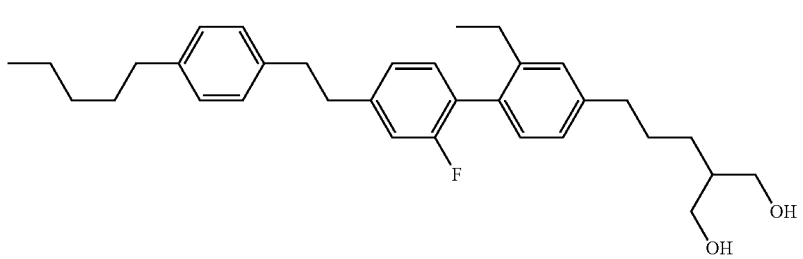

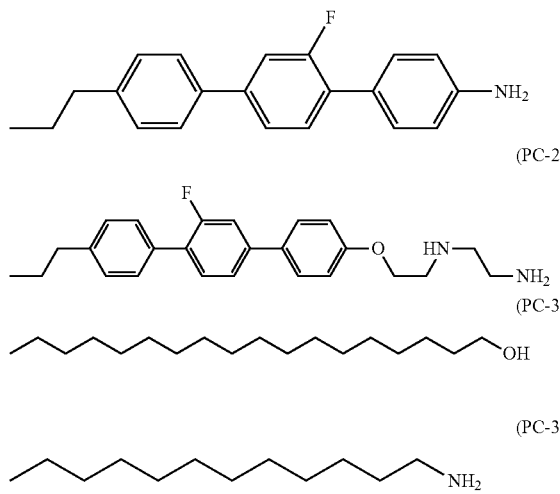
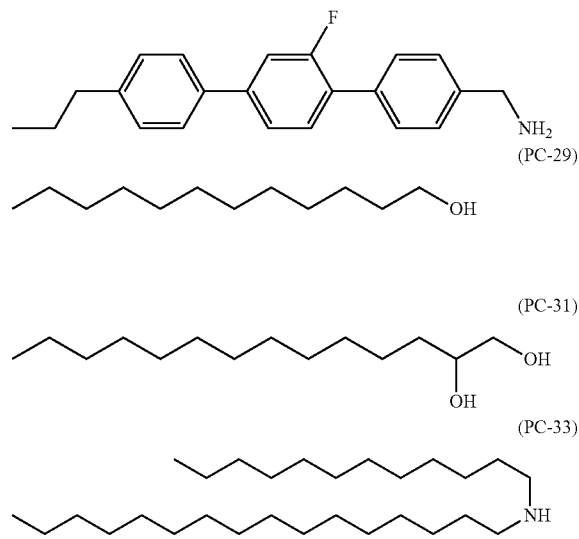
Polymerizable compounds (RM-1) to (RM-11) described below were used as a second additive.
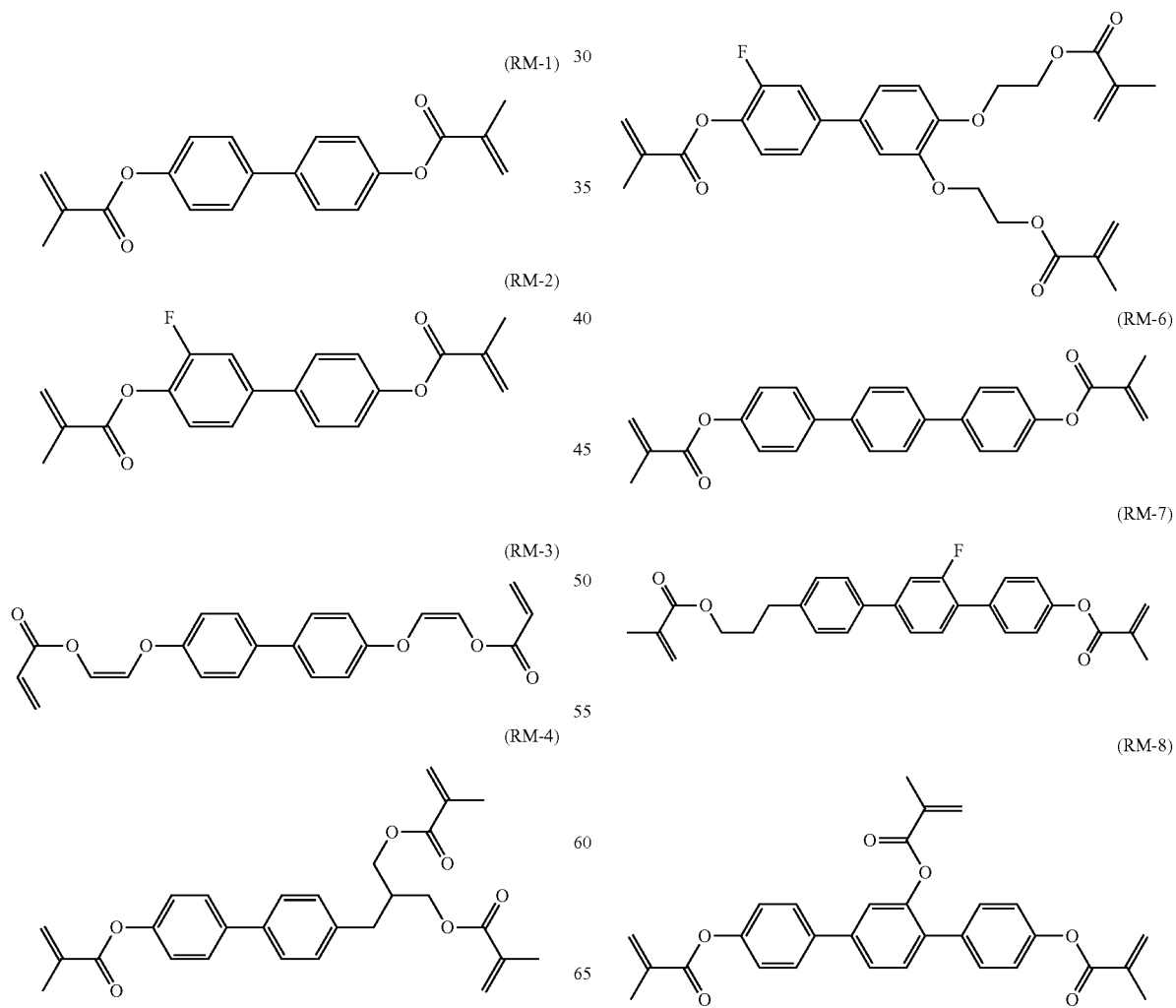

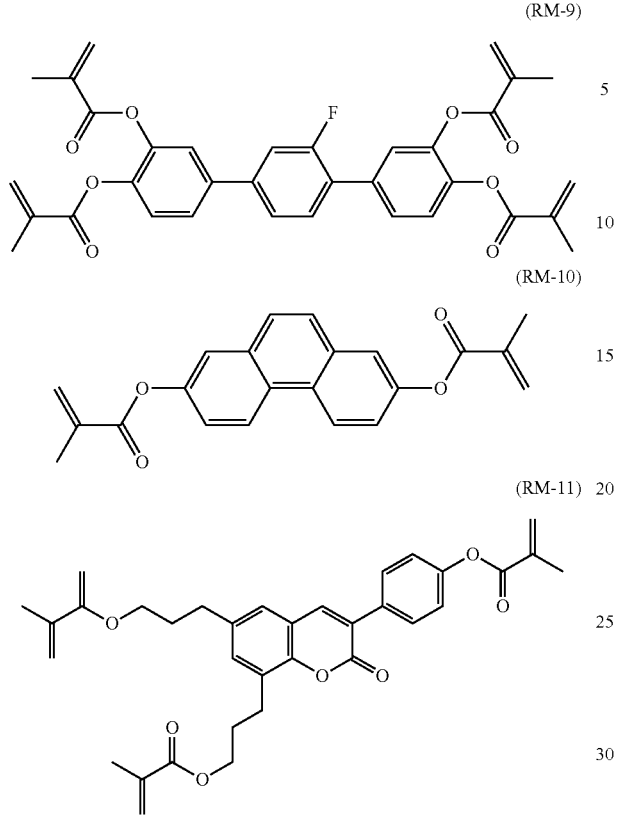

2. Vertical Alignment of Liquid Crystal Molecules

Example 1

To composition (M1), polar compound (PC-1) was added at a proportion of 5% by weight, and polymerizable compound (RM-1) was added at a proportion of 0.5% by weight. The resulting mixture was injected, on a hot stage at 100° C., into a device having no alignment film in which a distance (cell gap) between two glass substrates was 4.0 micrometers. A polymerizable compound was polymerized by irradiating the device with ultraviolet light (28J) using an ultra-high pressure mercury lamp USH-250-BY (made by Ushio, Inc.). The device was set to a polarizing microscope in which a polarizer is arranged perpendicularly to an analyzer, and the device is irradiated with light from below and presence or absence of light leakage was observed. When liquid crystal molecules were sufficiently aligned to prevent light from passing through the device, vertical alignment was judged as "good." When light that had passed through the device was observed, the vertical alignment was represented as "poor."

Examples 2 to 33

A device having no alignment film was prepared by using a mixture of a composition, a polar compound and a polymerizable compound. Presence or absence of light leakage was observed in a manner similar to Example 1. The results were summarized in Table 4.

TABLE 4

Vertical alignment of liquid crystal molecules

| Example | Liquid crystal composition | Polar compound (5% by weight) | Polymerizable compound (0.5% by weight) | Vertical alignment |
|---|---|---|---|---|
| 1 | M1 | PC-1 | RM-1 | Good |
| 2 | M2 | PC-2 | RM-2 | Good |
| 3 | M3 | PC-3 | RM-3 | Good |
| 4 | M4 | PC-4 | RM-4 | Good |
| 5 | M5 | PC-5 | RM-5 | Good |
| 6 | M6 | PC-6 | RM-6 | Good |
| 7 | M7 | PC-7 | RM-7 | Good |
| 8 | M8 | PC-8 | RM-8 | Good |
| 9 | M9 | PC-9 | RM-9 | Good |
| 10 | M10 | PC-10 | RM-10 | Good |
| 11 | M11 | PC-11 | RM-11 | Good |
| 12 | M12 | PC-12 | RM-1 | Good |
| 13 | M13 | PC-13 | RM-2 | Good |
| 14 | M1 | PC-14 | RM-3 | Good |
| 15 | M2 | PC-15 | RM-4 | Good |
| 16 | M3 | PC-16 | RM-5 | Good |
| 17 | M4 | PC-17 | RM-6 | Good |
| 18 | M5 | PC-18 | RM-7 | Good |
| 19 | M6 | PC-19 | RM-8 | Good |
| 20 | M7 | PC-20 | RM-9 | Good |
| 21 | M8 | PC-21 | RM-10 | Good |
| 22 | M9 | PC-22 | RM-11 | Good |
| 23 | M10 | PC-23 | RM-1 | Good |
| 24 | M11 | PC-24 | RM-2 | Good |
| 25 | M12 | PC-25 | RM-3 | Good |
| 26 | M13 | PC-26 | RM-4 | Good |
| 27 | M1 | PC-27 | RM-5 | Good |
| 28 | M2 | PC-28 | RM-6 | Good |
| 29 | M3 | PC-29 | RM-7 | Good |
| 30 | M4 | PC-30 | RM-8 | Good |
| 31 | M5 | PC-31 | RM-9 | Good |
| 32 | M6 | PC-32 | RM-10 | Good |
| 33 | M7 | PC-33 | RM-11 | Good |

The results shown in Table 4 indicate that the liquid crystal molecules are stably aligned even without the alignment film by using the liquid crystal composition containing the polar compound and the polymerizable compound even though a kind of each component is different. The above results are a noteworthy feature of the invention.

INDUSTRIAL APPLICABILITY

According to a liquid crystal composition of the invention alignment of liquid crystal molecules can be controlled in a device having no alignment film. The liquid crystal composition satisfies at least one of characteristics such as a high maximum temperature, a low minimum temperature, small viscosity, suitable optical anisotropy, large positive dielectric anisotropy, large specific resistance, high stability to ultraviolet light, high stability to heat and a large elastic constant, or has a suitable balance regarding at least two of the characteristics. A liquid crystal display device including the composition has characteristics such as a short response time, a large voltage holding ratio, a low threshold voltage, a large contrast ratio, a long service life and so forth, and thus can be used in a liquid crystal projector, a liquid crystal television and so forth.

What is claimed is:
1. A liquid crystal composition that has positive dielectric anisotropy, and contains at least one compound selected from the group of compounds represented by formula (1) as a first component, a compound represented by formula (2) as a second component, at least one polar compound as a first additive and at least one polymerizable compound as a second additive:

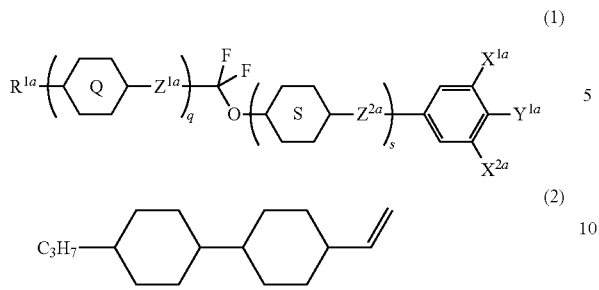

wherein, in formula (1), $R^{1a}$ is alkyl having 1 to 12 carbons, alkoxy having 1 to 12 carbons or alkenyl having 2 to 12 carbons; ring Q and ring S are independently 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^{1a}$ and $Z^{2a}$ are independently a single bond, —$CH_2CH_2$—, —CH=CH—, —$CH_2O$—, —$OCH_2$—, —COO—, —OCO—, —$CF_2O$— or —$OCF_2$—; $X^{1a}$ and $X^{2a}$ are independently hydrogen or fluorine; $Y^{1a}$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine; q is 1, 2, 3 or 4; s is 0, 1, 2 or 3; and a sum of q and s is 4 or less.

2. The liquid crystal composition according to claim 1, containing at least one compound selected from the group of compounds represented by formula (1-1) to formula (1-14) as the first component:

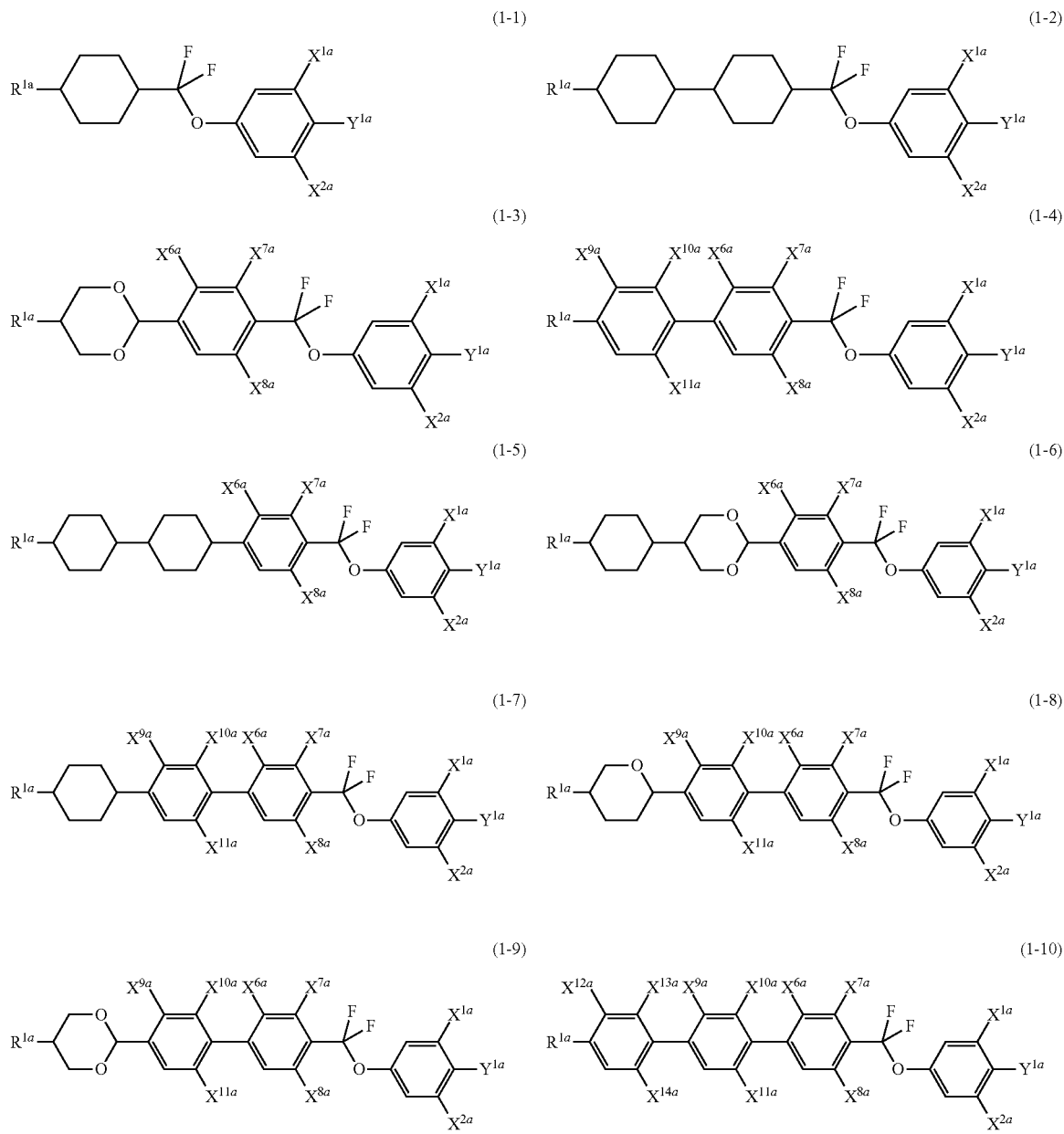

-continued

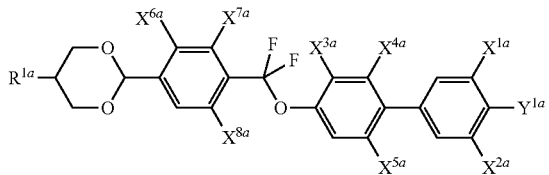
(1-11)

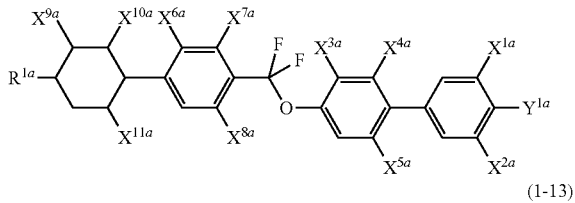
(1-12)

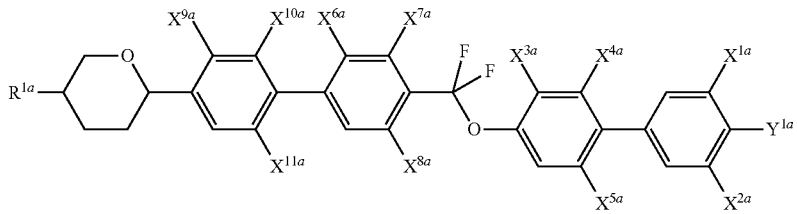
(1-13)

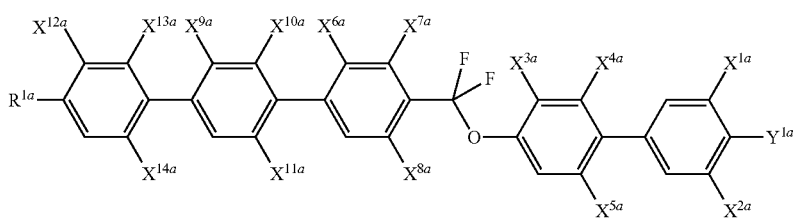
(1-14)

wherein, in formula (1-1) to formula (1-14), $R^{1a}$ is alkyl having 1 to 12 carbons, alkoxy having 1 to 12 carbons or alkenyl having 2 to 12 carbons; $X^{1a}$, $X^{2a}$, $X^{3a}$, $X^{4a}$, $X^{5a}$, $X^{6a}$, $X^{7a}$, $X^{8a}$, $X^{9a}$, $X^{10a}$, $X^{11a}$, $X^{12a}$, $X^{13a}$ and $X^{14a}$ are independently hydrogen or fluorine; and $Y^{1a}$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine.

3. The liquid crystal composition according to claim 1, wherein a proportion of the first component is in the range of 5% by weight to 55% by weight, and a proportion of the second component is in the range of 5% by weight to 50% by weight.

4. The liquid crystal composition according to claim 1, further containing at least one compound selected from the group of compounds represented by formula (3) as a third component:

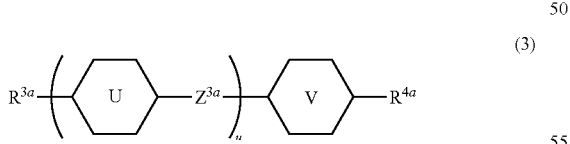
(3)

wherein, in formula (3), $R^{1a}$ and $R^{4a}$ are independently alkyl having 1 to 12 carbons, alkoxy having 1 to 12 carbons, alkenyl having 2 to 12 carbons or alkenyl having 2 to 12 carbons in which at least one hydrogen is replaced by fluorine or chlorine; ring U and ring V are independently 1,4-cyclohexylene, 1,4-phenylene, 2-fluoro-1,4-phenylene or 2,5-difluoro-1,4-phenylene; $Z^{1a}$ is a single bond, —CH$_2$CH$_2$—, —COO— or —OCO—; u is 1, 2 or 3; in which, when u is 1, ring V is 1,4-phenylene, 2-fluoro-1,4-phenylene or 2,5-difluoro-1,4-phenylene.

5. The liquid crystal composition according to claim 1, further containing at least one compound selected from the group of compounds represented by formula (4):

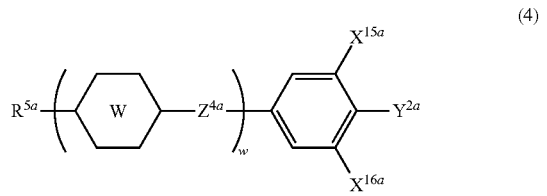
(4)

wherein, in formula (4), $R^{5a}$ is alkyl having 1 to 12 carbons, alkoxy having 1 to 12 carbons or alkenyl having 2 to 12 carbons; ring W is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^{4a}$ is a single bond, —CH$_2$CH$_2$—, —COO— or —OCO—; $X^{15a}$ and $X^{16a}$ are independently hydrogen or fluorine; $Y^{2a}$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine; and w is 1, 2, 3 or 4.

6. The liquid crystal composition according to claim 1, containing at least one compound selected from the group of compounds represented by formula (5):

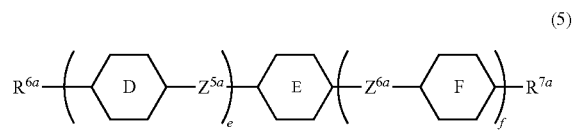
(5)

wherein, in formula (5), $R^{6a}$ and $R^{7a}$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^{5a}$ and $Z^{6a}$ are independently a single bond, —CH$_2$CH$_2$—, —COO—, —OCO—, —CH$_2$O— or —OCH$_2$—; e is 1, 2 or 3, and f is 0 or 1; and a sum of e and f is 3 or less.

7. The liquid crystal composition according to claim 1, wherein the first additive is a polar compound having a polar group containing a hetero atom selected from nitrogen, oxygen, sulfur and phosphorus.

8. The liquid crystal composition according to claim 1, containing at least one polar compound selected from the group of compounds represented by formula (6) and formula (7) as the first additive:

MES-R$^5$                                                  (6)

(R$^4$)$_g$—R$^5$                                    (7)

wherein, in formula (6), MES is a mesogen group having at least one ring; in formula (7), $R^4$ is alkyl having 4 to 20 carbons, and in the alkyl, at least one piece of —CH$_2$— may be replaced by —CH=CH—, —CF=CH—, —CH=CF—, —C≡C— or cycloalkylene having 3 to 8 carbons, in the groups, at least one hydrogen may be replaced by fluorine or chlorine; and in formula (6) and formula (7), $R^5$ is a polar group having at least one of an oxygen atom having an OH structure, a sulfur atom having an SH structure, and a nitrogen atom having a primary, secondary or tertiary amine structure; and g is 1 or 2.

9. The liquid crystal composition according to claim 8, containing at least one compound selected from the group of compounds represented by formula (6-1) as the first additive:

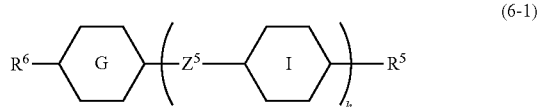

(6-1)

wherein, in formula (6-1), ring G and ring I are independently an aromatic group having 6 to 25 carbons, a heteroaromatic group having 5 to 25 carbons, an alicyclic group having 3 to 25 carbons or a heteroalicyclic group having 4 to 25 carbons, and the groups may be a condensed ring, and in the groups, at least one hydrogen may be replaced by group T, in which group T is —OH, —(CH$_2$)$_i$—OH, halogen, —CN, —NO$_2$, —NCO, —NCS, —OCN, —SCN, —C(=O)N(R$^0$)$_2$, —C(=O)R$^0$, —N(R$^0$)$_2$, —(CH$_2$)$_i$—N(R$^0$)$_2$, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, and in the groups, at least one hydrogen may be replaced by fluorine or chlorine, in which $R^0$ is hydrogen or alkyl having 1 to 12 carbons, and i is 1, 2, 3 or 4; $Z^5$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_i$—, —CF$_2$CH$_2$—, —CH$_2$CF$_2$—, —(CF$_2$)$_i$—, —CH=CH—, —CF=CF, —C≡C—, —CH=CH—COO—, —OCO—CH=CH—, —C(R$^0$)$_2$ or a single bond, in which $R^0$ is hydrogen or alkyl having 1 to 12 carbons, and i is 1, 2, 3 or 4; $R^5$ is alkyl having 1 to 25 carbons, and in the alkyl, at least one piece of —CH$_2$— may be replaced by —NR$^0$—, —O—, —S—, —CO—, —COO—, —OCO—, —OCOO— or cycloalkylene having 3 to 8 carbons, in which $R^0$ is hydrogen or alkyl having 1 to 12 carbons, and at least one tertiary carbon (>CH—) may be replaced by nitrogen (>N—), and at least one hydrogen may be replaced by fluorine or chlorine, in which $R^5$ has at least one of an oxygen atom having an OH structure, a sulfur atom having an SH structure, and a nitrogen atom having a primary, secondary or tertiary amine structure; $R^6$ is hydrogen, halogen and alkyl having 1 to 25 carbons, and in the alkyl, at least one piece of —CH$_2$— may be replaced by —NR$^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in the groups, at least one hydrogen may be replaced by fluorine or chlorine, in which $R^0$ is hydrogen or alkyl having 1 to 12 carbons; and h is 0, 1, 2, 3, 4 or 5.

10. The liquid crystal composition according to claim 8, further containing at least one polar compound selected from the group of compounds represented by formula (7-1) as the first additive:

R$^4$—R$^5$                                       (7-1)

wherein, in formula (7-1), $R^4$ is alkyl having 4 to 20 carbons, and in the alkyl, at least one piece of —CH$_2$— may be replaced by —CH=CH—, —CF=CH—, —CH=CF—, —C≡C— or cycloalkylene having 3 to 8 carbons, and in the groups, at least one hydrogen may be replaced by fluorine or chlorine; $R^5$ is alkyl having 1 to 25 carbons, and in the alkyl, at least one piece of —CH$_2$— may be replaced by —NR$^0$—, —O—, —S—, —CO—, —COO—, —OCO—, —OCOO— or cycloalkylene having 3 to 8 carbons, in which $R^0$ is hydrogen or alkyl having 1 to 12 carbons, and at least one tertiary carbon (>CH—) may be replaced by nitrogen (>N—), and at least one hydrogen may be replaced by fluorine or chlorine, in which $R^5$ has at least one of an oxygen atom having an OH structure, a sulfur atom having an SH structure, and a nitrogen atom having a primary, secondary or tertiary amine structure.

11. The liquid crystal composition according to claim 8, wherein, in formula (6) and formula (7), $R^5$ is a group represented by any one of formula (A1) to formula (A4):

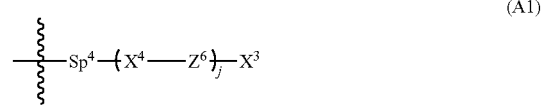

(A1)

-continued

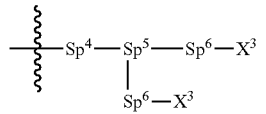
(A2)

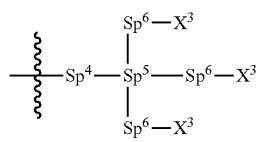
(A3)

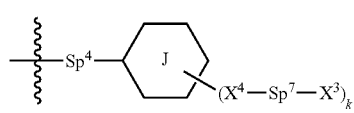
(A4)

wherein, in formula (A1) to formula (A4), $Sp^4$, $Sp^6$ and $Sp^7$ are independently a single bond or a group (-Sp"-X"—), in which Sp" is alkylene having 1 to 20 carbons, and in the alkylene, at least one piece of —$CH_2$— may be replaced by —O—, —S—, —NH—, —N($R^0$)—, —CO—, —CO—O—, —O—CO—, —O—CO—O—, —S—CO—, —CO—S—, —N($R^0$)—CO—O—, —O—CO—N($R^0$)—, —N($R^0$)—CO—N($R^0$)—, —CH=CH— or —C≡C—, and in the groups, at least one hydrogen may be replaced by fluorine, chlorine or —CN, and X" is —O—, —S—, —CO—, —CO—O—, —O—CO—, —O—CO—O—, —CO—N($R^0$)—, —N($R^0$)—CO—, —N($R^0$)—CO—N($R^0$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —N=CH—, —N=N—, —CH=CR$^0$—, —CY$^2$=CY$^3$—, —CH=CH—CO—O—, —O—CO—CH=CH— or a single bond, in which $R^0$ is hydrogen or alkyl having 1 to 12 carbons, and $Y^2$ and $Y^3$ are independently hydrogen, fluorine, chlorine or —CN; $Sp^y$ is >CH—, >CR$^{11}$—, >N— or >C<; $X^3$ is —OH, —OR$^{11}$, —COOH, —NH$_2$, —NHR$^{11}$, —N(R$^{11}$)$_2$, —SH, —SR$^{11}$,

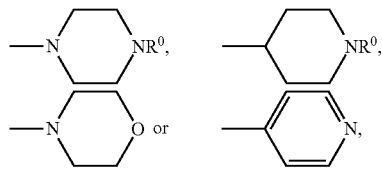

in which $R^0$ is hydrogen or alkyl having 1 to 12 carbons; $X^4$ is —O—, —CO—, —NH—, —NR$^{11}$—, —S— or a single bond; $Z^6$ is alkylene having 1 to 15 carbons, an alicyclic group having 5 or 6 carbons or a combination thereof, and in the groups, at least one hydrogen may be replaced by —OH, —OR$^{11}$, —COOH, —NH$_2$, —NHR$^{11}$, —N(R$^{11}$)$_2$, fluorine or chlorine, in which $R^{11}$ is alkyl having 1 to 15 carbons, and in the alkyl, at least one piece of —CH$_2$— may be replaced by —C≡C—, —CH=CH—, —COO—, —OCO—, —CO— or —O—, and in the groups, at least one hydrogen may be replaced by fluorine or chlorine; ring J is an aromatic group having 6 to 25 carbons or an alicyclic group having 3 to 25 carbons, and the groups may be a condensed ring, and in the groups, one to three hydrogens may be replaced by $R^L$; $R^L$ is —OH, —(CH$_2$)$_i$—OH, fluorine, chlorine, —CN, —NO$_2$, —NCO, —NCS, —OCN, —SCN, —C(=O)N(R$^0$)$_2$, —C(=O)R$^0$, —N(R$^0$)$_2$, —(CH$_2$)$_i$—N(R$^0$)$_2$, —SH, —SR$^0$, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, and in the groups, at least one hydrogen may be replaced by fluorine or chlorine, in which $R^0$ is hydrogen or alkyl having 1 to 12 carbons, and i is 1, 2, 3 or 4; j is 0, 1, 2 or 3; and k is 2, 3, 4 or 5.

12. The liquid crystal composition according to claim 8, wherein the first additive is at least one compound selected from the group of compounds represented by formula (6-1-1) to formula (6-1-4):

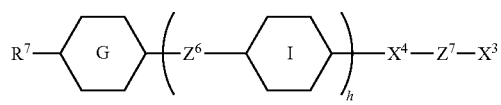
(6-1-1)

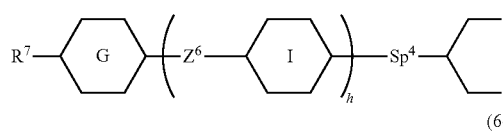
(6-1-2)

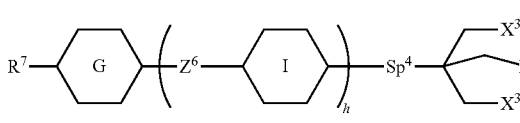
(6-1-3)

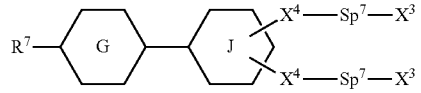
(6-1-4)

wherein, in formula (6-1-1) to formula (6-1-4), ring G and ring I are independently 1,4-cyclohexylene, 1,4-phenylene, 2-fluoro-1,4-phenylene, 2-fluoro-1,3-phenylene, 2-ethyl-1,4-phenylene, 2,6-diethyl-1,4-phenylene, 2-trifluoromethyl-1,4-phenylene, 2,3-difluoro-1,4-phenylene, 2,5-difluoro-1,4-phenylene, 2,6-difluoro-1,4-phenylene or 2,3,5,6-tetrafluoro-1,4-phenylene; ring J is cyclohexyl or phenyl; $Z^6$ is a single bond, —CH$_2$CH$_2$—, —COO— or —OCO—; $Z^7$ is a single bond, alkylene having 1 to 15 carbons, an alicyclic group having 5 or 6 carbons or a combination thereof, and in the groups, at least one hydrogen may be replaced by —OH, —OR$^{11}$, —COOH, —NH$_2$, —NHR$^{11}$, —N(R$^{11}$)$_2$, fluorine or chlorine, and $R^{11}$ is alkyl having 1 to 15 carbons, and in the alkyl, at least one piece of —CH$_2$— may be replaced by —C≡C—, —CH=CH—, —COO—, —OCO—, —CO—, —O— or —NH—, and in the groups, at least one hydrogen may be replaced by fluorine or chlorine; $Sp^4$ is a single bond, —CH$_2$CH$_2$—, —CH$_2$CH$_2$CH$_2$—, —CH$_2$O— or —OCH$_2$—; $Sp^7$ is a single bond or alkylene having 1 to 5 carbons, and in the alkylene, —CH$_2$— may be replaced by —O— or —NH—; $R^7$ is alkyl having 1 to 8 carbons or fluorine; h is 0, 1, 2, 3, 4 or 5; $X^3$ is —OH, —COOH, —SH, —OCH$_3$ or —NH$_2$; and $X^4$ is a single bond or —O—.

13. The liquid crystal composition according to claim 8, wherein the first additive is at least one compound selected from the group of compounds represented by formula (7-1-1) to formula (7-1-29):

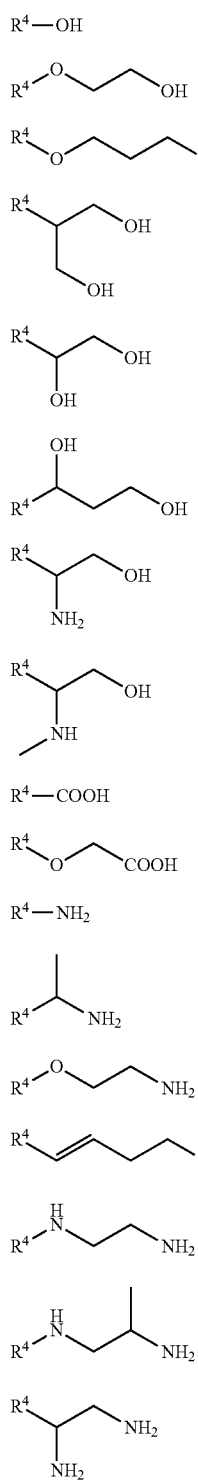
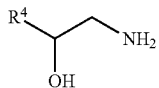
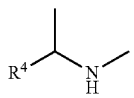
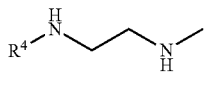
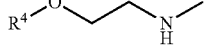
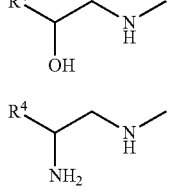
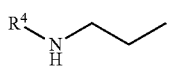
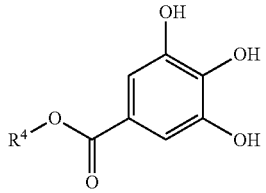
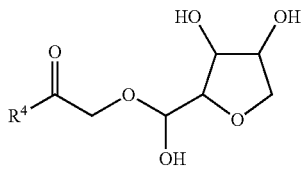
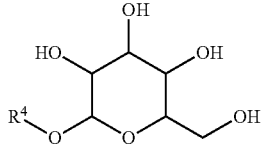

wherein, in formula (7-1-1) to formula (7-1-29), $R^4$ is alkyl having 4 to 20 carbons, and in the alkyl, at least one piece of —CH$_2$— may be replaced by —CH=CH—, —CF=CH—, —CH=CF—, —C≡— or cycloalkylene having 3 to 8 carbons, and in the groups, at least one hydrogen may be replaced by fluorine or chlorine.

14. The liquid crystal composition according to claim 8, wherein a proportion of the first additive is 10% by weight or less.

15. The liquid crystal composition according to claim 1, containing at least one polymerizable compound selected from the group of compounds represented by formula (8) as the second additive:

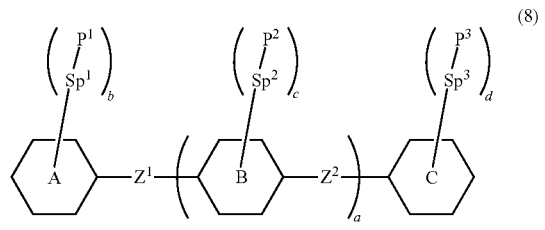
(8)

wherein, in formula (8), ring A and ring C are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring B is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^1$ and $Z^2$ are independently a single bond or alkylene having 1 to 10 carbons, and in the alkylene, at least one piece of —CH$_2$— may be replaced by —O—, —CO—, —COO— or —OCO—, and at least one piece of —CH$_2$CH$_2$— may be replaced by —CH═CH—, —C(CH$_3$)═CH—, —CH═C(CH$_3$)— or —C(CH$_3$)═C(CH$_3$)—, and in the groups, at least one hydrogen may be replaced by fluorine or chlorine; $P^1$, $P^2$ and $P^3$ are a polymerizable group; $Sp^1$, $Sp^2$ and $Sp^3$ are independently a single bond or alkylene 1 to 10 carbons, and in the alkylene, at least one piece of —CH$_2$— may be replaced by —O—, —COO—, —OCO— or —OCOO—, and at least one piece of —CH$_2$CH$_2$— may be replaced by —CH═CH— or —C≡C—, and in the groups, at least one hydrogen may be replaced by fluorine or chlorine; a is 0, 1 or 2; and b, c and d are independently 0, 1, 2, 3 or 4.

16. The liquid crystal composition according to claim 15, wherein, in formula (8), $P^1$, $P^2$ and $P^3$ are independently a polymerizable group selected from the group of groups represented by formula (P-1) to formula (P-5):

(P-1)

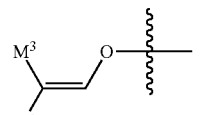
(P-2)

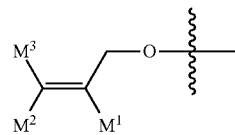
(P-3)

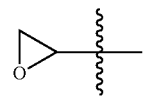
(P-4)

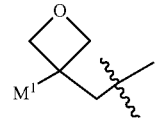
(P-5)

wherein, in formula (P-1) to formula (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

17. The liquid crystal composition according to claim 15, wherein the second additive is at least one polymerizable compound selected from the group of compounds represented by formula (8-1) to formula (8-28):

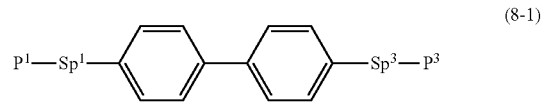
(8-1)

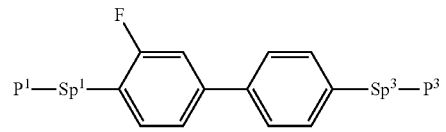
(8-2)

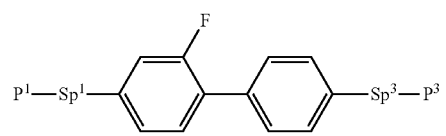
(8-3)

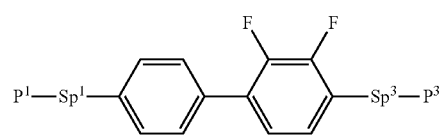
(8-4)

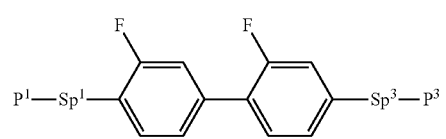
(8-5)

(8-6) 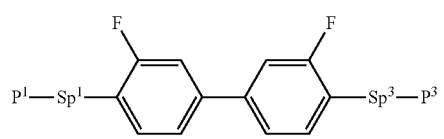
(8-7) 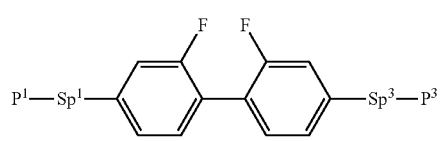
(8-8) 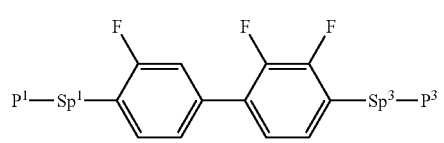
(8-9) 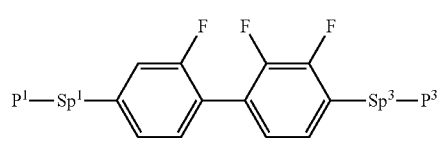
(8-10) 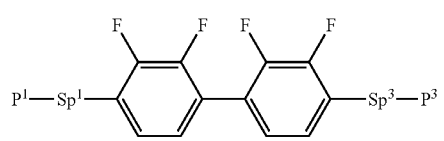
(8-11) 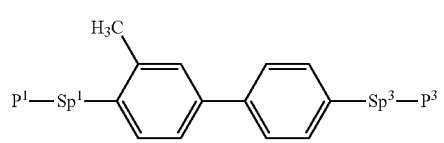
(8-12) 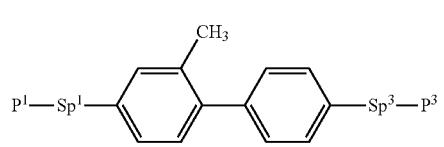
(8-13) 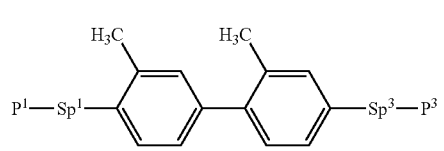
(8-14) 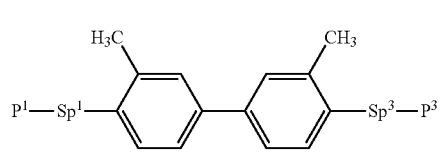
(8-15) 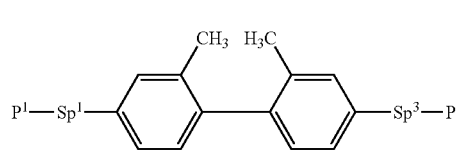
(8-16) 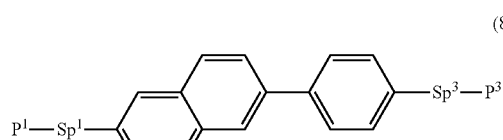
(8-17) 
(8-18) 
(8-19) 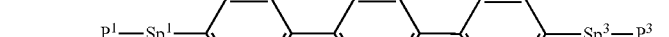
(8-20) 
(8-21) 
(8-22) 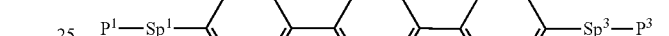
(8-23) 
(8-24) 
(8-25) 

(8-26)

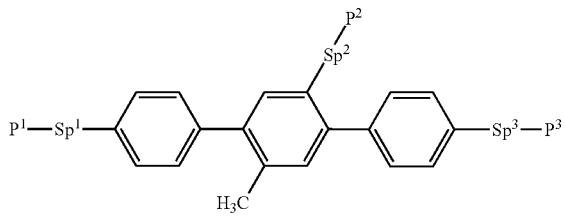

(8-27)

(8-28)

wherein, in formula (8-1) to formula (8-28), $P^1$, $P^2$ and $P^3$ are independently a polymerizable group selected from the group of groups represented by formula (P-1) to formula (P-3), in which $M^1$, $M^2$ and $M^3$ are independently hydrogen, fluorine, alkyl having 1 to 5 carbons, or alkyl having 1 to 5 carbons in which at least one hydrogen is replaced by fluorine or chlorine;

(P-1)

(P-2)

(P-3)

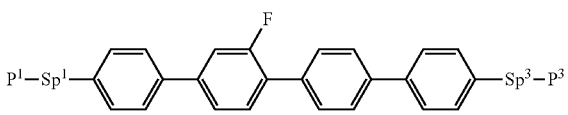

wherein, $Sp^1$, $Sp^2$ and $Sp^a$ are independently a single bond or alkylene having 1 to 10 carbons, and in the alkylene, at least one piece of —$CH_2$— may be replaced by —O—, —OCO—, —OCO— or —OCOO—, and at least one piece of —$CH_2CH_2$— may be replaced by —CH=CH— or —C≡C—, and in the groups, at least one hydrogen may be replaced by fluorine or chlorine.

18. The liquid crystal composition according to claim 15, wherein a proportion of the second additive is in the range of 0.03% by weight to 10% by weight based on the weight of the liquid crystal composition.

19. A polymer sustained alignment mode liquid crystal display device, wherein the liquid crystal display device includes the liquid crystal composition according to claim 1, or a polymerizable compound in the liquid crystal composition is polymerized.

20. A polymer sustained alignment mode liquid crystal display device having no alignment film, wherein the liquid crystal display device includes the liquid crystal composition according to claim 1, or a polymerizable compound in the liquid crystal composition is polymerized.

* * * * *